US007904468B2

(12) United States Patent
Neil et al.

(10) Patent No.: US 7,904,468 B2
(45) Date of Patent: Mar. 8, 2011

(54) METHOD AND SOFTWARE FOR FACILITATING INTERACTION WITH A PERSONAL INFORMATION MANAGER APPLICATION AT A WIRELESS COMMUNICATION DEVICE

(75) Inventors: Tim Neil, Mississauga (CA); Paul Chalmers, Windsor (CA)

(73) Assignee: Research In Motion Limited, Waterloo, Ontario (CA)

( * ) Notice: Subject to any disclaimer, the term of this patent is extended or adjusted under 35 U.S.C. 154(b) by 389 days.

(21) Appl. No.: 12/038,051

(22) Filed: Feb. 27, 2008

(65) Prior Publication Data

US 2009/0216800 A1 Aug. 27, 2009

(51) Int. Cl.
*G06F 7/00* (2006.01)
*G06F 17/30* (2006.01)
(52) U.S. Cl. .................... 707/763; 707/802; 715/968
(58) Field of Classification Search .......... 707/760, 707/763, 999.003, 999.004, 802; 709/203; 715/968
See application file for complete search history.

(56) References Cited

U.S. PATENT DOCUMENTS

| 6,480,860 | B1* | 11/2002 | Monday .................. 707/999.102 |
| 7,133,864 | B2* | 11/2006 | Roth ............................ 707/708 |
| 2002/0013711 | A1* | 1/2002 | Ahuja et al. ..................... 705/1 |
| 2005/0102381 | A1* | 5/2005 | Jiang et al. ..................... 709/220 |
| 2005/0149484 | A1* | 7/2005 | Fox et al. .......................... 707/1 |
| 2005/0262049 | A1* | 11/2005 | Somppi .............................. 707/3 |
| 2006/0136436 | A1* | 6/2006 | Aftab et al. ..................... 707/100 |
| 2006/0165060 | A1* | 7/2006 | Dua .................................. 370/352 |
| 2006/0167928 | A1* | 7/2006 | Chakraborty et al. ......... 707/102 |
| 2007/0072588 | A1* | 3/2007 | Gorty et al. ................. 455/412.1 |
| 2007/0240133 | A1* | 10/2007 | Neil et al. ..................... 717/140 |
| 2008/0299953 | A1* | 12/2008 | Rao ............................ 455/414.1 |
| 2009/0150367 | A1* | 6/2009 | Melnik et al. ..................... 707/4 |
| 2009/0210498 | A1* | 8/2009 | Sze et al. ..................... 709/206 |

FOREIGN PATENT DOCUMENTS

WO WO 2007/135627 A 11/2007

OTHER PUBLICATIONS

Wikipedia, Personal Computer, printout from Web archive: http://web.archive.org/web/20080101231332/en.wikipedia.org/wiki/Personal_computer, Dec. 31, 2007, 21 pages.*
H.H. Hoang, A.M.Tjoa,T.M.Nguyen, "Ontology-based virtual query system for semanticlife digital memory project", Feb. 12, 2006 URL:http://storm.ifs.tuwien.ac.at/publications/RIVFP6_hanh_tjoa_tho_cr.pdf.
Y. Goland, E. Whitehead, A. Faizi, S. Carter, D. Jensen, "HTTP Extensions for Distributed Authoring—Webdav; rfc2518.txt", Feb. 1, 1999, pp. 1-51, IETF Standard Internet Engineering Task Force, IETF, CH.

* cited by examiner

*Primary Examiner* — John E Breene
*Assistant Examiner* — Phong Nguyen

(57) ABSTRACT

Software executable by a wireless communication device may include instructions for receiving at least one markup language document containing a markup language definition defining a query of a notional database table. The notional database table may be characterized by a set of notional fields, each corresponding to a field of a data record within an information category maintained by each of a plurality of wireless communication device-executable personal information manager (PIM) software applications. The software may further include instructions for instantiating, based on the markup language definition, an instance of at least one object-oriented class containing code for effecting the query through interaction with one PIM software application, executable at said wireless communication device, of the plurality. Software for defining the query in markup language may also be provided.

12 Claims, 24 Drawing Sheets

```
1  {wrapper tags}
2  <PKG TYPE="ME">
3    <MAIL MSGID="1" FROM="Joe Smith" FROMADDRESS="user@domain.com"
4      SUBJECT="Hello">
5    How are you?
6    </MAIL>
7    <RECIPS>
8      <RCP MSGID="1" TO="Jeff Jones"
9        ADDRESS="jeff@xyz.com"></RCP>
10     <RCP MSGID="1" TO="Scott Neil"
11       ADDRESS="scottn@xyz.com"></RCP>
12     <RCP MSGID="1" TO="Tim Neil"
13       ADDRESS="timn@xyz.com"></RCP>
14   </RECIPS>
15 </PKG>
16 {wrapper tags}
```

Application Definition File 20

```
1  : // DATA RULE
2  <AXDATAPACKET BODY="ME" SENDTOMOBILE="YES" SENDTOAPP="NO">
3    <TABLEUPDATES>
4      <TUPDATE TABLE="PIMINBOX" UPDATETYPE="ADD" WHEREFIELD=""
5        WHEREPARAM="" WHERETYPE="PROP" SECTION="MAIL" MULTIROW="NO"
6        MULTIROWIDENT="">
7        <FIELDS>
8          <PKGFLD NAME="LNGMESSAGEID" PARAMTYPE="PROP">MSGID</PKGFLD>
9          <PKGFLD NAME="VARFROM" PARAMTYPE="PROP">FROM</PKGFLD>
10         <PKGFLD NAME="VARSUBJECT" PARAMTYPE="PROP">SUBJECT</PKGFLD>
11         <PKGFLD NAME="MEMBODY" PARAMTYPE="VALUE">MAIL</PKGFLD>
12       </FIELDS>
13     </TUPDATE>
14     <TUPDATE TABLE="TBLRECIPIENTS" UPDATETYPE="ADD" WHEREFIELD=""
15       WHEREPARAM="" WHERETYPE="PROP" SECTION="RECIPS" MULTIROW="YES"
16       MULTIROWIDENT="RCP">
17       <FIELDS>
18         <PKGFLD NAME="LNGMESSAGEID" PARAMTYPE="PROP">MSGID</PKGFLD>
19         <PKGFLD NAME="VARFULLNAME" PARAMTYPE="PROP">TO</PKGFLD>
20         <PKGFLD NAME="VARADDRESS" PARAMTYPE="PROP">ADDRESS</PKGFLD>
21       </FIELDS>
22     </TUPDATE>
23   </TABLEUPDATES>
24 </AXDATAPACKET>
25 :
```

} 28 (bracketing lines 4–12)

FIG. 13B

Application Definition File 20

```
26  : // USER-DEFINED TABLE
27  : <TDEF NAME="TBLRECIPIENTS" UPDATETYPE="NEW" PK="LNGRECIPIENTID" DELINDEX="1">
28      <FIELDS>
29          <FLD TYPE="INT" SIZE="AUTOINC" INDEXED="NO" REFERENCEFIELD=""
30              ALLOWNULL="NO">LNGRECIPIENTID</FLD>
31          <FLD TYPE="STRING" SIZE="200" INDEXED="NO" REFERENCEFIELD=""
32              ALLOWNULL="YES">VARFULLNAME</FLD>
33          <FLD TYPE="STRING" SIZE="200" INDEXED="NO" REFERENCEFIELD=""
34              ALLOWNULL="YES">VARADDRESS</FLD>
35      </FIELDS>
36  </TDEF>
37  :
38  : // (UNDER POCKET PC OPERATING SYSTEM BRANCH)
39  <SCREENS>
40      <SCREEN NAME="SCRN1" TITLE="SCREEN1" ORDERED="FALSE">
41          <EVENTS />
42          :
43          (GRID ELEMENT)
44          :
45          <BUTTONS>
46              <BTN NAME="BTN1" INDEX="1" CAPTION="SEND ACK. TO JOE"">
47                  <EVENTS>
48                      <EVENT TYPE="ONCLICK" ...>
49                          <ACTION TYPE="SENDMAIL>
50                              <MESSAGE TO="JoeSmith@domain.com" CC="" BCC=""
51                                  SUBJECT="Acknowledgement" >
52                                  Receipt of your message is acknowledged.
53                              </MESSAGE>
54                          </ACTION>
55                      </EVENT>
```

(Lines 49–54 bracketed as 30)

```
57              </EVENTS>
58           </BTN>
59        </BUTTONS>
60        <QUERIES>
61           <QUERY NAME="QUERY1" TABLE="PIMINBOX" ORDERBY="VARFROM" ORDERDIR="ASC">
62              <W F="VARFROM" E="EQ">Joe Smith</W>
63           </QUERY>
64        </QUERIES>
65        ..
66     </SCREEN>
67     .. // other screens
68     ..
69        <QUERY NAME="QUERY1" TABLE="TBLRECIPIENTS" ORDERBY="VARFULLNAME"
70           ORDERDIR="ASC">
71              <W F="VARFULLNAME" E="BW">J</W>
72        </QUERY>
73     ..
74     ..
75  </SCREENS>
76  ..
```

```
1  Public class Rule
2  {
3
4    // represents a rule for processing an XML package
5
6    string body;         // type of XML package that the rule instance is intended to process
7    boolean sendtomobile; // TRUE if XML package is incoming to wireless device; else FALSE.
8    boolean sendtoapp;    // TRUE if XML package is outgoing from wireless device; else FALSE.
9    string XML;          // XML markup language defining this rule
10                        //    (from application definition file)
11   TableUpdate[] Tupdates;// array of objects representing a set of updates to one or more
12                        //    user-defined or notional database tables
13   ..
14   (other data members)
15   ..
16
17   public void fromXML(<XML>)        // "constructor"
18   {
19     // - set local data members based on AXDATAPACKET element attributes
20     // - FOR each subordinate TABLEUDPATE element within the AXDATAPACKET element:
21     //     1. Instantiate a new TableUpdate object and add to the Tupdates array
22     //     2. Pass the XML for the TABLEUPDATE element (including subordinate objects)
23     //        to new TableUpdate object's fromXML() method to initialize TableUpdate object
24     // - END FOR LOOP
25   }
26
27   public void doRule(          // invoked to process a XML package of type [body]
28     XMLPackage package)        // ("package" represents the XML package that was received)
29   {
30     // - FOR i = 0 to the number of TableUpdate objects in Tupdates array:
31     //     - Tupdates[i].doUpdate(package);  // perform all associated table updates
32   }
33
34 }  // end class Rule
```

1400

```
 1  Public class TableUpdate
 2  {
 3    // represents a single table update associated with a rule for processing an XML package
 4
 5    string table;          // name of user-defined or notional database table to be updated
 6    string updatetype;     // type of update: ADD, DELETE or UPDATE
 7    string wherefield;     // for UPDATE or DELETE, identifies field of table for where clause
 8    string whereparam;     // for UPDATE or DELETE, identifies parameter within package whose
 9                           //   value is used in where clause
10    string wheretype;      // PROP for attribute, VALUE for element
11    string section;        // relevant nested XML element within package
12    boolean multirow;      // TRUE if processing multiple XML elements per package, else FALSE
13    string multirowident;  // name of XML element that exists in multiple in package
14    PFAssociation[] PFAssns;  // array of parameter-field associations
15    :
16    (other data members)
17    :
18
19    public void fromXML(<XML>)       // "constructor"
20    {
21      // - set local data members based on TUPDATE element attributes
22      // - FOR each subordinate PKGFLD element within the TUPDATE element:
23      //     1. Instantiate a new PFAssociation object and add to the PFAssns array
24      //     2. Pass the XML for the PKGFLD element
25      //        to new Association object's fromXML() method to initialize PFAssns obj.
26      // - END FOR LOOP
27    }
28
29    public void doUpdate(             // invoked to perform the current table update
30       XMLPackage package)            // "package" represents the XML package that was received
31    {
32      // - identify appropriate table object based on name using broker
33      // - invoke table object's effectUpdate method, passing this (self) and package as
34      //    parameters
35
```

FIG. 15A

```
36  }
37  }  // end class TableUpdate
38  }
```

```
1   Public class Table
2   {
3
4       // represents and provides access to either a user-defined database table or a
5       // notional database table
6
7       string name;          // name of table - determines whether PIM notional or user-defined
8
9       string pk;            // name of primary key in table
10      int delindex;         // index of table w.r.t. all tables for specifying delete order
11      Field[] Fields;       // array of fields in the present table
12      Conn connector;       // connector to either PIM appn (for notional PIM tables) or to DBMS
13                            //   (for user-defined tables) for accessing or manipulating data
14      :
15      (other data members)
16      :
17
18      public void fromXML(<XML>)        // "constructor"
19      {
20          //  - set local data members based on TDEF element attributes
21          //  - FOR each subordinate FLD element within the FIELDS element:
22          //       1. Instantiate a new Field object and add to the Fields array
23          //       2. Pass the XML for the FLD element to new Field object's fromXML() method
24          //          to initialize Field object
25          //  - END FOR LOOP
26          //  - cause connector object to connect to DBMS (for user-defined tables)
27          //       or PIM appn (for notional PIM tables)
28          //  - IF table is user-defined
29          //       - make appropriate DBMS API calls to generate a corresponding table in the
30          //         database   **PAE: need not do anything if notional table b/c it already exists
31      }
32
33
34
35
```

FIG. 16B

```
36  public void effectUpdate(      // invoked to add, delete or update a record of the table
37      TableUpdate tupdate,       // "tupdate" represents the update to be made
38      XMLPackage package)        // "package" represents the XML package that was received
39  {
40      // SWITCH (tupdate.updatetype) {
41      //
42      //
43      // CASE ADD:
44      //    IF table is a user-defined database table THEN
45      //      - via connector, invoke DBMS API call for adding a record as dictated by the
46      //        data members of the tupdate parameter using data from the XML package;
47      //    ELSE (notional PIM table)
48      //      - instantiate a new data record for the relevant PIM information category;
49      //      - fill in the new record with values from the XML package based on the data
50      //        members of the tupdate parameter;
51      //      - via connector, invoke PIM API call for adding a record as dictated by the
52      //        data members of the tupdate parameter using data from the package parameter;
53      //
54      // CASE DELETE:
55      //    IF table is a user-defined database table THEN
56      //      - via connector, invoke DBMS API call for deleting a record as identified based
57      //        on the data members of the tupdate parameter;
58      //    ELSE (notional PIM table)
59      //      - via connector, invoke PIM API call for deleting a record identified based
60      //        on the data members of the tupdate parameter;
61      //
62      // CASE UPDATE:
63      //    IF table is a user-defined database table THEN
64      //      - via connector, invoke DBMS API call for updating a record as dictated by the
65      //        data members of the tupdate parameter using data from the package parameter;
66      //    ELSE (notional PIM table)
67      //      - via connector, invoke PIM API call for updating a record as dictated by the
68      //        data members of the tupdate parameter using data from the package parameter;
69      //
70  }
```

1600

```
71  } // end effectUpdate
72
73  public executeQuery(Record[] records, Query query)
74  {
75      // - IF table is user-defined
76      //   - based on query object and using connector, interact with DBMS to
77      //     identify matching records
78      //   - return matching records
79      // - ELSE (table is notional PIM table)
80      //   - based on query object and using connector, interact with PIM API to
81      //     identify matching records in appropriate information category
82      //   - return matching records
83  }
84
85  } // end class Table
```

FIG. 16C

```
1   Public class Action
2   {
3   // represents a single action to be performed upon the occurrence of an event represented //
4   // by a containing event object
5
6
7   string type;              // action type - one of a predetermined set of actions including
8                             // OPEN (display new screen), ARML (compose and send XML message),
9                             // SAVE (save fields marked as persistent), PURGE (clear scratchpad),
10                            // NOTIFY (play notification sound), CLOSE (exit application),
11                            // ALERT (display message box), IF...Then...Else (execute an alternative
12                            // set of actions based on a condition), CLOSESCREEN (exit screen),
13                            // SAVEITEM (save scratchpad variable), REFRESH (re-initialize all
14                            // display elements on the screen), and SENDMAIL (send a
15                            // predetermined email message to a predetermined email address)
16  Message message;          // object representing "canned" outgoing email for SENDMAIL action
17
18  // (other data members - may be action type-specific)
19
20
21  public void fromXML(<XML>)     // "constructor"
22  {
23      // - set local data members based on ACTION element attributes
24
25  }
26  public void doAction()         // perform the action represented by this action object
27  {
28      SWITCH (type) {
29          //
30          // CASE SENDMAIL:
31          //   - connect to PIM application
32          //   - interact with PIM API to send email message
33          //   :
34          //
35          //   (case branches for other action types)
```

```
36          :
37          //         :
38          //         } end switch
39          //
40          ;
41       }
42       :
43       }  // end class Action
44   }
```

```
1  Public class Query
2  {
3     // represents a query of a user-defined table or a notional PIM table
4
5     string name;         // unique query name
6     string table;        // name of table upon which query is to be executed
7     WhereParam[] whereparams;  // array of where parameters
8     Record[] records;    // array of objects representing records returned by this query;
9                         // (i.e. the query result); a locally-maintained "snapshot" of data
10                        // from the specified table
11    int current;         // index into records array
12    ..
13
14    public void fromXML(<XML>)    // "constructor"
15    {
16       // - set local data members based on QUERY element attributes
17    }
18
19    public runQuery(records)      // executes the query, returns matching records
20    {
21       // - identify table object based on table name
22       // - invoke table object's executeQuery method to obtain matching records,
23       //   passing (self) as "in" parameter and records as "out" parameter
24    }
25
26    public string getField(fieldname)   // returns value of specified field name
27    {
28       // - return value of field fieldname of currently indexed record
29    }
30    :
31 }  // end class Query
```

FIG. 18

METHOD AND SOFTWARE FOR FACILITATING INTERACTION WITH A PERSONAL INFORMATION MANAGER APPLICATION AT A WIRELESS COMMUNICATION DEVICE

FIELD OF TECHNOLOGY

The present disclosure relates to a method and software for facilitating interaction with a personal information manager application at a wireless communication device.

BACKGROUND

Personal information manager (PIM) software applications are computer programs which allow a user to maintain and organize various types of personal information and which provide electronic mail (email) functionality. PIM software applications (or simply "PIM applications") typically maintain personal information in distinct information categories. The information categories that are maintained usually include an email message inbox, an email message outbox, a set of previously transmitted email messages or "sent items", an address book containing contact information, a scheduling calendar (or i.e. a set of appointments, notes, and a list of tasks to be completed. Microsoft Outlook™ is an example of a PIM software application. PIM applications may be designed for execution by a wireless communication device, such as a two-way paging device, a Windows CE operating system based device, a PalmOS device, a Wireless Application Protocol (WAP) enabled mobile telephone, or the like.

Within an information category of a PIM application, an individual data item, such as an email message, contact, or appointment (as appropriate), may be stored in the form of a data record. The format of the data record may be PIM application-specific. A PIM application may include an application programming interface (API) to allow other programs to interact with the PIM application or to access information stored within one or more information categories. Because data record formats and APIs may vary from PIM application to PIM application, however, it may be difficult to develop software that is capable of interacting with different PIM applications or different types of wireless communication devices.

A solution which addresses this problem would be desirable.

BRIEF DESCRIPTION OF THE DRAWINGS

In the figures which illustrate example embodiments of the present disclosure:

FIG. 8 illustrates the contents of an XML package (a form of message) received at run time at the wireless communication device of FIG. 3;

FIGS. 13A-13C illustrate an application definition file markup language document which governs the operation of the wireless communication devices of FIG. 3;

FIG. 14 is a pseudocode representation of an object-oriented Rule class which is instantiated by the wireless communication device of FIG. 3;

FIGS. 15A-15B are a pseudocode representation of an object-oriented TableUpdate class which is instantiated by the wireless communication device of FIG. 3;

FIGS. 16A-16C are a pseudocode representation of an object-oriented Table class which is instantiated by the wireless communication device of FIG. 3;

FIGS. 17A-17B are a pseudocode representation of an object-oriented Action class which is instantiated by the wireless communication device of FIG. 3; and FIG. 18 is a pseudocode representation of an object-oriented Query class which is instantiated by the wireless communication device of FIG. 3.

DETAILED DESCRIPTION

Figure 1:
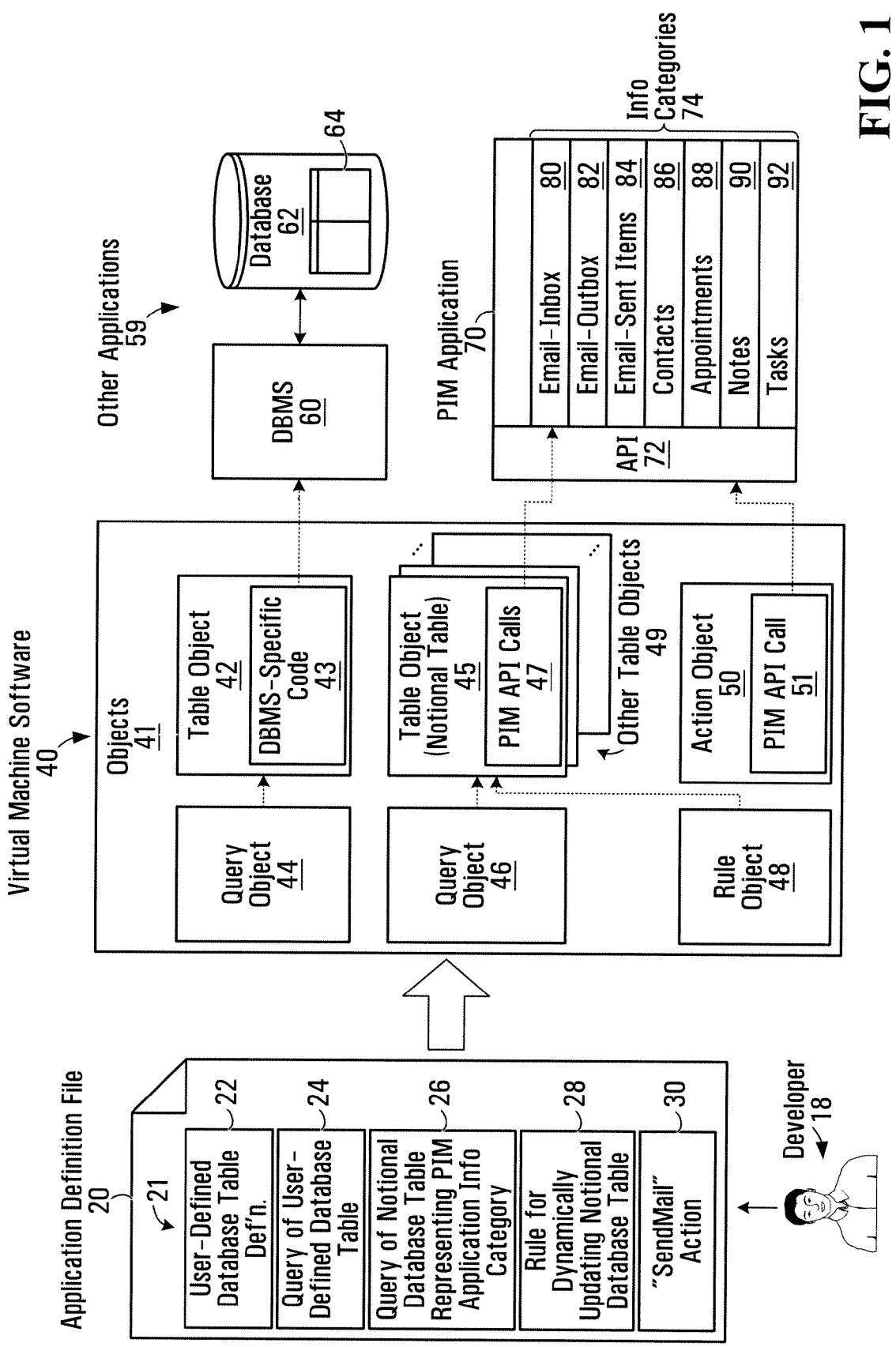
FIG. 1 is a schematic diagram illustrating selected components of a system for presenting data from a server-based application at a wireless communication device.

The present description generally pertains to a method and software for facilitating interaction with a personal information manager application at a wireless communication device. Some embodiments, such as the one described hereinafter, may be implemented in the context of a system for presenting data from a server-based application at a wireless communication device, as described in U.S. Patent Publication No. 2003/0060896 entitled SOFTWARE, DEVICES AND METHODS FACILITATING EXECUTION OF SERVER-SIDE APPLICATIONS AT MOBILE DEVICES for example, which is hereby incorporated by reference hereinto.

In one aspect of the below-described embodiment, there is provided a machine-readable medium comprising instructions that, when executed by a processor of a wireless communication device, adapt said wireless communication device to: receive at least one markup language document containing a markup language definition defining a query of a notional database table, said notional database table having a set of notional fields, each of said notional fields corresponding to a field of a data record within an information category maintained by each of a plurality of wireless communication device-executable personal information manager (PIM) software applications; and instantiate, based on said markup language definition, an instance of at least one object-oriented class containing code for effecting said query through interaction with a PIM software application of said plurality of PIM software applications, said PIM software application being executable at said wireless communication device.

In another aspect of the below-described embodiment there is provided a method comprising, at a wireless communication device: receiving at least one markup language document containing a markup language definition defining a query of a notional database table, said notional database table having a set of notional fields, each of said notional fields corresponding to a field of a data record within an information category maintained by each of a plurality of wireless communication device-executable personal information manager (PIM) software applications; and instantiating, based on said markup language definition, an instance of at least one object-oriented class containing code for effecting said query through interaction with a PIM software application of said plurality of PIM software applications, said PIM software application being executable at said wireless communication device.

In yet another aspect of the below-described embodiment there is provided a machine-readable medium comprising instructions that, when executed by a processor of a computing device, adapt said computing device to: present at least one graphical user interface control for specifying a notional database table corresponding to an information category maintained by each of a plurality of wireless communication device-executable personal information manager (PIM) software applications, said notional database table being characterized by a set of notional fields, each of said notional fields corresponding to a field of a data record within said information category; and generate, based on user interaction with said at least one graphical user interface control, a markup language definition defining a query of said notional database table.

In overview, and referring to FIG. 1, which provides a high-level overview of an exemplary embodiment, a developer 18 interacting with a Rapid Application Development tool (described hereinafter) generates an application definition file 20. The application definition file 20 is a markup language document, such as an Extensible Markup Language (XML) document for example, containing markup language describing various aspects of a "mobile application", i.e., an application to be executed at a wireless communication device (not illustrated). The aspects of the mobile application that are described in this document generally include a graphical user interface for the mobile application defining multiple Graphical User Interface (GUI) screens, a flow of control from GUI screen to GUI screen, and a format of one or more database tables to be used to store data related to the application at the wireless communication device. The mobile application (also referred to simply as an "application") may be designed to exchange messages with and emulate a server-based application for example, as described in U.S. Patent Publication No. 2003/0060896, referenced above. The markup language in the document is interpreted at the wireless communication device by "virtual machine" software 40, which effects the desired functionality described in the application definition file, as described in the above-referenced publication and in Appendix "A" of the present application.

As shown in FIG. 1, application definition file 20 includes a set 21 of five markup language definitions 22, 24, 26, 28 and 30, each defining an aspect (in some cases, a relatively narrow aspect) of the application. Each definition is a markup language fragment containing one or more, possibly nested, markup language elements having markup language attributes.

The first markup language definition 22 defines a format for a database table for storing data related to the application at the wireless communication device herein as described in Appendix "A". The table defined in definition 22 is referred to herein as a "user-defined" table because the user (i.e. developer 18) has defined its structure by way of the RAD tool, which is used to generate the application definition file 20.

The second definition 24 defines a query of the database table that is defined by the first definition 22. A query defines search parameters for extracting desired records from a specified database table at run time. For example, the extracted records may be used to populate a GUI screen of the mobile application with relevant application data at run time, as described in Appendix "A" (see Section 5.2).

The third markup language definition 26 defines a query in a similar manner as the second definition 24, except that the specified database table is not a user-defined table but rather is a pre-existing, notional database table representing a PIM application information category, as will be described.

The fourth markup language definition 28 defines a rule for dynamically updating the notional database table of definition 26 (e.g. adding or updating records in the table) based on messages received from the server-based application for example.

The fifth markup language definition 30 defines a "SENDMAIL" action which, at run time, causes an email message that is "hard-coded" within the definition 30 by developer 18 to be sent to a developer-specified email address upon the occurrence of a specific event, such as the pressing of a button on a GUI screen of the mobile application for example.

When the developer has finalized the application definition file 20, it is downloaded to the wireless communication device and interpreted by the virtual machine software 40 to implement the desired mobile application functionality. At run time, an object 42, 44, 46, 48 and 50 corresponding to each of the five markup language definitions 22, 24, 26, 28 and 30, respectively, is instantiated from the appropriate object-oriented classes, and the data members of the objects are populated with the markup language element and attribute values of the corresponding definitions so as to "customize" the objects for effecting the desired functionality. The objects 42, 44, 46, 48 and 50 are part of an overall set of objects 41 instantiated by the virtual machine software 40 responsive to the application definition file 20 for implementing the overall functionality of the mobile application.

In order to implement the functionality defined within the set of definitions 21, the virtual machine software 40 interacts with other applications 59 hosted at the wireless communication device, namely, a database management system (DBMS) 60, having an associated database 62, and a PIM application 70. The interaction is motivated or governed by the markup language definitions 21, however, the details of the interaction are "hard-coded" within the objects 42, 44, 46, 48 and 50 and thus are transparent from the perspective of developer 18. This is done intentionally, so that the developer is not required to learn the low-level details of the interaction.

For example, table object 42 invokes DBMS-specific code 43 at run time for the purpose of creating and accessing a database table 64 within database 62, which table 64 is consistent with the user's table definition 22. Query object 44, on the other hand, invokes methods (i.e. routines) within table object 42 to effect a query of the table 64 at run time that is consistent with the user's query definition 24.

In another example, query object 46 may invoke methods of table object 45 in order to access information stored within one of the information categories 74 maintained by the PIM application, such as the email inbox category 80. Unlike table object 42, table object 45 is not instantiated based on a markup language table definition 22 however. Rather, the table object 45 is "hard-coded" or pre-existing within the virtual machine software 40. This is due to the fact that the structure of the notional table that is used to abstract the information category 80, in terms of the notional fields that make up individual records of the table, is predetermined so as to correspond to (predetermined) data fields of a data record within information category 80 within the PIM application 70. These notional fields also correspond to fields of a data record within information category 80 in other wireless communication device-executable PIM applications with which the virtual machine software 40 may intercommunicate on other types of wireless communication devices. The table object 45 simply provides a convenient mechanism for accessing or manipulating data within the information category 80. It allows that PIM information category 80 (i.e. the email inbox) to be made to appear to the developer 18, as a database table having a predetermined name and predetermined fields. The fields represent common data fields within email inboxes which would exist in any PIM application that the developer 18 may attempt to access by way of table object 45. When the developer 18 uses the RAD tool to author query definition 26 which defines a run-time access or manipulation of PIM data, the developer 18 can refer to the predefined table and its notional fields by name in the same way as he refers to a table and fields of a user-defined table, without actually having to define the table from scratch within the application definition file 20 as he must do for user defined database tables. Indeed, the developer 18 cannot define the table in the application definition file 20, since the notional fields are predetermined. In the case of information category 80 (i.e. an email inbox), the notional fields include only the data fields that are common to email inboxes across a number of PIM applications with which the virtual machine software 40 may interact on different wireless communication devices. Thus the developer 18 can advantageously define and use markup language-defined queries, whose format should be familiar to him based on his past authoring of queries for accessing user-defined database tables, to access PIM data. From the perspective of developer 18, PIM data is accessed or manipulated by way of a notional database table operation (e.g. add, delete or update record). The format of the markup language-defined queries is the same regardless of whether the table is notional or user-defined. That is, in both cases, the markup language definitions conform to the same markup language schema (not illustrated). Meanwhile, the actual operation is effected by table object 45, in the form of PIM API calls 47 to PIM API 72 which may be proprietary or specific to the PIM application 70, in a manner that is transparent to the developer.

The table object 45 may be used by a rule object 48 to dynamically update the content of notional database table (i.e. PIM email inbox data) based on messages received at the wireless communication device at run time. The impact of a message upon PIM data is conveniently expressed in the form of a conventional database operation (e.g. add, delete or update record). The table object 45 essentially "translates" the conventional database operations to one or more appropriate PIM API calls 47 that achieve the desired result.

For each of the remaining information categories 82, 84, 86, 88, 90 and 92 of PIM application 70, a table object analogous to table object 45 for accessing the relevant category of PIM data also exists within objects 41. These table objects are collectively referred to as table objects 49.

As well, an action object 50 makes appropriate PIM API calls 51 to cause an email message to be sent by PIM application 70 upon the occurrence of a specified event. The email addressee(s) and the substance of the email message are defined by the developer 18 within the markup language definition 30. From the developer's perspective, all that must be done in order to cause virtual machine software 40 to send an email message to a specified addressee at run time is to create a "SENDMAIL" action 30 in the application definition file 20. This results in an appropriate PIM API call 51 to PIM API 72 by action object 50 at run time for sending the desired email message, of which the developer 18 need not be aware. The developer 18 is thus shielded from the details of using the (PIM application-specific) PIM API 72 for causing an email message to be sent from virtual machine software 40.

Figure 2:
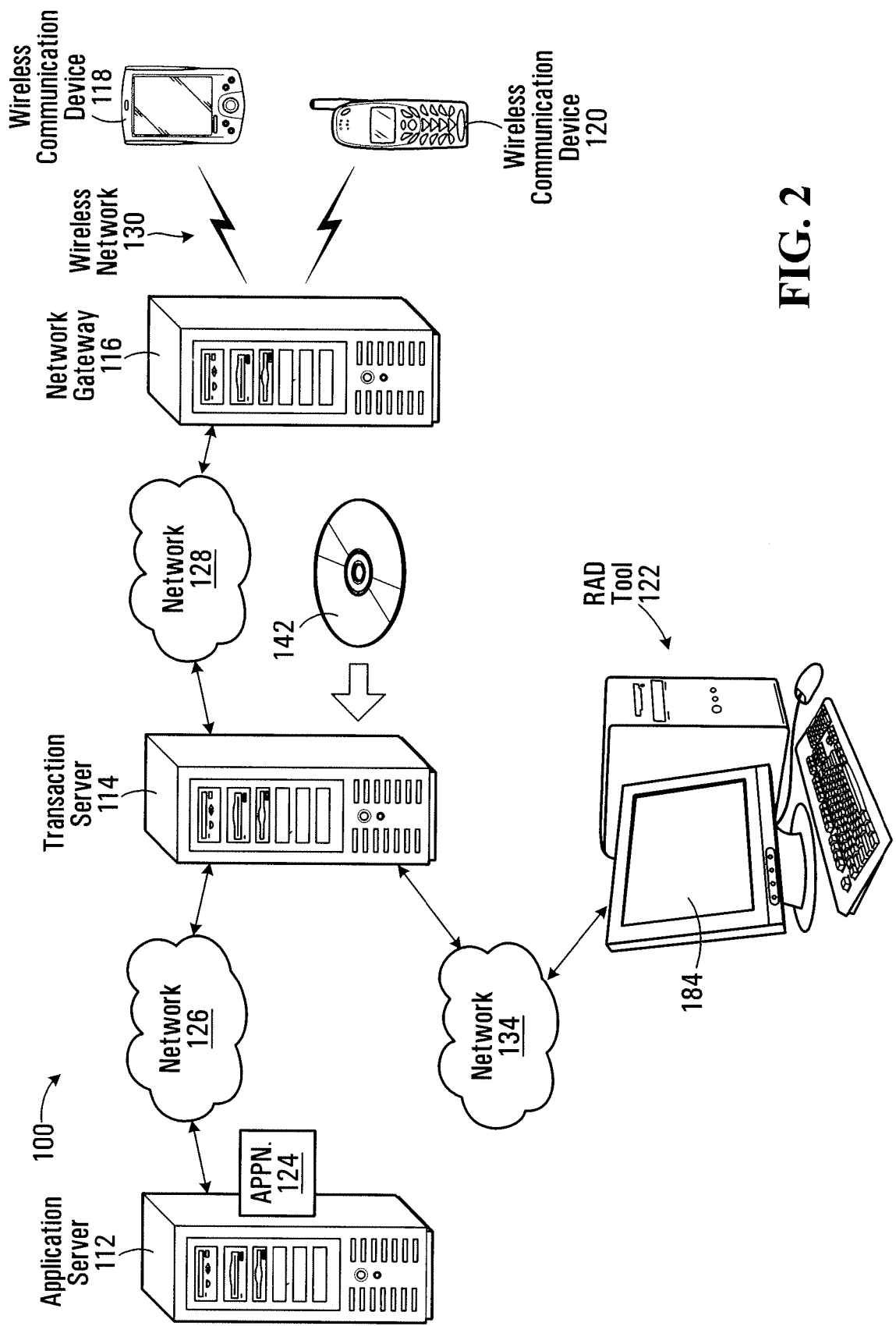
FIG. 2 is a schematic diagram illustrating a system for presenting data from a server-based application at a wireless communication device.

FIG. 2 is a schematic diagram illustrating an exemplary system 100 for presenting data from a server-based application at a wireless communication device. This embodiment is an enhancement of the system described in U.S. Patent Publication No. 2003/0060896 (the latter is referred to herein as the "baseline system"). The enhancement facilitates interaction between the virtual machine software 40 and a personal information manager application at a wireless communication device.

The system 100 of FIG. 2 includes an application server 112, a transaction server 114, a network gateway 116, a pair of exemplary wireless communication devices (also referred to as "mobile devices" herein and in U.S. Patent Publication No. 2003/0060896) 118 and 120, and a Rapid Application Development (RAD) tool 122. The application server 112, transaction server 114, network gateway 116, and wireless communication devices 118 and 120 are analogous to the application server 70, middleware server 44, network gateway 40, and mobile devices 10 and 30, respectively, of U.S. Patent Publication No. 2003/0060896, and will thus not be described in great detail, except to the degree that these components are modified from their implementation as described in the above-noted publication.

Application server 112 is a server which hosts at least one conventional software application 124 to which wireless communication device access is desired. The application 124 receives and generates data. The role of system 100 is to present data generated by the application 124 at wireless communication devices 118 and/or 20 and to send data generated at wireless communication devices 118 and/or 120 (e.g. responsive to user interaction with the devices) back to the application 124. The application server 112 sends and receives this data to and from transaction server 114 over a data network 126, which may be the Internet or a private data network for example, e.g. using HTTP running on top of a standard TCP/IP stack. In the present embodiment, the application 124 is an electronic mail (email) application, however in alternative embodiments, application 124 could be another type of application.

Transaction server 114 corresponds to middleware server 44 of U.S. Patent Publication No. 2003/0060896. As described in that publication, the role of transaction server 114 is essentially twofold. First, the transaction server 44 stores application-specific markup language documents (referred to as application definition files in the above-noted U.S. patent publication and hereinafter) for downloading by wireless communication devices 118, 120 desirous of presenting data from an application 124 executing at application server 12. The application definition files dictate the behavior and user interface (GUI) of the wireless communication devices. Second, once presentation of data from application 124 at a wireless communication device 118 or 120 has begun, the transaction server acts as an intermediary for communications between the application server 112 and the wireless communication device 118 or 120.

Network gateway 116 is a gateway between data network 128, which may be the Internet or a private data network for example, and a wireless network 130. In combination, data network 128, network gateway 116, and wireless network 130 facilitate communication of application data between the transaction server 114 and wireless communication devices 118 and 120.

Wireless communication devices 118 and 120 may for example be two-way paging devices, WinCE based devices (e.g. Pocket PC devices), PalmOS devices, Wireless Application Protocol (WAP) enabled mobile telephones, or the like, which are capable of presenting data from remote applications as described in detail in the above-referenced U.S. Patent Publication. In the illustrated embodiment, wireless communication device 118 is of a different type than device 120, i.e., it executes a different operating system and may have different physical characteristics such as differently sized display screen or different processor. Each device 118 and 120 also hosts a PIM application. The PIM application hosted at the device 118 is different from the PIM application hosted at device 120. However, as will be appreciated, the virtual machine software hosted at each of devices 118, 120 is tailored to the local PIM application.

RAD tool 122 is a computing device 120, such as an Intel®-Processor based personal computer (PC) for example, executing software that allows a developer to create master definition files for uploading to transaction server 14. A master definition file is a markup language document similar to an application definition file, except that its contents may dictate user interface appearance and control flow of a mobile application for more than one type of wireless communication device. Application definition files are created from master definition files at transaction server 114, as described in the above-referenced U.S. Patent Publication No. 2003/0060896. Application definition files 20 are downloaded to wireless communication devices 118 and 120 where they are interpreted by virtual machine software. Uploading of the master definition file to from the RAD tool 122 to the application server 114 may be performed over a data network 134, which may be the Internet or a private data network for example.

Figure 3:
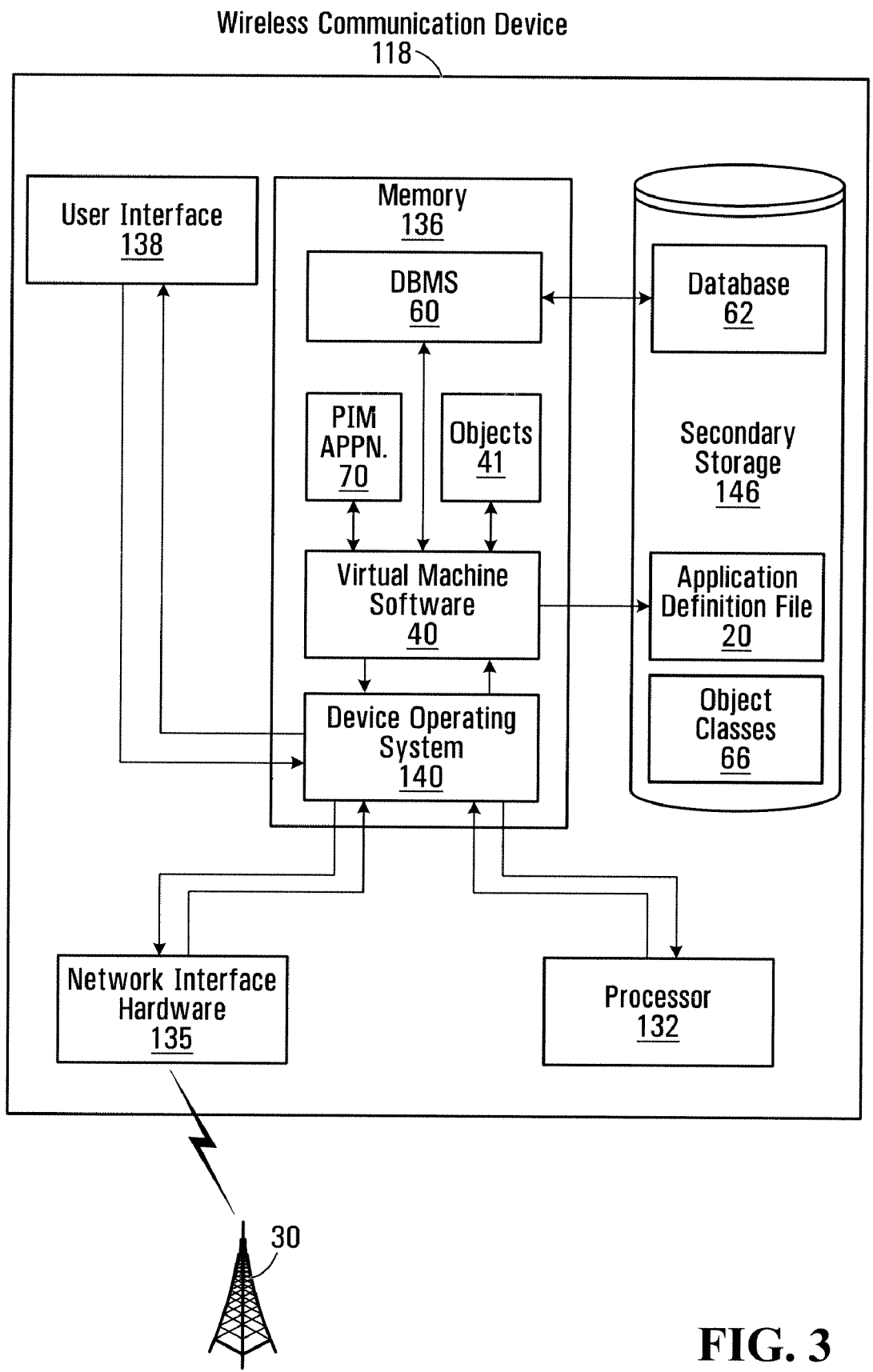
FIG. 3 is a schematic diagram illustrating a wireless communication device component of the system of FIG. 2 including virtual machine software.

FIG. 3 illustrates wireless communication device 118 in greater detail. Wireless communication device 118 may be any conventional wireless communication device, modified to function in the manner described below. As such, wireless communication device 118 includes a processor 132 in communication with a network interface 135, storage memory 136, a user interface 138, and local storage 146.

Network interface 135 enables device 118 to transmit and receive data over a wireless network 130.

Memory 136 is volatile memory such as static random access memory (SRAM). At run time, memory 136 stores an operating system 140, virtual machine software 40, a database management system 60 and a PIM application 70.

Operating system 140 is software representing a mobile operating system, which in the case of device 118 is the WinCE operating system. Operating system 140 includes graphical user interface and network interface software having suitable application programmer interfaces (APIs) for use by applications executing at device 118. The operating system 140 is different from the operating system executing on the other wireless communication device 120 (FIG. 2), which may be the PalmOS operating system for example.

Virtual machine software 40 is software that enables wireless communication device 118 to present a user interface for server-side applications such as application 124 (FIG. 2). The virtual machine software 40 may be downloaded over wireless network 130 to the device 118 from transaction server 114, where it may be stored as instructions (e.g. machine-executable code) on a machine-readable medium such as a hard disk drive or a removable optical disk 142 (FIG. 2) for example. As previously noted, the operation of virtual machine software 40 is governed by the application definition file 20. Virtual machine software 40 is described below in greater detail.

Database management system (DBMS) 60 is a conventional DBMS which facilitates storage of data to and manipulation of data from database 62 which is resident in secondary storage 146 of device 118. DBMS 60 may be a commercially available database management system, such as Sybase™, Microsoft® Pocket Access, Microsoft® SQLCE, Oracle, or J2ME MIDP storage, for example, capable of execution at a wireless communication device. DBMS 60 is capable of executing queries, such as structured query language (SQL)-type queries, for extracting desired data from the database 62. DBMS 60 provides an Application Programming Interface (API) for query execution.

PIM software application 70, in the present embodiment, is the Microsoft Outlook™ computer program for devices executing the WinCE operating system. As described above, PIM application 70 provides email capability and maintains personal information in distinct information categories. The information categories that are maintained include an email message inbox 80, a email message outbox 82, a set of previously transmitted email messages or "sent items" 84, an address book containing contact information 86, a scheduling calendar 88, notes 90, and a list of tasks 92 to be completed.

User interface 138 provides a mechanism for entering data at wireless communication device 118 and for viewing a displayed graphical user interface. The interface 138 typically includes a keypad and a display such as a touch-screen.

Secondary storage 146 is non-volatile memory, such as flash memory for example, which stores an application definition file 20, and a database 62, described below.

Application definition file 20 is an application-specific markup language document which governs the operation of the wireless communication device 118. In the present embodiment, the application definition file 20 is an Extensible Markup Language (XML) document. The XML may for example be formed in accordance with the Extensible Markup Language (XML) 1.0 (Third Edition) W3C Recommendation dated 4 Feb. 2004, which is provided at www.w3.org/TR/2004/REC-xml-20040204/and is hereby incorporated by reference hereinto. The XML document contains a markup language definition 22 (FIG. 1) defining a query of a notional database table which represents an information category maintained by the PIM application 70, in addition to other markup language definitions 24, 26, 28 and 30 (FIG. 1) described previously. Based on the XML elements (including any attributes thereof) contained in the application definition file 20, the virtual machine software 40 instantiates corresponding objects at run time to present data from the server-side application 124 and to accept user input for transmission back to the application 124 at application server 112, as will be described.

Database 62 comprises one or more electronic files storing data related to application 124 for access by the virtual machine software 40 via DBMS 60. In the present embodiment, the data is stored in tables, such as table 64, within the database 62. Each table contains records (rows) with user-defined fields (columns). The database 62 may for example be a relational database, but this is not required.

Object classes 66 are precompiled classes (object code) authored in an object-oriented language such as Java or C++. Each class corresponds to an XML element that may be defined within the application definition file 20. A description of most of the XML elements which may appear within the file 20 is provided in the AIRIX™ markup language (ARML) specification of Appendix "A" attached hereto; other XML elements, such as those associated with markup language definitions 26, 28 and 30 (FIG. 1), are described in the remainder of the description. A person of ordinary skill will readily appreciate that these collective XML entities are exemplary only, and may be extended, or modified as desired. The collective XML entities may be defined by way of a Document Type Definition (DTD) or other XML schema, both of which are well known in the art. At run time, the virtual machine software 40 instantiates one or more instances of at least some of object classes 66 in memory 136 of wireless communication device 118 (FIG. 3) based on XML elements appearing within application definition file 20 and their attributes. The objects 41 of FIG. 1 are examples of such instances. Each object class 66 (FIG. 3) defines methods which capture certain behaviours that are performed by all instances of the class (e.g. a button class may include a highlight( ) method which, if invoked for any instance of the button class, executes the same code to cause the relevant button to become highlighted), as well as data members which are set upon instantiation of a class instance in order to "customize" the characteristics or behavior of the instance (e.g. the button class may also include X and Y coordinate data members which are set to unique values for each button class instance to define a unique location for the represented button on an encompassing GUI screen). The classes 66 may be loaded from machine-readable medium 142 (FIG. 2) along with the rest of the virtual machine software 40.

The structure of wireless communication device 120 is similar to that of wireless communication device 118, with the exception of its operating system and certain physical characteristics, such as display size for example.

Figure 4:
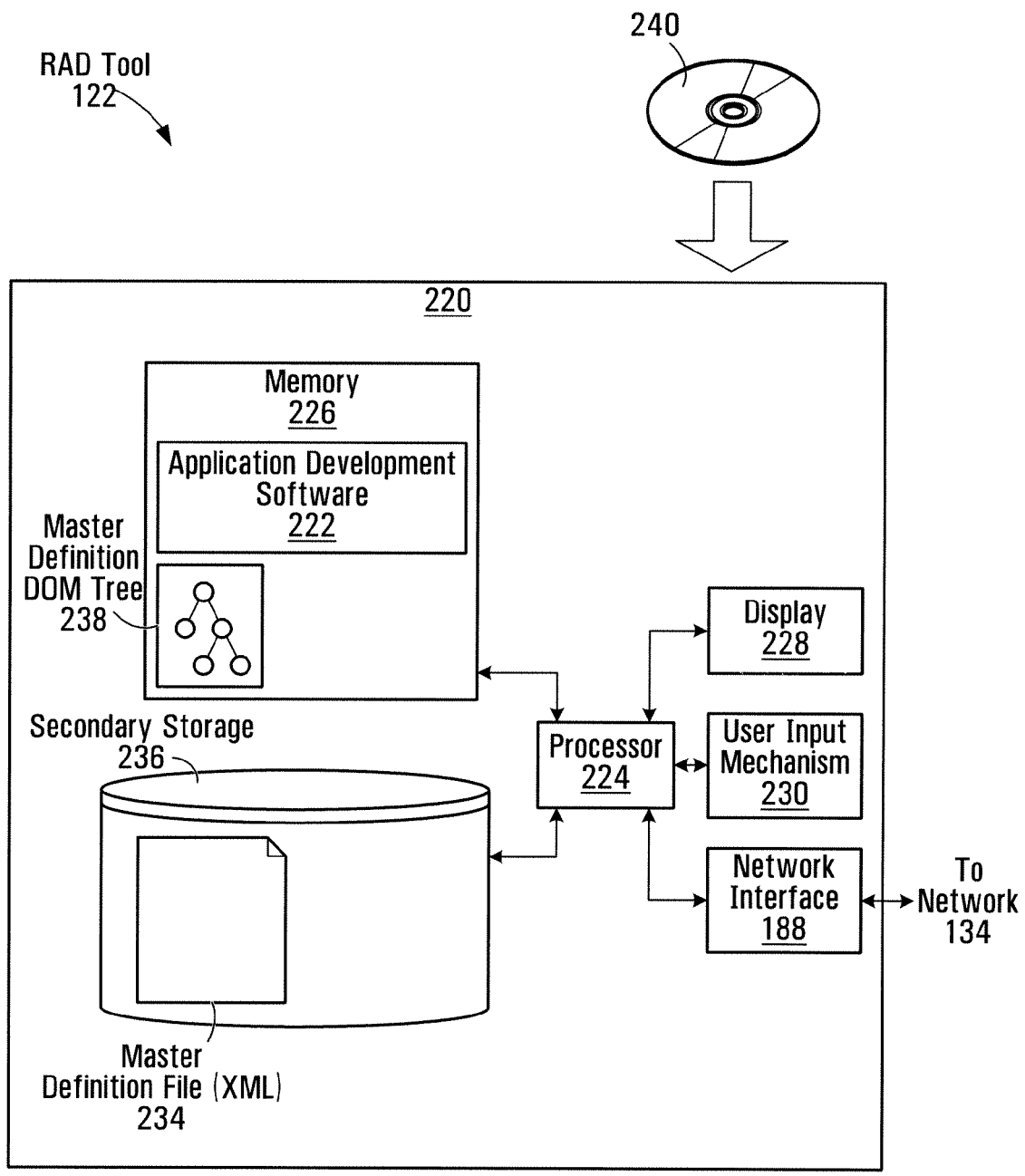
FIG. 4 is a schematic diagram illustrating a rapid application development (RAD) tool component of the system of FIG. 2 in greater detail.

FIG. 4 schematically illustrates the RAD tool 122 of FIG. 2 in greater detail. In the present embodiment, the RAD tool 122 is a PC 220 executing application development software 222. The PC 220 includes a processor 224 in communication with memory 226 which stores software 222. The PC 220 further includes a conventional display 228, such as a Cathode Ray Tube (CRT) monitor or flat-screen display for example, and a conventional user input mechanism (UIM) 230, such as a keyboard and/or a mouse for example. The PC 220 further includes a network interface card 188 (e.g. an Ethernet interface) which facilitates communication by the tool 122 over network 134, e.g. for purposes of uploading a master definition file 234 to the transaction server 14.

The application development software 222 provides a graphical user interface which facilitates "drag and drop" development of mobile applications. As a user develops a mobile application using UIM 230, the RAD tool 122 automatically generates a dynamically-accessible representation of the corresponding hierarchy of XML elements (e.g. in accordance with Appendix "A" within memory 226 and the below description) in the form of a master definition Document Object Model (DOM) tree 238 data structure. A DOM tree is essentially a dynamically-accessible representation of an XML document that is well understood in the art (DOM trees are described at www.w3.org/DOM/). The RAD software 222 may be implemented as a set of plug-ins to a generic integrated design environment (IDE) framework such as the Eclipse framework. As is known in the art, the Eclipse platform is designed for building integrated development environments that can be used to create various applications such as web sites, embedded Java™ programs, C++ programs, and Enterprise JavaBeans™ for example. The platform exposes mechanisms to use and rules to follow to tool providers via well-defined APIs, classes and methods. Application development software 222 may be written in Delphi, using an SQL Server database for example, and may be loaded into PC 220 from a machine-readable medium, such as an optical disk 240.

The master definition file 234 in secondary storage 236 is a serialized representation of the master definition DOM tree 238. The master definition file 234 is created by the application development software 222 when the user indicates that development of the mobile application is complete. The file 234 is stored in secondary storage 236 pending its transmission to the transaction server 114, where it is used to create an application definition file 20 that is downloaded to the wireless communication device 118.

In operation, a developer uses the RAD tool 122 (FIG. 4) to develop a mobile application for the wireless communication device 118. To develop a mobile application, the developer: designs one or more graphical user interface screens along with the screen-to-screen control flow for the mobile application; specifies a format of data (e.g. XML packages) to be exchanged with the server-side application 124 via wireless network 130 (FIG. 2); and specifies a format of data (e.g. a database table such as table 64 of FIG. 1) for storing application data in database 62 (FIG. 2).

The procedure for developing a mobile application consists of creating a visual hierarchy or "tree" of icons which correlates to a logical hierarchy of XML elements (e.g. as defined in Appendix "A" and as further defined below) using application development software 222. Each icon represents a building block of the application (e.g. a GUI screen, a database table, a database query, etc.) and corresponds to a defined XML element having (in most cases) associated attributes. As a user creates icons and assigns properties to them, the RAD tool 122 automatically generates a dynamically-accessible representation of the corresponding hierarchy of XML elements and attributes within memory 226 within the master definition DOM tree 238 data structure. When the user of tool 122 has completed development of the mobile application, the application is "published", i.e. the master definition DOM tree 238 is serialized to form a master definition file 234.

Figure 5:
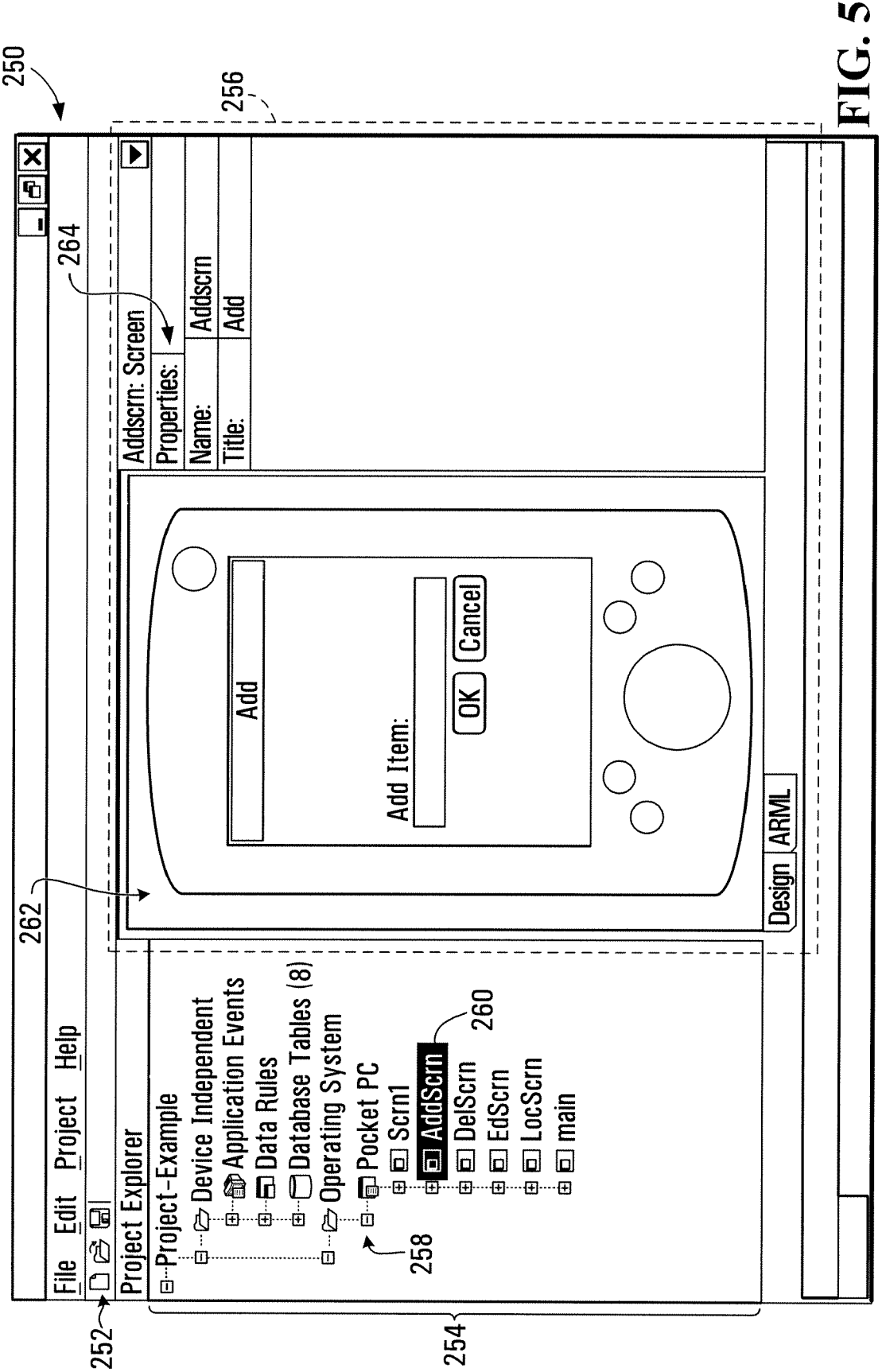
FIG. 5 illustrates a graphical user interface (GUI) of the RAD tool component of FIG. 4.

The RAD software 222 presents a GUI 250 as shown in FIG. 5 to facilitate mobile application development. The GUI 250 includes various components, such as a toolbar 252, a project explorer 254, and a main design area 256.

The toolbar 252 provides a menu list and icons for performing various development activities during mobile application development, such as creating or opening a project (which corresponds to a mobile application) or serializing a master definition file DOM tree 238 to create a master definition file 234.

The project explorer 254 contains a visual hierarchy of icons 258 that is created by the developer to represent the mobile application. A detailed view of an exemplary project explorer is provided in FIG. 6.

The main design area 256 is for displaying an application component, such as a GUI screen or GUI screen component, whose icon 260 is currently selected in the project explorer 254. This area may include a screen designer window 262 and a properties window 264. When an icon 260 is selected in the visual hierarchy, a graphical representation of the relevant component—a GUI screen in the case of icon 260—is displayed in the screen designer window 262, and its properties are displayed in the properties window 264. The screen designer is a "screen painter" which displays a graphical representation of the relevant wireless communication device type (a "virtual device") for which GUI screens are being created. In FIG. 5, a virtual Pocket PC device is show in the screen designer 262. The screen designer 262 permits a developer to design a GUI screen by dragging and dropping display elements (such as textual components, buttons, edit boxes, or other widgets) to the virtual device screen in the window, offering a "what you see is what you get" (WYSIWYG) view of the GUI screen under development. The properties window 264 displays the properties of a currently selected GUI component and allows them to be modified. The properties of a selected component generally correspond to attributes of an XML element within the master definition file DOM tree 238 corresponding to the selected component.

Figure 6:
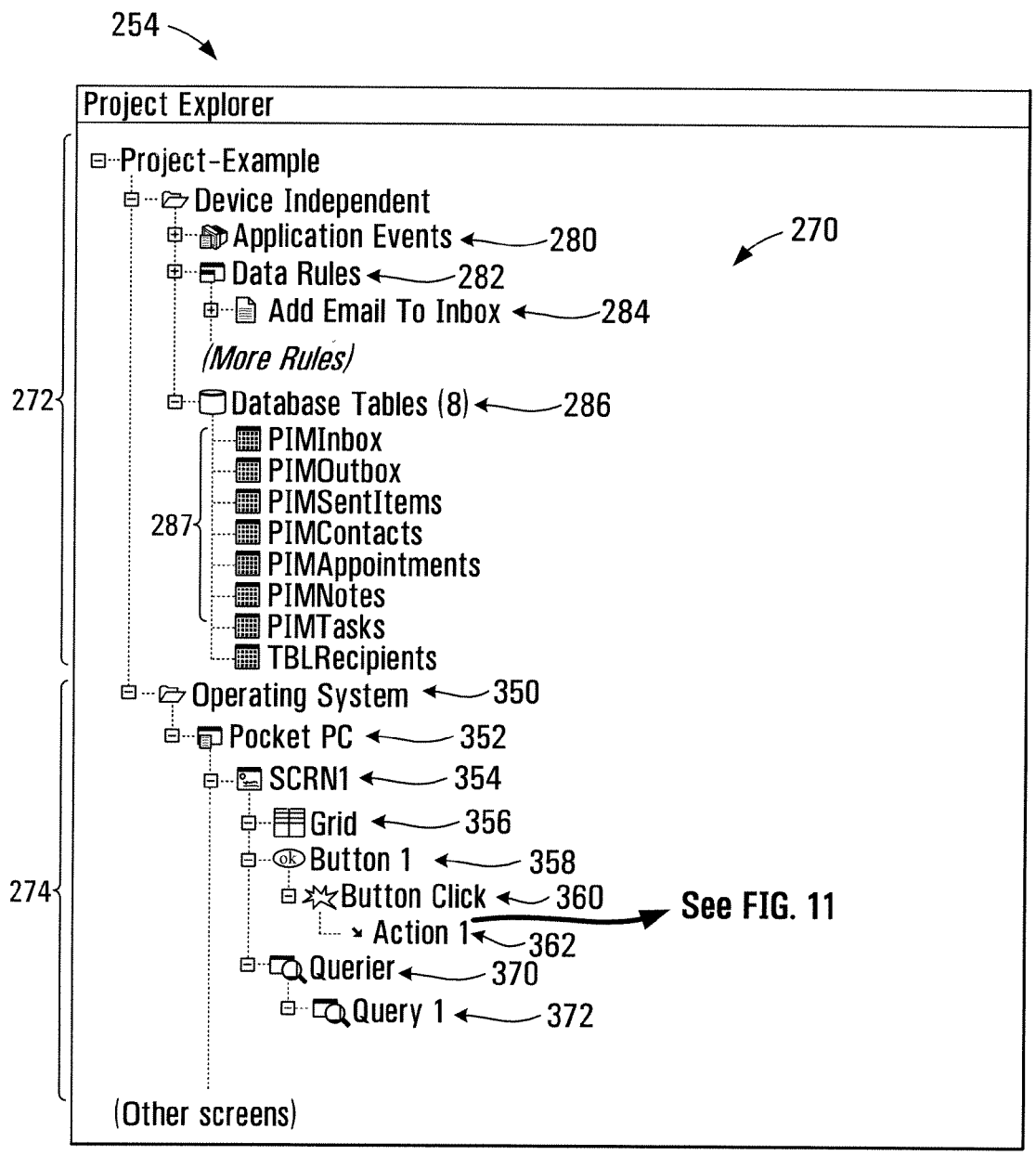
FIGS. 6 and 7 illustrate aspects of the GUI of FIG. 5 in greater detail.

FIG. 6 illustrates a project explorer 254 containing an exemplary visual hierarchy of icons 270 including icons representing a set of notional database tables, a query of a notional database table, a data rule (or simply "rule") for dynamically updating a notional database table at run time based on an incoming message, and a "SENDMAIL" action which causes PIM application 70 (FIG. 1) to send an email message to a developer-specified email address upon the occurrence of a specific event. In certain respects, the hierarchy is similar in appearance to a graphical directory and file structure representation of a conventional operating system. Hierarchy branches are collapsible. When collapsed, a "+" symbol is displayed; when expanded, a "−" symbol is displayed. The visual hierarchy 270 includes platform-independent components 272 and platform-specific components 274.

Platform-independent components 272 are application building blocks which are present in each platform's version of the mobile application. Put another way, all application definition files which will ultimately represent the mobile application at a wireless computing device will contain components 272, regardless of the platform of the device. Platform-specific components 274, on the other hand, may differ between wireless communication devices of different types, such as devices 118 and 120. Typically, it is the GUI screens of a wireless communication device application which will differ in some measure between wireless communication device types, due to differences in the capabilities of the devices (e.g. display/screen size and supported display elements).

As shown in FIG. 6, the platform-independent components 272, which comprises the Device Independent branch of the visual hierarchy 270, include application events 280, data rules 282 and database tables 284.

Application events 280 are definitions of occurrences which trigger processing within the mobile application regardless of the application's status (e.g. regardless of which GUI screen is presently displayed). For example, the receipt of an XML package (a form of message) at the wireless communication device 118 or 120 at run time can be defined as an application level event. Beyond application level events, a developer may also define screen level events (arrival of an XML package when a specific GUI screen is displayed) and control level events (user manipulation of a GUI control such as a button press), however these are defined in the platform-specific constructs branch 274. It is noted that at least one action is normally defined in conjunction with each event to define the processing that will occur upon the occurrence of the event.

Data rules 282 dictate how XML packages received from enterprise applications such as application 124 affect data stored in database tables associated with an application. A rule defines which field(s) of a user-defined table or a notional database table representing a PIM information category (referred to as a "notional PIM table", described below) will be impacted by incoming data and the nature of the impact. Because rules make reference to database tables, if a rule pertains to a user-defined table, logically the rule should be defined after the table has been defined. If the rule pertains to a notional PIM table, the rule can be defined at any time because notional PIM tables are pre-existing (i.e. their definitions are hard-coded in the hierarchy 270 at 287). Like application-level events 280, data rules 282 are wireless computing device type-independent. It is noted that rules can also be used to dictate the manner in which changes should be applied to database tables from XML created in an outgoing XML transaction in the context of an ARML action (although that is not a focus of the present description).

The procedure for defining a rule may be as follows. The icon corresponding to the Data Rules section 282 may initially be selected with a mouse (or similar user input mechanism 230) of the RAD tool 122 (FIG. 4). A right-click (or similar user action) may cause a pop-up menu to be displayed. The pop-up menu may present a list of options in the context of the selected data rules section 282. An "Add Rule" option may permit the user to define a new rule. Selection of that menu option may cause a new rule icon 284 to be created below icon 282, as shown in FIG. 6, and a Rule Properties window 290, as shown in FIG. 7, to be displayed in the main design area 256 (FIG. 5).

Figure 7:
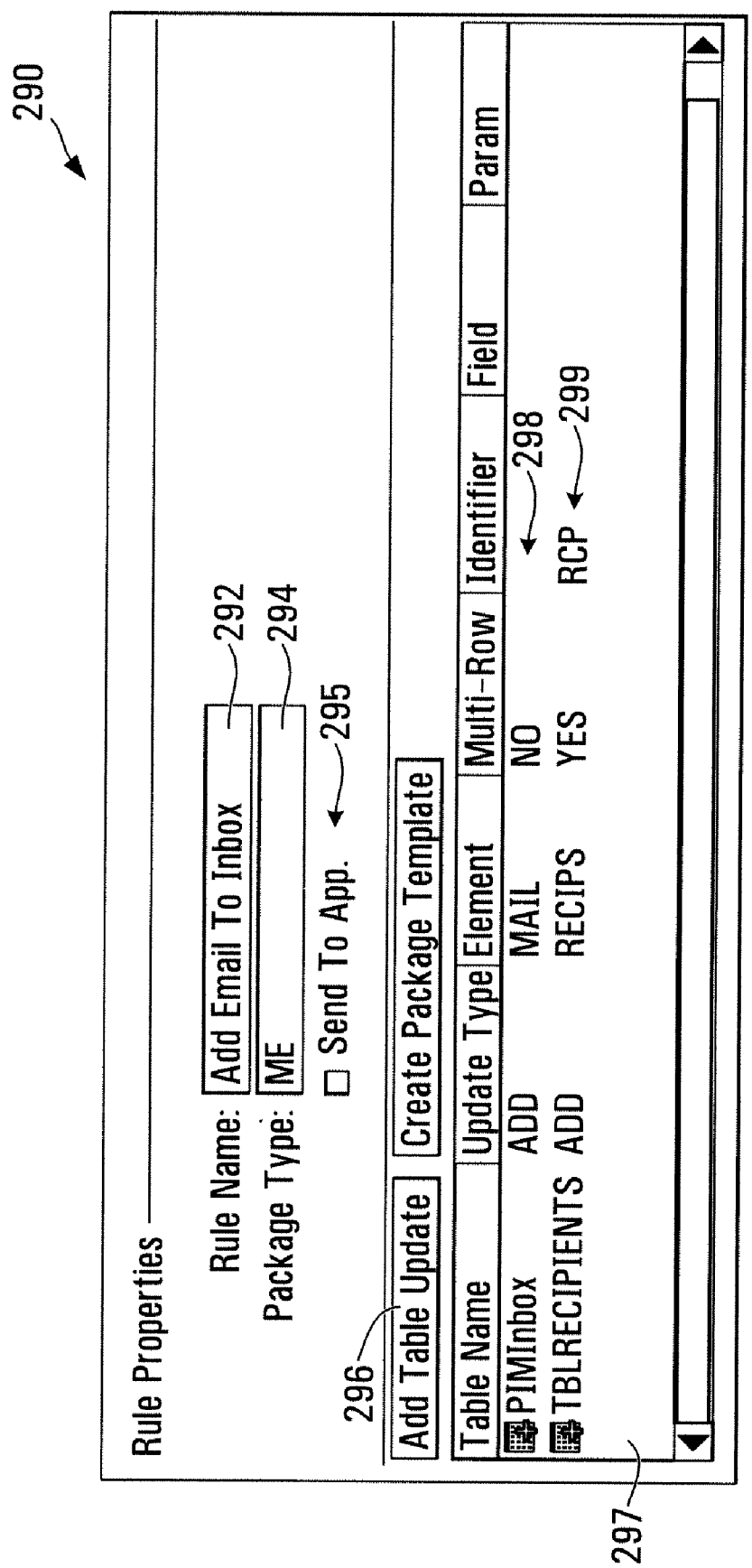

Referring to FIG. 7, the Rule Properties window 290 permits the user to enter properties of the newly defined rule. The window 290 includes a Rule Name text field 292 for user entry of a rule name for identifying the rule. The name that is entered in field 292, "AddEmailToInbox", will be displayed as part of the icon 284 (see FIG. 6).

A Package type field 294 (FIG. 7) allows the user to specify the name (i.e. package type) of the XML package whose receipt at the wireless communication device 118 will trigger the table updates defined by the present rule. It is the responsibility of the developer to know the name of this XML package, which is generated by the back-end application 124 (FIG. 2). The name should match the TYPE attribute of the PKG element of the relevant XML package. For example, assuming that the XML package 300 shown in FIG. 8 is the package to be processed by the present rule, the package type "ME" (shown at FIG. 8, line 2) is entered in field 294, as shown in FIG. 7. The term "{wrapper tags}" (line 1) refers to the ARML header XML elements (omitted for brevity) that surround the package so that the transaction server 114 and virtual machine software 40 knows which application and device (here, application 124 and application server 112) the package from. In the illustrated embodiment, these are added by the application server 112 (FIG. 2) before submitting the package to the transaction server 114.

Referring to FIG. 7, the Send to App check box 295 should be checked if the rule defined in Rule Properties window 290 pertains to the processing of an "outgoing" XML package (i.e. an XML package that is generated at the wireless communication device 118 and sent back to the application server 112 of FIG. 2 at run time). In the present example, the rule defines processing for an incoming package, thus check box 295 is left unchecked.

The rules for modifying one or more user-defined or notional PIM database tables are specified in grid 297 of window 290 in the form of one or more table updates. A table update specifies the modifications to be made to a single user-defined database table or notional PIM database table when the relevant package is processed (i.e. received, in the present example) at the wireless communication device 118 at run time. A table update is added by selecting the Add Table Update button 296. Each table update appears as a row within the grid 297 and represents a particular type of update (e.g. add record, delete record or update record) to a specified table. In FIG. 7, the grid 297 contains two table updates 298 and 299.

Referring first to table update 298, the table to be modified, "PIMINBOX", is indicated in the "Table Name" column of grid 297. The "PIM" prefix the table name identifies the table as a notional PIM database table in the present embodiment. To specify this name, the user may select from a drop-down list identifying by name all of the pre-existing notional PIM database tables and user-defined tables (also represented iconically in the "Database Tables" branch 286 of FIG. 6, described below). As is known in the art, each selectable entry within a drop-down list is a form of selectable GUI control. The value "ADD" of the "Update Type" column indicates that the present table update specifies an addition of a record to the named table. To specify an overwrite or update of specified fields in a table, the update type should be set to "UPDATE"; alternatively, to delete specific records, the update type should be set to "DELETE". If the Update Type had been "UPDATE" or "DELETE", a Where Field is typically specified in the "Identifier" column of grid 297. When indicated, the Where Field, in conjunction with a Where Parameter in the "Param" column, effectively specify a where clause for identifying records of the named table ("PIMINBOX") to which the table update 298 should be made. For example, if the "Identifier" column contained the value "VARFROM" and the "Param" column contained the value "FROM", table update 298 would only be applied to rows of the PIMINBOX table in which the VARFROM field matches the value of the "FROM" parameter (i.e. "Joe Smith"—see FIG. 8, line 3) of the received XML package.

The value "MAIL" of the "Element" column of grid 297 identifies the section of the relevant XML package within which the data to be ADDed to the PIMINBOX table is to be found. The term "section" merely refers to an XML element (or set of nested XML elements) within the XML package. For example, the "MAIL" section is shown at lines 3-6 of FIG. 8, and contains a nested "DATA" element.

The value "NO" of the "Multi-row" field column of grid 297 indicates that identified section, "MAIL", of the XML package associated with the rule contains only one "data record" (i.e. XML element) to be processed.

The table update 298 also has a number of associated parameter-field associations (not shown in FIG. 7). A parameter-field association evidences a relationship between a parameter within the XML package (which is either an XML element or an XML attribute) and a data field within the relevant table to be updated. When the XML package is processed at run time, for each parameter-field association defined for a table, the value of the specified parameter within the package is written to the specified field of the relevant table. For table updates of type ADD or UPDATE, at least one parameter-field association should be specified in order to indicate the manner in which the XML package impacts upon the relevant table (which is either a user-defined database table or notional PIM database table). For table updates of type DELETE, no parameter-field associations are required, as the latter type of update simply results in the wholesale deletion of one or more records from the relevant table.

For each parameter-field association that is specified, the parameter type is specified as either an attribute or an element of the XML package. A parameter type of "attribute" indicates that the update data for the specified data field of the table is located in an attribute of either the XML element named in the "Element" column of grid 297 or in a nested XML element identified in the "Identifier" column (in the case where Multi-Row Elements has a value of "YES"). In contrast, a parameter type of "element" indicates that the update data for the specified data field of the table is the value of the XML element identified in the "Identifier" column, whether it is a nested element (e.g. as in the case where Multi-Row Elements has a value of "YES") or a root-level element. Access to nested elements could alternatively be facilitated by using XPATH, which should be familiar to those of skill in the art.

It is noted that, if more than one parameter is specified within a table update, only a single parameter should have an "element" Parameter type. The remaining parameters in the update should have "attribute" parameter types. This is due to the fact that an XML element will have only one value but may have many attributes.

For the table update 298 of FIG. 7, four parameter-field associations are defined, as shown in Table 1 below:

TABLE 1

Exemplary Parameter-Field Associations

| PARAMETER | FIELD | PARAMETER TYPE |
|---|---|---|
| MSGID | LNGMESSAGEID | Attribute |
| FROM | VARFROM | Attribute |
| SUBJECT | VARSUBJECT | Attribute |
| MAIL | MEMBODY | Element |

The names in the "FIELD" column of Table 1 above are commensurate with the PIMINBOX table definition under the "Database Tables" branch 286 of FIG. 6, which is discussed in more detail below.

The second table update 299 of FIG. 7 is similar to table update 298, except that the table identified in the "Table Name" column of grid 297 is a user-defined table (as indicated by the "TBL" prefix) rather than a notional PIM database. Also, the value "YES" in the "Multi-row" field column of grid 297 indicates that identified section, of the XML package ("RECIPS") contains multiple "data records" (i.e. XML elements) to be processed, each named "RCP" (see lines 7-14 of FIG. 8). The parameter-field associations for table update 299 would be similarly specified, but are omitted for brevity.

It is noted that, as a general rule of thumb, the field identified within a database table as the primary key should not be updated by table updates. This is to guard against updates which might inadvertently cause the primary key to lose its uniqueness within the table.

Additional rules beyond rule 284 may be defined within the visual hierarchy of icons 270 (FIG. 6).

The database tables 286 section of the hierarchy 270 contains definitions of two types of tables: notional PIM database tables and user-defined database tables. Eight tables in total are defined in FIG. 6. Each is represented by a distinct icon in the database tables 286 section.

The first seven tables 287, PIMINBOX, PIMOUTBOX, PIMSENTITEMS, PIMCONTACTS, PIMAPPOINTMENTS, PIMNOTES, and PIMTASKS, are notional PIM database tables corresponding to information categories 80, 82, 84, 86, 88, 90 and 92, respectively, of PIM application 70 (FIG. 1). These tables are pre-existing within the project explorer 254 of RAD tool 122 and cannot be modified by the user, since the fields of each table (which fields correspond to data fields within records of the corresponding information categories of the PIM application) are predetermined. The fields of each table represent the fields that are common to data records of the relevant information category across multiple PIM software applications (including PIM application 70) that are executable on one of the wireless communication device types upon which virtual machine software 40 is to be executed. The seven tables 287 are represented within the visual hierarchy of icons 270 to allow the user of RAD tool 122 to see the available information categories from which PIM data may be queried, and to which PIM data can be added, at run time. They may each be selected and examined to identify data fields therein, but the data fields are not open to modification by the user because the structure of each table is predetermined.

The last table, TBLRECIPIENTS, results in the run-time creation of a comparable database table 64 in the database 62 of wireless communication device 118 (FIG. 1).

Figure 9:
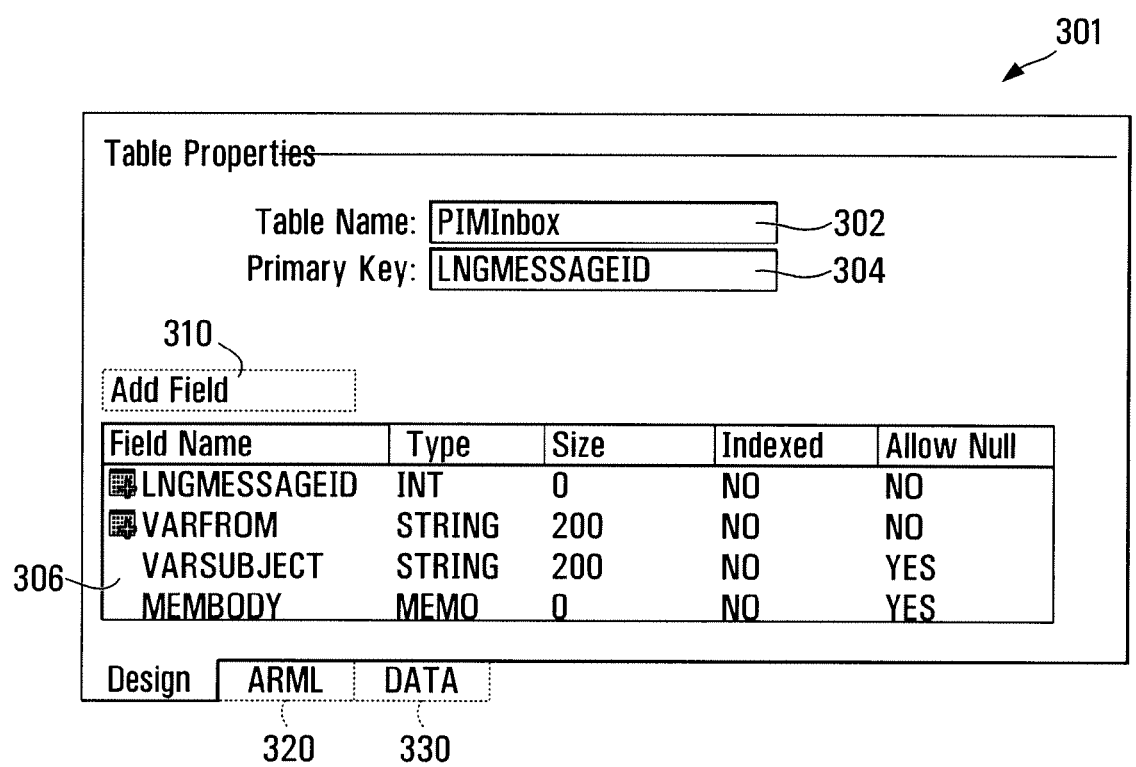
FIG. 9 illustrates a further aspect of the GUI of FIG. 5.

Selection of a table icon within database table section 286—in this case, the PIMINBOX table icon—causes a table properties window 301, as shown in FIG. 9, to be displayed. The table name is indicated in the Table Name field 302. A primary key (i.e. a field that contains a unique value, used to differentiate between records in the table) is specified in the Primary Key field 304. The fields of the table are indicated in grid 306. Each field is represented by a row within the grid. The first column, Field Name, identifies the name of the field within the table. The second column, Type, identifies the type of the field, which may be one of the following: "INT" (Long Integer)—e.g. numeric values between −2147483648 and 2147483647; "STRING" (string)—e.g. a set of alphanumeric characters up to a maximum of 255 characters, possibly limited to less than 255 characters by setting of the Field Size field in the third column; "MEMO"—similar to a STRING, except that MEMO fields can contain more than 255 characters; "AUTOINC" (Auto-incrementing or identity field) data added to a AUTOINC field automatically increments itself, ensuring that each record has a unique value in this field. Values in an AUTOINC field are not capable of update, nor can data be inserted this type of field; or "DATETIME" (Date and Time data) typically in the RFC 1123 format (dd mmm yyyy hh:nn:ss). The fourth column, Indexed, indicates whether the field is indexed so as to permit the device database management system to perform quicker searches and queries on the data. Finally, the fifth column, Allow Null, indicates whether or a null value in the field is permissible at run time.

The information within Table Properties window 301 is read-only in the case of a notional PIM database table. The Add Field button 310 for permitting the user to add a field to a user-defined table is therefore inactive in FIG. 9, to keep the user from attempting to add to the predetermined, notional fields of the notional PIM table. Moreover, the ARML tab 320 for displaying a read-only version of the ARML (XML) code generated by the a user-defined table and the Data tab 330 for displaying an editable graphical display of a user-defined table similar to that of well-known database design and modification software of FIG. 9 are also inactive. The ARML tab 320 is inactive because predetermined notional database tables need not be defined in the application definition file. These tables need not be defined in the application definition file because the virtual machine software 40 (FIG. 1) "hard-codes" these tables, as their structure is predetermined. The Data tab 330 is inactive in FIG. 9 because predetermined notional database tables are not editable. For user-defined tables, such as TBLRECIPIENTS (FIG. 6), information within Table Properties window 301 (FIG. 9) is editable and all controls of window 301 are active.

The TBLRECIPIENTS database table is assumed to have been previously defined by the developer 18 through interaction with other controls of GUI 250 (e.g. context-specific pop-up menus allowing the definition of a new table and of fields within that table, as might be found in a database application for example).

Referring back to FIG. 6, the "Operating System" branch 350 comprises the platform-specific components section 274 of visual hierarchy 270. This branch permits the definition of platform-specific aspects of a mobile application, which primarily comprise the displayable GUI screens and control flow of a mobile application. In FIG. 6, only one exemplary GUI screen definition 354 is illustrated. This screen appears within the "Pocket PC" branch 352, indicating the screen is a screen for a Pocket PC device such as device 118 (FIG. 1). Other GUI screen definitions are omitted for brevity.

Figure 10:
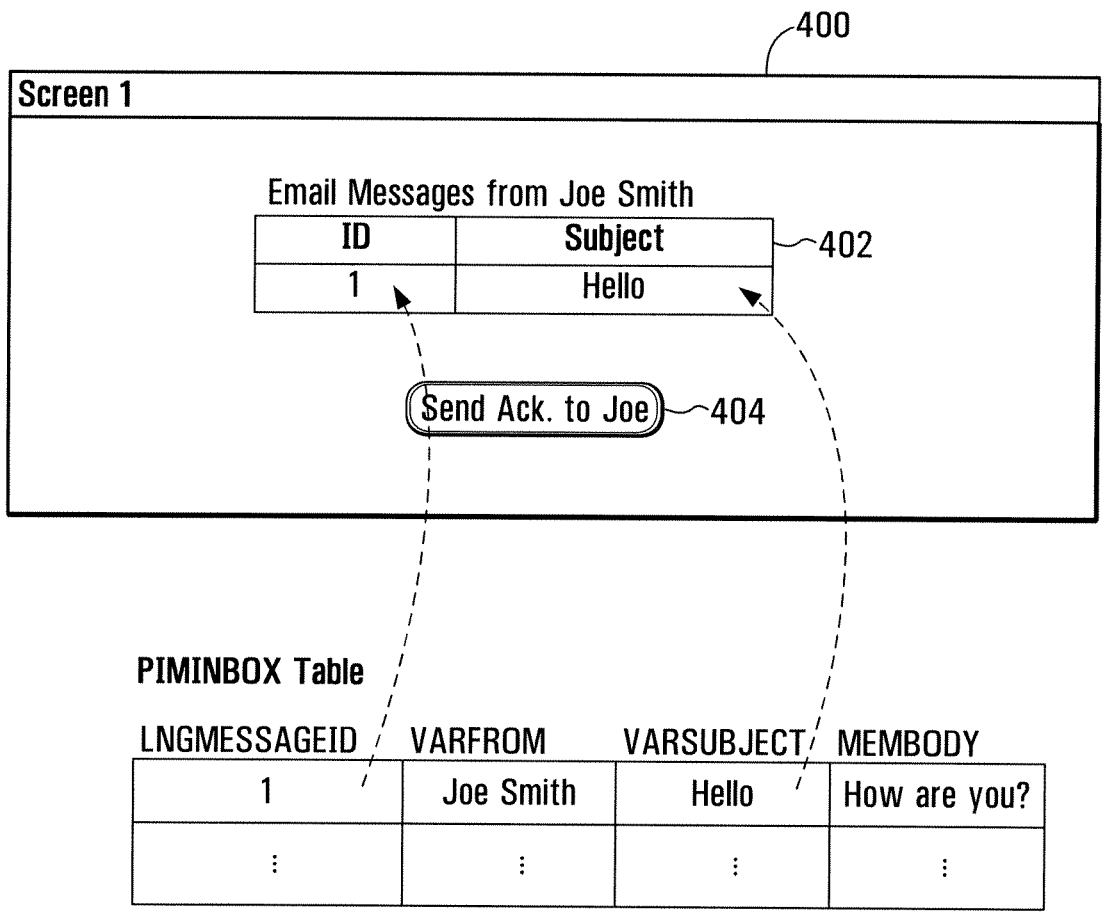
FIG. 10 illustrates a GUI screen presented at the wireless communication device of FIG. 3 at run time along with a notional database table used to populate the GUI screen.

Screen definition 354 defines the GUI screen 400 of FIG. 10 for displaying a list of email messages from a particular sender, Joe Smith. Referring to FIG. 10, it can be seen that GUI screen 400 has a grid 402 and a button 404. It is desired that a first column the grid 402 be populated with the value of an ID field entitled "LNGMESSAGEID" of the notional PIM database table "PIMINBOX" (which is also shown in FIG. 10) and that a second column the grid 402 be populated with the value of a subject field entitled "VARSUBJECT" of the same notional PIM database table. This is to occur only when the value of the "VARFROM" field (which represents the email sender's name) is "Joe Smith". The population of the grid with this data is achieved by way of a query, described below. Also, upon user selection of the button 404, it is desired for a "canned" (i.e. predetermined) acknowledgement email message to be sent to Joe Smith.

Referring back to FIG. 6, below screen definition 354 within the hierarchy 270, two icons 356 and 358 are created. The first icon 356 represents the grid 402 of FIG. 10. The second icon 358 represents the button 404 of FIG. 10. Each of these application components may be created by right-clicking the icon 354, choosing the appropriate new display element (from a pop-up menu or a toolbar for example), and defining the new element's properties in properties window 264 (FIG. 5).

A ButtonClick event 360 is defined below the button icon 358 of FIG. 6. This event represents the selection of the button 404 of FIG. 10 by a user of wireless communication device 118. Right-clicking of the event icon 360 in project explorer 254 causes another pop-up menu to be displayed. The options that are presented on the displayed pop-up menu include an Add Action option. This option is used to add actions icon 362.

Figure 11:
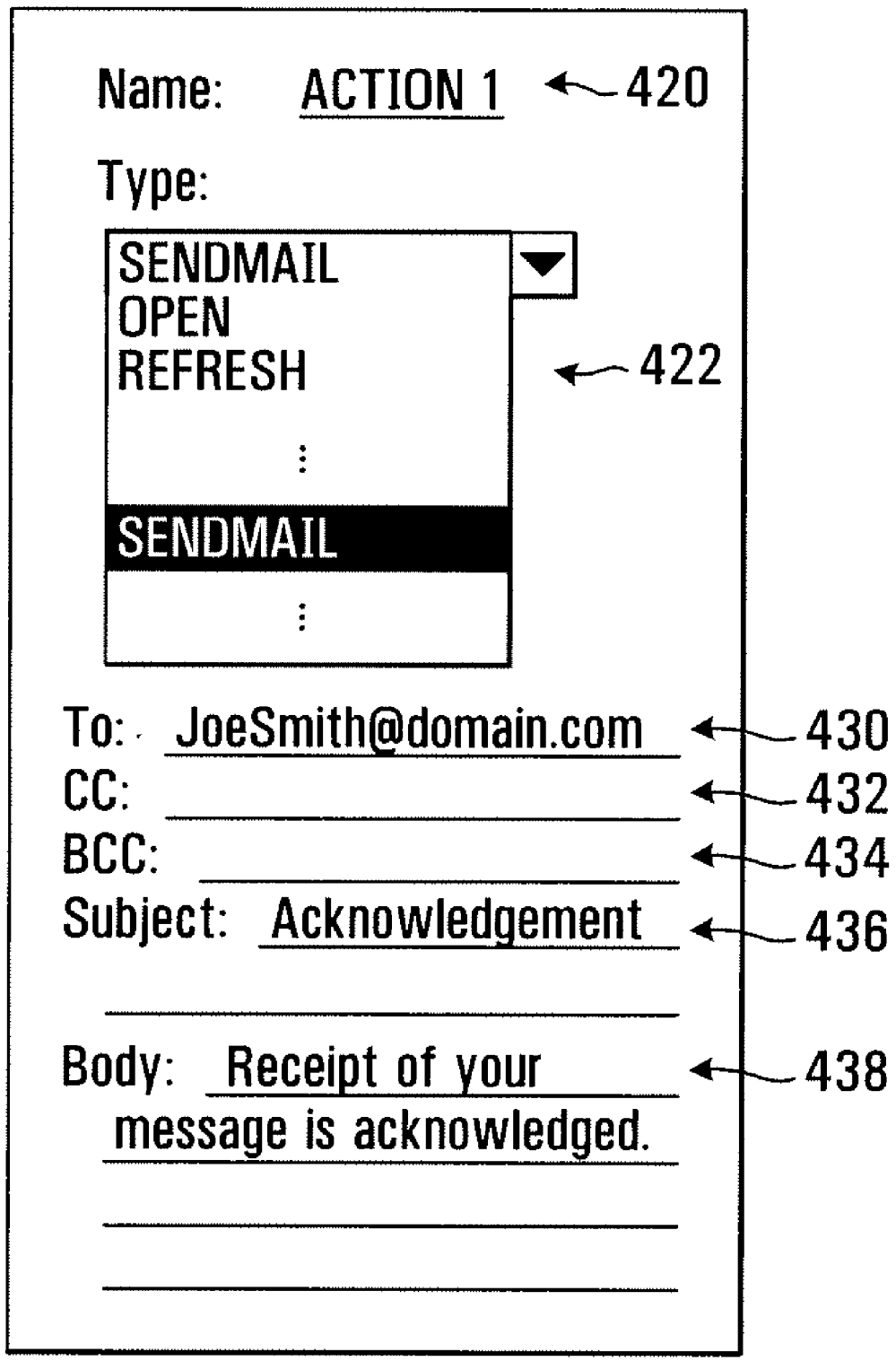
FIGS. 11 and 12 illustrates further aspects of the GUI of FIG. 5.

Action icon 362 ("Action 1") represents a "SENDMAIL" action which causes a predetermined email message to be sent to a developer-specified email address at run time by way of an appropriate PIM API call. The definition of properties for this action in the properties window 264 is illustrated in FIG. 11. Turning to that figure, a name field 420 allows the developer to enter a name ("Action 1") that will be displayed in the project explorer 254 as part of the icon 362. A "Type" field 422 provides a drop-down list which lists each type of action that may be performed by a Pocket PC wireless communication device. In FIG. 11, the list is illustrated in a dropped-down state, with one entry, namely SENDMAIL, being selected (as indicated by reverse video), to indicate that the action 362 of FIG. 6 is a "SENDMAIL" action. Selection of the "SENDMAIL" action type results in the further display of a set of text entry fields 430, 432, 434, 436 and 438 in properties window 264, wherein the developer specifies the recipient email address, CC email address, BCC email address, subject, and body (respectively) of the predetermined email message to be sent upon execution of the "SENDMAIL" action responsive to a clicking of the button 404 (FIG. 10).

Referring again to FIG. 6, a queries section 370 under screen icon 354 contains the definition of queries for retrieving data to be used for populating the screen 400 (FIG. 10) of wireless communication device 118 at run time. Generally, queries facilitate the development of complex mobile applications, because queries permit application data to be accessed and possibly combined with other data in various ways. A query can retrieve data either from a user-defined database table or from a notional PIM database table, and can be thought of as a run-time "snapshot" of the database 62 or of an information category of PIM application 70. Queries defined in section 370 are automatically refreshed when the "parent" screen (screen 400 of FIG. 10) is redisplayed. Between refreshes, the data is stored by the query and may be accessed by application components (such as the grid defined at 356 of FIG. 6).

In FIG. 6, only one query 372 is defined in the queries section 370. The query 372 represents a query of notional table PIMINBOX. The procedure for defining query 372 may be as follows. The icon corresponding to the queries section 370 may initially be selected with a mouse (or similar user input mechanism 230) of the RAD tool 122 (FIG. 4). A right-click (or similar user action) may cause a pop-up menu to be displayed. The pop-up menu may present a list of options in the context of the selected queries section 370. An Add Query option may permit the user to define a new query. Selection of that menu options may cause a new query icon 372 to be created below icon 370, as shown in FIG. 6, and a Query Properties window 450, as shown in FIG. 12, to be displayed in the main design area 256 (FIG. 5).

Figure 12:
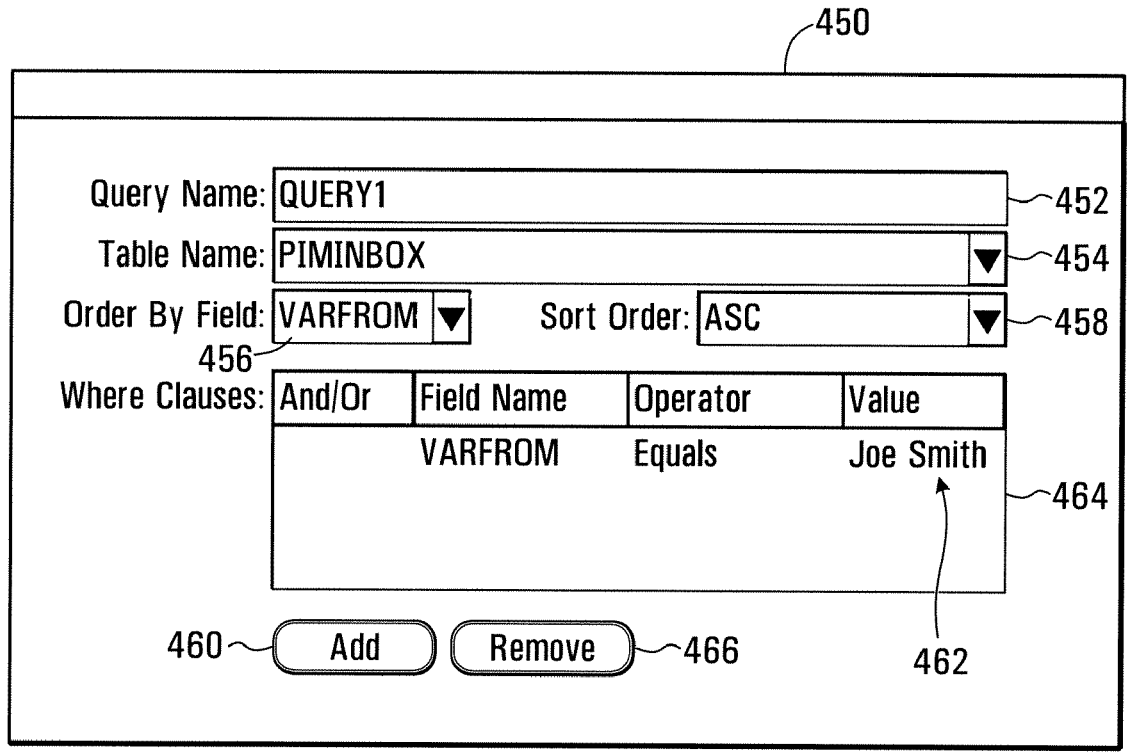

Referring to FIG. 12, the Query Properties window 450 provides selectable GUI controls which permit the user to enter properties of the newly defined query. The Query Properties window 450 includes a Query Name field 452 for entering a unique query name that is not already in use by any other query. The name uniqueness constraint ensures that each query may be uniquely referenced from other areas of the visual hierarchy 270. In the present example, it is assumed that the name "QUERY1" has been entered. That name is displayed as part of the icon at 372 (FIG. 6). A Table Name field 454 (FIG. 12) allows the developer to select the name of the table against which the query is to be performed. In the present embodiment, a prefix of "PIM" in the table name indicates that the table is a notional PIM database table, while a prefix of "TBL" would indicate that the table is a user-defined database table. The field 454 is a drop-down list enumerating the notional and user-defined tables of the present mobile application. In the example, the table "PIMINBOX" has been selected from that list. The Order By field 456 specifies that the query results (i.e. the data from the PIM inbox which matches the query's search criteria) should be automatically sorted by a field table named "VARFROM". The drop-down list 456 is automatically populated with a set of fields for the information category 80 (FIG. 1) associated with the table selected in field 454. Field 456 can be left blank if the query is designed to return a single record or if the results do not require sorting. When the Order By field 456 has been specified the Sort Order field 458 can be set to either ASC (ascending) or DESC (descending) to control the ordering of query results.

Selection of the Add button 460 of FIG. 12 permits a "where clause" to be defined. As is known in the art, a where clause specifies the search parameters for a query. An exemplary where clause 462 is illustrated in FIG. 12. The where clause 462 specifies a Field Name, an Operator and a Value. The Field Name indicates which field of the table specified in field 454 is to be examined. The Operator indicates the nature of the operation to be performed (Equals, Not Equal To, Less Than, Greater Than, or in the case of string fields, Begins With) in respect of that field, which is generally a comparison of the field value against another value. The Value is the value against which the named field is to be compared. Thus, the where clause 462 of FIG. 12 causes records to be returned in which the "VARFROM" field equals "Joe Smith" (i.e. email messages from Joe Smith). To define additional where clauses, the Add button 460 may be selected again. A new where clause, which would appear as another row below clause 462 in the Where Clauses grid 464, may be similarly defined. For each where clause defined in addition to the first, the AND/OR field is also specified to indicate whether the overall set of where clauses is conjunctive or disjunctive. A where clause may be removed using the Remove button 466. The user can also specify a temporary, named, "scratchpad" value stored at the device to effect a dynamic comparison.

When development of the mobile application using RAD tool 122 is complete, the developer may select a "Save" button, or similar GUI construct, of the application development software 222 (FIG. 4). When this is done, the application definition DOM tree 238 is serialized to form a textual XML markup language document, i.e. master definition file 234, which is stored in the secondary storage 236 of RAD tool 122 (FIG. 4). The master definition file 234 is then uploaded to the transaction server 114 and used to create application definition files for each of mobile devices 118 and 120, as described in the above-referenced U.S. Patent Publication No. 2003/0060896. The application definition file 20 (FIG. 1), which is created for wireless communication device 118, is then downloaded to the wireless communication device 118.

The application definition file 20 is illustrated in greater detail in FIGS. 13A-13C. The file 20 contains XML elements representing all of the application constructs defined within the project explorer 254 of FIG. 6, including each of the markup language definitions 22, 24, 25, 28 and 30 of FIG. 1. In FIGS. 13A-13C, many XML elements are omitted for brevity (as indicated by colons). Most of the XML elements shown in FIGS. 13A-13C are detailed in Appendix "A", attached hereto. The XML elements are interpreted by the virtual machine software 40 and govern the presentation of server-side application 124 at mobile device 118 (FIG. 1).

It will be appreciated that lines of FIGS. 13A-13C with the prefix "//", such as lines 1, 27, 39, 44 and 68, are comments that are intended to facilitate reader comprehension of these figures. They are not valid markup language elements and are not actually present in the generated document 20.

Lines 2-24 (FIG. 13A) of the application definition file 20 contain an AXDATAPACKET markup language element and various nested (i.e. subordinate) markup language elements which collectively define the "AddEmailToInbox" rule 284 (FIG. 6) whose properties are shown in FIG. 7. The two table updates 298 and 299 of FIG. 7 are represented at lines 4-13 and 14-22 of FIG. 13A, respectively.

Lines 4-13 pertain to the update of the notional database table PIMINBOX which is the subject of markup language definition 28 (FIG. 1). These lines describe how to update the PIMINBOX table each time that an XML package of type "ME" is received at the wireless communication device 118 at run time. The XML element and attribute names of lines 4-13 are generally as described in section 3.3 of Appendix "A". Briefly, the BODY="ME" attribute corresponds to field 292 of FIG. 7, and the SENDTOAPP="NO" attribute corresponds to check box 295 (with the SENDTOMOBILE="YES" being a further indicator that this rule pertains to the processing of an incoming XML package at the wireless communication device 118).

Lines 4-6 of the TUPDATE element includes various attributes which capture the values contained in the column of the first table update 298 of grid 297 (FIG. 7). Specifically, the TABLE="PIMINBOX" attribute corresponds to the Table Name column; the UPDATETYPE="ADD" attribute corresponds to the Update Type column; the WHEREFIELD=" "

attribute corresponds to the Field column; the WHEREPARAM="" attribute corresponds to the Param column; the SECTION="MAIL" attribute corresponds to the Element column; the MULTIROW="NO" attribute corresponds to the Multi-Row column; and the MULTIROWIDENT="" attribute corresponds to the Identifier column. The WHERETYPE="PROP" attribute is not shown in FIG. 7 but is indicative of whether the WHEREPARAM (if set) is an attribute ("PROP") or an element ("VALUE"). In FIG. 13A, the attribute value "PROP" is a result of a default setting and is not significant, since the WHEREPARAM value is not set.

Lines 7-12 capture the parameter-field associations of Table 1, above. Lines 8-11 correspond to rows 1-4 of Table 1 respectively, as will be apparent to one of ordinary skill in the art.

Lines 14-22 (FIG. 13A) describe how to update a different table, TBLRECIPIENTS, each time an XML package of type "ME" is received at the wireless communication device 118 at run time. Lines 14-22 are similar to lines 4-13 described above, except that the MULTIROW="YES" attribute indicates that the parameter-fields associations defined at lines 18-20 of FIG. 13A are to be effected not once per XML package, but once for each RCP element in the XML package (e.g. once for each of the three RCP elements at lines 8-13 of FIG. 8).

Turning to FIG. 13B, the markup language definition 22 of a user-defined database table is shown at lines 28-36. The TDEF markup language element and subordinate FIELDS and FLD elements at lines 28-36 cumulatively define a table "TBLRECIPIENTS" for storing information about email message recipients. The XML element and attributes at lines 28-36 are generally as described in the table definitions section 3.2 of Appendix "A". It should be appreciated this definition, and indeed any definition of a table in the application definition file, will be that of a user-defined database table. This is because predetermined, notional database tables, such as any one of the seven notional PIM database tables represented in FIG. 6, are not described in the application definition file 20.

Lines 41-66 of FIGS. 13B-13C contain a SCREEN element and various subordinate XML elements which cumulatively define the screen 400 of FIG. 10.

A GRID XML element and subordinate XML elements associated with grid definition 356 of FIG. 6 will be used to defining grid 402 of FIG. 10. In FIG. 13B, these XML elements are omitted from FIG. 13B for brevity. The omitted XML elements would generally follow the description in the grid section 5.10 of Appendix "A" however. Notably, the GRDSRC attribute of the GRID element would refer to the query "Query1" (as defined by definition 372, FIG. 6) in order to facilitate the population of the grid 402 with data from the PIMINBOX notional database table. The "Query1" markup language definition 26 (FIG. 1) is described in more detail below.

A BTN element and various subordinate XML elements lines 47-58 of FIGS. 13B to 13C cumulatively define the button 404 of FIG. 10 for sending a developer-specified email message to a developer-specified recipient at run time. The "SENDMAIL" action that achieves this result is defined at lines 50-55 of FIG. 13B. These lines correspond to the markup language definition 30 of FIG. 1. At lines 51-52 of FIG. 13B, the attributes TO, CC, BCC and SUBJECT of the MESSAGE element have values matching the developer-specified values in fields 430, 432, 434 and 436 (respectively) of FIG. 11, while the MESSAGE element value at line 53 of FIG. 13B matches the value of field 438 of FIG. 11.

Lines 61-63 of FIG. 13C contain a QUERY element and subordinate W element which correspond to query 372 of FIG. 6. The values of the NAME, TABLE, ORDERBY and ORDERDIR attributes at line 61 are taken from the Query Name field 452, Table Name field 454, Order By field 456 and Sort Order field 458 of FIG. 12, respectively, as set by the developer. The W element at line 19 represents where clause 462 of FIG. 12.

The application definition file 20 of FIGS. 13A-13B is transmitted to the wireless communication device 118 on demand, as described in U.S. Patent Publication No. 2003/0060896. Upon receipt of the application definition file 20, an XML parser at wireless communication device 118 parses the XML text of application definition file 20. The parser converts the XML document 20 into a DOM tree representation. The DOM tree is used to facilitate the instantiation of objects 41 (FIG. 1) from locally stored object-oriented classes 66 (FIG. 3) and the population of their data members with element and attribute values from the document 20 (as described below). For each XML element that is encountered during the traversal, a corresponding object 41 (FIG. 1) may be instantiated from one of the object-oriented classes 66. Instantiation of each object 41 may be facilitated by a fromXML( ) "constructor" method within the corresponding class, which populates the object's data members based on XML element/attribute values. For example, the constructor method may receive the XML fragment which defines the XML element in the application definition file 20 and, based on element and attribute values within the fragment, automatically populate the newly-instantiated object's data members with like values. It is noted that the constructor method may or may not meet the strict definition the term "constructor" as it is understood in the context of certain object-oriented programming languages (e.g. the method may not have the same name as the class). Once the objects 41 have been instantiated and so populated, the DOM tree may be deallocated.

Beginning with the device-independent constructs, parsing of the AXDATAPACKET element at lines 2-24 of FIG. 13A results in the instantiation of the rule object 48 (FIG. 1) from a Rule class 1400, which is illustrated in pseudocode form in FIG. 14, and the invocation of its fromXML( ) method, shown at FIG. 14, lines 17-25. In FIG. 14, text following a "//" delimiter denotes a comment (this is also true in FIGS. 15A-15B, 16A-16C, 17A-17B and 18). The fromXML( ) method causes local data members "body", "sendtomobile" and "sendtoapp" (lines 6-8 of FIG. 14) to be set to the attribute values of the same name from the AXDATAPACKET element XML that is passed as an input parameter. Class 1400 is one of the object classes 66 of FIG. 3.

Thereafter, for each TABLEUPDATE element subordinate to the AXDATAPACKET element, the fromXML( ) method: (1) instantiates a new TableUpdate object from the TableUpdate class 1500 of FIGS. 15A and 15B (described below) and adds it to its Tupdates array (declared at lines 11 of FIG. 14); and (2) passes the XML for the TABLEUPDATE element to the fromXML( ) method of the newly declared Table Update object. In the illustrated example, two TABLEUPDATE elements are declared in the application definition file 20 (at lines 4-13 and 14-22 of the application definition file 20 of FIG. 13A), therefore two TableUpdate objects are instantiated from class 1500. Class 1500 is another one of the object classes 66 of FIG. 3.

The TableUpdate class 1500 is illustrated in pseudocode form in FIGS. 15A and 15B. The fromXML( ) method (lines 20-28 of FIG. 15A) causes local data members (in this case "table", "updatetype", "wherefield", "whereparam", "wheretype", "section", "multirow" and "multirowident"—see lines 6-14 of FIG. 15A) to be set to the attribute values of the same names from the XML that is passed as an input parameter. Thereafter, for each PKGFLD element subordinate to the TABLEUPDATE element, the fromXML( ) method: (1) instantiates a new PFAssociation object to represent a param- eter-field association (as described above) and adds the PFAs- sociation object to its PFAssns array (declared at line 15 of FIG. 15A); and (2) passes the XML for the PKGFLD element to the fromXML( ) method of the newly declared PFAssocia- tion object. In the illustrated example, four PKGFLD ele- ments are declared in the application definition file 20 (at lines 8-11 of the application definition file 20 of FIG. 13A), there- fore four PFAssociation objects are instantiated. Data mem- bers of each PFAssociation object are thereafter set to capture the value of the relevant PKGFLD element and its attributes from the application definition file 20.

Processing of the user-defined table definition, i.e. the TDEF element at lines 28-37 of FIG. 13B, results in the instantiation of the "TBLRECIPIENTS" table object 42 (FIG. 1) from a Table class 1600 which is illustrated in pseudocode form in FIGS. 16A-16C, and in the invocation of its fromXML( ) method, shown at FIG. 16A, lines 18-31. The fromXML( ) method causes local data members "name", "updatetype", "pk" and "delindex" (lines 7-10 of FIG. 16A) to be set to the attribute values of the same name from the TDEF element XML that is passed as an input parameter. Thereafter, for each FLD element subordinate to the TDEF element, the fromXML( ) method: (1) instantiates a new Field object to represent a database table field and adds it to its Fields array (declared at line 11 of FIG. 16A); and (2) passes the XML for the FLD element to the fromXML( ) method of the newly declared Field object. In the illustrated example, three PKGFLD elements are declared in the application defi- nition file 20 (at lines 30-35 of the application definition file 20 of FIG. 13B), therefore three Field objects are instantiated. Data members of each Field object are thereafter set to cap- ture value of the relevant FLD element and its attributes from the application definition file 20. The purpose of the Field objects, which are not expressly shown, is to capture infor- mation regarding the structure of the "TBLRECIPIENTS" table. It will be appreciated that different versions of class 1600 may exist. In each version, the instructions for interact- ing with the PIM API 72 or DBMS 60 are tailored to a particular PIM application 70 or DBMS 60. The appropriate version is loaded into the memory of the wireless communi- cation device, as part of objects classes 66 (FIG. 3), based on the identity of the PIM application 70 and DBMS 60 that are to be executed on that wireless communication device.

Next, a connector object (declared at line 12 of FIG. 16A) connects to the DBMS 60 in order to facilitate future interac- tion with the DBMS 60. If the table object represents a notional PIM table, the connector object would instead con- nect to the PIM API 72 for purposes of facilitating access to the appropriate one of information categories 74 represented by the notional table. Thereafter (at lines 28-30 of FIG. 16A), appropriate DBMS API calls are made in order to create a table 64 in database 62 (FIG. 1) that corresponds to the TDEF declaration of FIG. 13B. This is not done if the table is a notional PIM table because, in that case, the "table" actually represents a PIM information category that already exists in PIM application 70.

At this stage, operating system-specific constructs of appli- cation definition file 20 (which are described starting at line 40 of at FIG. 13B), including screen, grid, button and event objects, are instantiated and their data members are initialized in a similar "cascade" fashion. The event object represents a run-time selection of the button 404 of FIG. 10. The event object has a subordinate action object 50 (FIG. 1) represent- ing the "SENDMAIL" action that is to be performed when the button is selected. The action object 50 is instantiated from Action class 1700, which is illustrated in pseudocode form in FIGS. 17A-17B, based on the ACTION element at lines 50-54 of FIG. 13B. When the fromXML( ) method of the action object is executed (lines 20-23 of FIG. 17A), the method simply sets the type data member to the value of the type attribute, which in this case is "SENDMAIL". It will be appreciated that, as with Table class 1600, different versions of the Action class 1700 may exist. In each version, the instructions for interacting with the PIM API 72 or DBMS 60 are tailored to a particular PIM application 70 or DBMS 60. The appropriate version is loaded into the memory of the wireless communication device, as part of the object classes 66 of FIG. 3, based on the identity of the PIM application 70 and DBMS 60 that are to be executed on that wireless com- munication device.

With reference to FIG. 13C, parsing of the QUERY ele- ment at lines 61-63 results in the further instantiation of the query object 46. Query object 46 represents a query of the notional "PIMINBOX" table represented by table object 45 (FIG. 1) that is re-executed every time the screen 400 of FIG. 10 is displayed at run time. The object 46 is instantiated from Query class 1800 (another one of the object classes 66 of FIG. 3) which is illustrated in pseudocode form in FIG. 18, and in the invocation of its fromXML( ) method, shown at FIG. 18, lines 14-17. The fromXML( ) method causes local data mem- bers "name" and "table" (lines 6-7 of FIG. 18) to be set to the attribute values of the same name from the QUERY element XML that is passed as an input parameter. The "whereparams" data member (line 8) is populated by parsing the subordinate W element and populating a WhereParam object for each W element.

Thereafter, the runQuery( ) method (lines 20-25 of FIG. 18) is invoked to cause the query to be executed. The query is executed at this stage so that a snapshot of notional PIM table data that meets the query's where parameter will be available during instantiation of GUI screen objects (such as the grid 402 of FIG. 10) whose textual aspects are initialized based on the retrieved data. The runQuery( ) method first identifies the appropriate table object (in this case, table object 45 of FIG. 1) based on the name of the table stored in the "table" data member. This identification may be facilitated by a "table broker" construct (possibly incorporating a hash table) within virtual machine software 40 which accepts a table name string and returns the corresponding table object. Then the run- Query( ) method passes the query object as an "in" parameter to the executeQuery( ) method of the table object (see FIG. 16C, lines 73-83), which executes the query as described below.

The executeQuery( ) method of the table object 45 is illus- trated at lines 73-83 of FIG. 16C. Because table object 45 represents a notional PIM table, logic within the execute- Query( ) method causes appropriate PIM API calls 47 (FIG. 1) to be made (rather than DBMS API calls) to identify matching records in the Inbox information category 80. This may entail composing a Structured Query Language (SQL)- like query string from using the in query parameter and pass- ing that string to the PIM API 72. The resulting matching records are passed back to the invoking query object 46 in the "records" out parameter. These records may be indexed by other objects 41 by way of the getField( ) method (FIG. 18, lines 27-30) or similar methods, which may set or reference the "current" index (FIG. 18, line 12). The records are main- tained until overwritten by a re-execution of the query.

Referring to FIG. 13C, lines 68-74, further screens also defined for the Pocket PC platform by the developer 18 using RAD tool 122 (not shown) result in additional XML elements in application definition file 20 (omitted for brevity). It is assumed that, in conjunction with one of these screens, a query of user-defined database table 64 (FIG. 1) is defined, resulting in the markup language elements shown at lines 70-73. This exemplary query returns records having a "VAR-FULLNAME" field that begins with "J". When these markup language elements are processed, query object 44 (FIG. 1) will be instantiated and its fromXML( ) method invoked. Thereafter, the runQuery( ) method (lines 20-25 of FIG. 18) is invoked to cause the query to be executed. The query is executed at this stage so that a snapshot of matching user-defined table data will be available during instantiation of GUI screen objects whose textual aspects are initialized based on the retrieved data. When the executeQuery( ) method of the table object 42 is executed, logic within the executeQuery( ) method causes appropriate DBMS specific code 43 or instructions (FIG. 1) to be executed (rather than PIM API calls, as in table object 45) to identify matching records database table 64. The instructions may interact with an API of DBMS 60 (e.g. may invoke API functions, routines, procedures or methods). The instructions may be DBMS-specific and will be known to those skilled in the art. An exemplary set of instructions is described at www.w3schools.com/ado/ado_reference_connection.asp, which is hereby incorporated by reference hereinto. The resulting matching records are passed back to the invoking query object 44 in the "records" out parameter.

Once the above-described cascade of invocations of fromXML( ) methods through the various instances of object classes 66 has successfully completed, the result is a set of objects 41 (FIG. 1). The appearance of the screen 400 when it is first displayed will be as shown in FIG. 10, with contents of the grid 402 being determined by the matching records present at that time in the PIM inbox information category 80.

If it is desired to send an acknowledgement email message to Joe Smith, the button 404 may be selected by the wireless communication device user. Selection of the button 404 triggers, by way of operating system callback and a cascade of calls from higher-level button and event objects (not illustrated), the invocation of the doAction( ) method of an Action object 50 which corresponds to the "SENDMAIL" action. The doAction( ) method is illustrated in pseudocode form at lines 26-40 of FIGS. 17A-17B. The purpose of the doAction( ) method, in this instance of the Action class 1700 of FIG. 17A-17B, is to perform the "SENDMAIL" action. This purpose is captured in the value "SENDMAIL" of the type data member. The sending of an email message is achieved by connecting to the PIM application 70 and making appropriate calls to PIM API 72 (FIG. 1) to cause an email message to be sent. The substance of the email message, which was originally specified in the child MESSAGE element of the ACTION element in the application definition file 20 (see FIG. 13B, lines 51-54), is stored in the form of a child Message object to the Action object 50 (see FIG. 17A, line 16).

For example, the following Java™ code fragment outlines how to programmatically send a message from a BlackBerry wireless communication device while setting some additional parameters prior to sending using the package net.rim.blackberry.api.mail:

```
//retrieve the sent folder
Folder[ ] folders = store.list(Folder.SENT);
Folder sentfolder = folders[0];
//create a new message and store it in the sent folder
Message msg = new Message(sentfolder);
Address recipients[ ] = new Address[1];
try {
   recipients[0]= new Address("user@company.com", "user");
   //add the recipient list to the message
   msg.addRecipients(Message.RecipientType.TO, recipients);
   //set a subject for the message
   msg.setSubject("Test email");
   //sets the body of the message
   msg.setContent("This is a test email from my BlackBerry Wireless Handheld");
   //sets priority
   msg.setPriority(Message.Priority.HIGH);
   //send the message
   Transport.send(msg);
}
catch (Exception me) {
   System.err.println(me);
}
```

For a Pocket PC device, creation of an outgoing email message using C++ is described at www.codeproject.com/ce/cemail.asp, which is hereby incorporated by reference hereinto.

Subsequently, operation of the application 124 at application server 112 of system 100 (FIG. 2) may result in the generation of an XML package 300 (FIG. 8), which is received at device 118. An operating system callback or similar mechanism at the device 118 results in the invocation of the doRule( ) method of the Rule object 48 (FIG. 1), which is described in pseudocode at lines 27-32 of FIG. 14. Essentially, the method takes the received XML package as its input, and, for each table update defined in conjunction with the represented rule, the doUpdate( ) method of the corresponding TableUpdate child object is invoked in turn, with the XML package being passed as an input parameter for each invocation.

As shown at lines 30-36 of FIG. 15A, the doUpdate( ) method identifies the appropriate table object backed on the "table" data member (e.g. using a table broker, as noted above) and then invokes the table object's effectUpdate( ) method, which is responsible for putting the update into effect based on the TableUpdate object and XML package input parameters.

Referring now to FIGS. 16B-16C, pseudocode for the effectUpdate( ) method is shown at lines 36-71. The body of the method contains a large switch statement which causes different instructions to be executed based on the value of the "updatetype" data member of the tupdate TableUpdate object parameter (declared at FIG. 15A, line 7) and based upon whether the table is user-defined or a notional PIM table. In the case of the first tupdate parameter (corresponding to lines 4-13 of FIG. 13A), the type is "ADD" and the table is a notional PIM table (as can be determined by checking whether its "name" data member is included in an internally stored list of PIM table names), thus the effectUpdate( ) method: instantiates a new data record for the relevant PIM information category (category 80—FIG. 1); fills in the new record with values from the XML package based on the PFAssns array data member of the TableUpdate object; and invokes appropriate PIM API calls for adding the record as dictated by the data members of the tupdate parameter. For example, if the tupdate parameter's "multirow" data member indicates that the XML package has multiple elements, each requiring the addition of a record into the PIM information category, then appropriate PIM API calls are made to add multiple records.

If the value of the "updatetype" data member of the tupdate parameter had been "DELETE" or "UPDATE", the instructions executed would have been for the purpose of deleting or updating records of information category 80 via the PIM API 72 (FIG. 1), as described in pseudocode at lines 57-59 and 65-67 of FIG. 16B, with multiple records being affected if the tupdate parameter's "multirow" data member indicates that the XML package has multiple elements Having executed the doUpdate( ) method of the first child TableUpdate object of the Rule object 48 (FIG. 1), the doUpdate( ) method of the second child TableUpdate object is invoked next. Its execution is similar to that described above, except that it results DBMS API via table object 42 calls rather than PIM API calls via table object 45, since the relevant table in this case is a user-defined database table (as evidenced by fact that the value of the table attribute of the TUPDATE element at line 14 of FIG. 13A is not in the internally stored list of PIM table names).

From the above description, it can be seen that each of the table objects 45 and 42 "translates" conventional database operations to one or more appropriate PIM API calls 47 or DBMS specific calls 43 (respectively) that achieve the desired result, with the developer 18 advantageously being shielded from the low-level details of such transactions. Conveniently, the developer 18 may simply treat each PIM information category 74 as a notional database table when designing a mobile application using RAD tool 122 (FIG. 2) and may interact with the notional table in the same manner as he interacts with a user-defined database table, e.g. when performing queries. The queries may be used for purposes of populating a GUI screen with data from the PIM application 70.

As will be appreciated by those skilled in the art, modifications to the above-described embodiment can be made without departing from the essence of the invention. For example, markup language documents need not be written using XML. Alternative markup languages (e.g. Standard Generalized Markup Language, of which XML is a subset) could be employed. Moreover, the choice of markup language element and attribute names may differ from those described above.

In alternative embodiments, the DBMS may not support structured query language. Another form of query language may be supported instead.

Other modifications will be apparent to those skilled in the art and, therefore, the invention is defined in the claims.

APPENDIX "A": ARML Specification

Contents

| | | |
|---|---|---:|
| 1 | Introduction | 48 |
| 1.1 | Purpose of document | 48 |
| 1.2 | Audience | 48 |
| 1.3 | Definitions & Acronyms | 48 |
| 2 | ARML Overview | 49 |
| 2.1 | ARML design considerations | 49 |
| 2.2 | ARML usage | 50 |
| 2.3 | The scratchpad area | 50 |
| 2.4 | System Variables and Functions | 51 |
| 2.4.1 | Variables: | 51 |
| 2.4.2 | Functions: | 51 |
| 2.5 | Single-Field Lookup | 51 |
| 3 | ARML application definition | 52 |
| 3.1 | General | 52 |
| 3.1.1 | Description | 52 |
| 3.1.2 | Structure | 52 |
| 3.1.3 | Tags | 52 |
| 3.2 | Table Definitions Section | 54 |
| 3.2.1 | Description | 54 |
| 3.2.2 | Structure | 54 |
| 3.2.3 | Tags | 54 |
| 3.2.4 | Example | 55 |
| 3.3 | Package Definitions Section | 56 |
| 3.3.1 | Description | 56 |
| 3.3.2 | Structure | 56 |
| 3.3.3 | Tags | 56 |
| 3.3.4 | Example | 58 |
| 3.4 | Device Interface Definitions Section | 59 |
| 3.4.1 | Description | 59 |
| 3.4.2 | Structure | 59 |
| 3.4.3 | Tags | 59 |
| 3.4.4 | Example | 60 |
| 4 | Application-defined packages | 60 |
| 4.1 | General | 60 |
| 4.1.1 | Description | 60 |
| 4.1.2 | Structure | 60 |
| 4.1.3 | Tags | 61 |
| 4.2 | Package information | 62 |
| 4.2.1 | Example | 62 |
| 5 | User interface Definitions | 65 |
| 5.1 | General | 65 |

APPENDIX "A": ARML Specification

| | | |
|---|---|---|
| 5.1.1 | Description | 65 |
| 5.1.2 | Structure | 65 |
| 5.1.3 | Tags | 66 |
| 5.2 | Queries definition section | 67 |
| 5.2.1 | Description | 67 |
| 5.2.2 | Structure | 67 |
| 5.2.3 | Tags | 67 |
| 5.3 | Menu definition section | 68 |
| 5.3.1 | Description | 68 |
| 5.3.2 | Structure | 68 |
| 5.3.3 | Tags | 68 |
| 5.4 | Buttons definition section | 69 |
| 5.4.1 | Description | 69 |
| 5.4.2 | Structure | 69 |
| 5.4.3 | Tags | 70 |
| 5.5 | Text Items definition section | 70 |
| 5.5.1 | Description | 70 |
| 5.5.2 | Structure | 70 |
| 5.5.3 | Tags | 71 |
| 5.6 | Edit boxes definition section | 71 |
| 5.6.1 | Description | 71 |
| 5.6.2 | Structure | 71 |
| 5.6.3 | Tags | 72 |
| 5.7 | Choice items definition section | 73 |
| 5.7.1 | Description | 73 |
| 5.7.2 | Structure | 73 |
| 5.7.3 | Tags | 73 |
| 5.8 | Checkboxes definition section | 74 |
| 5.8.1 | Description | 74 |
| 5.8.2 | Structure | 74 |
| 5.8.3 | Tags | 75 |
| 5.9 | Listboxes definition section | 76 |
| 5.9.1 | Description | 76 |
| 5.9.2 | Structure | 76 |
| 5.9.3 | Tags | 76 |
| 5.10 | Grids | 77 |
| 5.10.1 | Description | 77 |
| 5.10.2 | Structure | 77 |
| 5.10.3 | Tags | 78 |
| 5.10.4 | Example | 79 |
| 6 | The Smart Client event model | 79 |
| 6.1 | The EVENTS tag | 80 |
| 6.2 | The EVENT tag | 80 |
| 6.2.1 | The BUTTONCLICK event | 80 |
| 6.2.2 | The MENUITEMSELECTED event | 80 |
| 6.2.3 | The DATA event | 80 |

APPENDIX "A": ARML Specification

| | | |
|---|---|---|
| 6.3 | The ACTION tag | 81 |
| 6.3.1 | The OPEN action | 81 |
| 6.3.2 | The ARML action | 81 |
| 6.3.3 | The SAVE action | 81 |
| 6.3.4 | The PURGE action | 82 |
| 6.3.5 | The NOTIFY action | 82 |
| 6.3.6 | The CLOSE action | 82 |
| 6.3.7 | The ALERT action | 82 |
| 6.3.8 | The INTEGRATION action | 82 |
| 6.3.9 | The CLOSESCREEN action | 82 |
| 6.3.10 | The REFRESH action | 83 |
| 6.3.11 | The SAVEITEM action | 83 |
| 6.3.12 | The IF Action | 83 |
| Example of airix event model | | 85 |
| 7 | AVM-server system interactions | 87 |
| 7.1 | General | 87 |
| 7.1.1 | Description | 87 |
| 7.1.2 | Structure | 87 |
| 7.1.3 | Tags | 87 |
| 7.2 | Device Registration & deregistration package | 88 |
| 7.2.1 | Description | 88 |
| 7.2.2 | Structure | 88 |
| 7.2.3 | Tags | 88 |
| 7.2.4 | Example | 88 |
| 7.3 | Registration confirmation package | 89 |
| 7.3.1 | Description | 89 |
| 7.3.2 | Structure | 89 |
| 7.3.3 | Tags | 89 |
| 7.3.4 | Example | 90 |
| 7.4 | Find applications package | 91 |
| 7.4.1 | Description | 91 |
| 7.4.2 | Structure | 91 |
| 7.4.3 | Tags | 91 |
| 7.5 | Find applications confirmation package | 92 |
| 7.5.1 | Description | 92 |
| 7.5.2 | Structure | 92 |
| 7.5.3 | Tags | 92 |
| 7.6 | Application Registration & deregistration package | 93 |
| 7.6.1 | Description | 93 |
| 7.6.2 | Structure | 93 |
| 7.6.3 | Tags | 93 |
| 7.7 | Application registration & deregistration confirmation package | 94 |
| 7.7.1 | Description | 94 |
| 7.7.2 | Structure | 94 |
| 7.7.3 | Tags | 94 |
| 7.7.4 | Example | 94 |

APPENDIX "A": ARML Specification

| | | |
|---|---|---|
| 7.8 | Setting the active device package | 96 |
| 7.8.1 | Description | 96 |
| 7.8.2 | Structure | 96 |
| 7.8.3 | Tags | 96 |
| 7.8.4 | Example | 96 |
| 7.9 | Set active device response | 96 |
| 7.9.1 | Description | 96 |
| 7.9.2 | Structure | 96 |
| 7.9.3 | Tags | 96 |
| 7.9.4 | Example | 97 |
| 7.10 | Invalid Application package | 97 |
| 7.10.1 | Description | 97 |
| 7.10.2 | Structure | 97 |
| 7.10.3 | Tags | 97 |
| 7.10.4 | Example | 97 |
| 8 | Application-server system interactions | 98 |
| 9 | ARML future developments | 98 |

APPENDIX "A": ARML Specification

1. INTRODUCTION

1.1 Purpose of document
This document describes the structure and syntax of the ARML language.

1.2 Audience
The document is intended to be read by AIRIX developers and users of ARML.

1.3 Definitions & Acronyms

| | |
|---|---|
| ARML | AIRIX Markup Language |
| XML | Extensible Markup Language |

APPENDIX "A": ARML Specification

2 ARML OVERVIEW

ARML is an XML markup language used by the AIRIX platform. It performs three tasks;

- Data is passed back and forth between the mobile server, AIRIX platform and enterprise application using ARML.
- The AIRIX Smart Client uses ARML to define the user interface for an AIRIX-enabled application on the mobile device
- The AIRIX server uses ARML to define that data that it stores for the application in its database.

2.1 ARML design considerations

ARML has been designed with the following goals in mind;

- Transactions and screen definitions should be as independent as possible
- AIRIX should be unaware of internals of the enterprise application
- Strict conformance to the XML specification will be enforced
- Operation should be transparent to the end user
- ARML packages should be readable as is
- The minimum number of characters needed should be used

APPENDIX "A": ARML Specification

2.2 ARML usage

The diagram below illustrates how ARML is used.

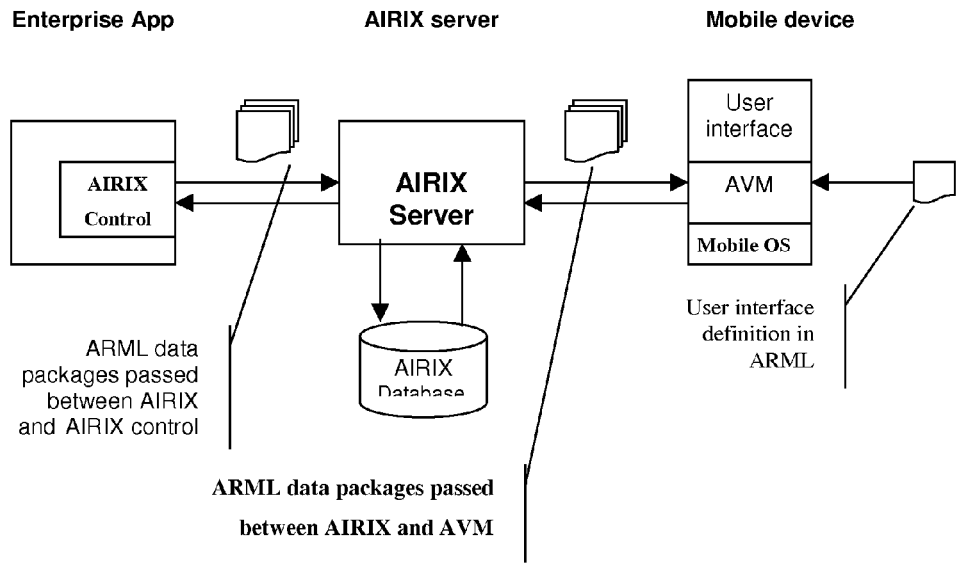

Figure 1 -The ARML environment

The key to ARML usage is the application definition file held on the AIRIX server. This file defines the AIRIX tables for the application, the allowed message set and the user interface definitions for the application on a given device.

2.3 The scratchpad area

The scratchpad is used as a temporary storage area where a global value or a value associated to a screen can be saved for future use. The syntax for a scratchpad value is as follows:
    screen scratchpad value: [SP.*screen.savename*]
    global scratchpad value: [SP.*.*savename*]

The syntax for retrieving a global scratchpad value can also be used to retrieve screen scratchpad values.

APPENDIX "A": ARML Specification

2.4 System Variables and Functions
There are several variables that are available that will retrieve application and system values to be used throughout the application. The syntax for these variables are as follows:

2.4.1 Variables:
[DATE] – returns the current system date, formatted as dd mmm yy
[TIME] – returns the current system time, formatted as hh:mm:ss am/pm.
[SYS.VAR.DATE] - returns the current system date, formatted as dd mmm yy
[SYS.VAR.MOBILEID] - retrieves the device's Mobile ID
[SYS.VAR.APPNAME] - retrieves the name of the application.
    [SYS.VAR.APPVERSION] - retrieves the version number of the application.

[SYS.VAR.SCVERSION] - retrieves the version number of the Smart Client.
[SYS.VAR.ARMLMAJOR] - retrieves the ARML major version of the application.
[SYS.VAR.ARMLMINOR] - retrieves the ARML minor version of the application.

2.4.2 Functions:
[SYS.FUNC.DATEADD([SYS.VAR.DATE],+-$x$)] - The Date Arithmetic tag is used to add or subtract days from the current date. In the tag, $x$ represents the number of days added or subtracted. Developers can also choose to substitute a hard-coded date value in the Date Arithmetic tag, in the place of the [SYS.VAR.DATE] tag.

[SYS.FUNC.DATETOSTR([SYS.VAR.DATE],d mmm yyyy h:nn:ss tz)] - The Date To String tag is used to convert date data to a string value.

[SYS.FUNC.STRTODATE([SYS.VAR.DATE],d mmm yyyy h:nn:ss tz)] - The String to Date tag is used to convert string data to a date value, in the RFC 1123 format.

2.5 Single-Field Lookup
The single-field lookup will run a simple SELECT query with one where-clause to retrieve specific data. The syntax is as follows:

[DB.DOLOOKUP(*table, field,wherefield,wherevalue*)]

APPENDIX "A": ARML Specification

3 ARML APPLICATION DEFINITION

3.1 General

3.1.1 Description

The application definition section defines the AIRIX tables and ARML data packages that are used for transactions involved with a specific application.

3.1.2 Structure

The ARML application definition has the following structure;

```
<ARML>
    <AXSCHDEF>
                                                            <EVENTS>
                                                                <EVENT>
                            (action definitions)
                                                                </EVENT>
                                                            </EVENTS>
            <AXTDEFS>
                    (table definitions)
            </AXTDEFS>
            <DPACKETS>
                    (data package definitions)
            </DPACKETS>
            <DEVICES>
                    (device interface definitions)
            </DEVICES>
    </AXSCHDEF>
</ARML>
```

3.1.3 Tags

3.1.3.1 The <AXSCHDEF> tag

These tags (<AXSCHDEF>...</AXSCHDEF>) mark the start and end of the application definition. THE AXSCHDEF tag has two attributes;

| Attribute | Optional? | Description |
|---|---|---|
| APPNAME | No | The name of the application |
| VERSION | No | Which version of the application the file describes |
| DESC | No | A text description of the application for display purposes |
| ARMLMAJOR | No | The major version of the ARML language this application definition was created with. |
| ARMLMINOR | No | The minor version of the ARML language this application definition was created with. |

3.1.3.2 The <EVENTS> tag

The <EVENT>...</EVENT> pair marks the start and end of a user-interface level event definition. See section 6 for a detailed discussion of the Smart Client event model.

APPENDIX "A": ARML Specification

3.1.3.3 The <EVENT> tag

The <EVENT>...</EVENT> pair marks the start and end of a user-interface level event definition. See section 6 for a detailed discussion of the Smart Client event model.

3.1.3.4 The <AXTDEFS> tag

The <AXTDEFS>...</AXTDEFS> pair marks the start and end of the table definitions section. It has no attributes.

3.1.3.5 The <DPACKETS> tag

The <DPACKETS>...</DPACKETS> pair marks the start and end of the data package definitions section. It has no attributes.

3.1.3.6 The <DEVICES> tag

The <DEVICES>...</DEVICES> pair marks the start and end of the device interface definitions section. It has no attributes.

APPENDIX "A": ARML Specification

3.2 Table Definitions Section

3.2.1 Description
The table definitions section defines the tables on the mobile device for the application

3.2.2 Structure
The table definitions section has the following structure;

```
{wrapper tags}
<TDEF>
        <FIELDS>
                <FLD>...</FLD>
        <FIELDS>
</TDEF>
(etc.)
{wrapper tags}
```

3.2.3 Tags

3.2.3.1 The <TDEF> tag
Each table definition is enclosed within the <TDEF>...</TDEF> pair. The TDEF tag has the following attributes;

| Attribute | Optional? | Description |
| --- | --- | --- |
| NAME | No | The number of table definitions in the section |
| PK | No | Which of the table fields is the primary key for the table |
| DELINDEX | No | The index of this table with respect to all the tables for specifying the delete order. This value is 1 based. |

3.2.3.2 The <FIELDS> tag
The <FIELDS>...</FIELDS> tag pair marks where the fields in a given table are defined. The FIELDS tag has a no attributes.

3.2.3.3 The <FLD> tag
The <FLD>...</FLD> tag pair defines a single field in a table. Enclosed between the tags is the field name. The <FLD> tag has the following structure;

| Attribute | Optional? | Description |
| --- | --- | --- |
| TYPE | No | The data type contained in the field. Permitted values are:<br>INT – integer value<br>STRING – a fixed-length string of n characters (see SIZE field)<br>MEMO – a string of max 65535 characters<br>AUTOINC – an integer value, automatically incremented by the database. This field will be read-only to the applications.<br>DATETIME – a datetime value |
| SIZE | No | If the TYPE is set to STRING, this field specifies the number of characters in the field |
| INDEXED | No | Specifies if the field needs to be indexed in the AIRIX database |
| REFERENCEFIELD | Yes | If this attribute is present, it defines that this field is a foreign key. The foreign table/field is given in the format "table(field)" |
| ALLOWNULL | No | Specifies if the field is allowed to have a null value |

APPENDIX "A": ARML Specification

3.2.4 Example

An email application would use 2 tables for storing sent emails.

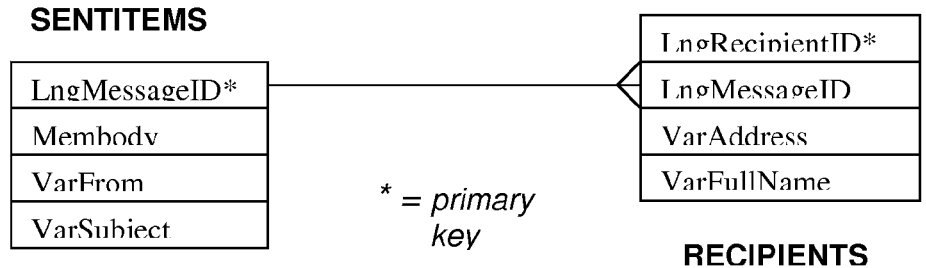

Figure 2 - sample email schema

This translates into the following ARML fragment;

```
<TDEF NAME="SENTITEMS" UPDATETYPE=NEW PK=LNGMESSAGEID DELINDEX=2>
    <FIELDS>
        <FLD TYPE="INT" SIZE="0" INDEXED="NO" REFERENCEFIELD=""
            ALLOWNULL="NO">LNGMESSAGEID</FLD>
        <FLD TYPE="STRING" SIZE="200" INDEXED="NO" REFERENCEFIELD=""
            ALLOWNULL="YES">VARFROM</FLD>
        <FLD TYPE="MEMO" SIZE="0" INDEXED="NO" REFERENCEFIELD=""
            ALLOWNULL="YES">MEMBODY</FLD>
        <FLD TYPE="STRING" SIZE="200" INDEXED="NO" REFERENCEFIELD=""
            ALLOWNULL="YES">VARSUBJECT</FLD>
    </FIELDS>
</TDEF>
<TDEF NAME="RECIPIENTS" UPDATETYPE=NEW PK=LNGRECIPIENTID DELINDEX=1>
    <FIELDS>
        <FLD TYPE="INT" SIZE="AUTOINC" INDEXED="NO" REFERENCEFIELD=""
            ALLOWNULL="NO">LNGMESSAGEID</FLD>
        <FLD TYPE="INT" SIZE="0" INDEXED="YES"
            REFERENCEFIELD="SENTITEMS(MESSAGEID)"
            ALLOWNULL="NO">LNGMESSAGEID</FLD>
        <FLD TYPE="STRING" SIZE="200" INDEXED="NO" REFERENCEFIELD=""
            ALLOWNULL="YES">VARFULLNAME</FLD>
        <FLD TYPE="STRING" SIZE="200" INDEXED="NO" REFERENCEFIELD=""
            ALLOWNULL="YES">VARADDRESS</FLD>
    </FIELDS>
</TDEF>
```

Figure 3 - a sample table definition section

APPENDIX "A": ARML Specification

3.3 Package Definitions Section

3.3.1 Description

The package definitions section defines the structure of the application packages and the data that they carry.

3.3.2 Structure

The package definitions section has the following structure;

```
{wrapper tags}
<AXDATAPACKET>
        <TABLEUPDATES>
                <TUPDATE>
                        <PKGFIELDS>
                                <PKGFLD>...</PKGFLD>
                                <PKGFLD>...</PKGFLD>
                        </PKGFIELDS>
                </TUPDATE>
        </TABLEUPDATES>
        <TABLEUPDATES>
                <TUPDATE>
                        <PKGFIELDS>
                                <PKGFLD>...</PKGFLD>
                                <PKGFLD>...</PKGFLD>
                                (etc.)
                        </PKGFIELDS>
                </TUPDATE>
        </TABLEUPDATES>
        (etc.)
</AXDATAPACKET>
{wrapper tags}
```

3.3.3 Tags

3.3.3.1 The <AXDATAPACKET> tag

The <AXDATAPACKET>...</AXDATAPACKET> pair delimits a package definition. The tag has the following attributes;

| Attribute | Optional? | Description |
|---|---|---|
| BODY | No | This field gives the name by which the data package is known |
| UPDATELOCALDATA | No | Specifies whether the package is to update the local database. |
| SENDTOAPP | No | Specifies whether the package is sent to the application server |

3.3.3.2 The <TABLEUPDATES> tag

The <TABLEUPDATES>...</TABLEUPDATES> pair marks the start and end of the table definitions section. It has no attributes.

3.3.3.3 The <TUPDATE> tag

Each table update is enclosed within the <TUPDATE>...</TUPDATE> pair. The TUPDATE tag has the following attributes;

APPENDIX "A": ARML Specification

| Attribute | Optional? | Description |
|---|---|---|
| TABLE | No | The table in the database that is updated |
| UPDATETYPE | No | The type of update that is being made to the database. Possible values are; ADD – adds a new record into the table DELETE – removes a record into the table UPDATE – modifies a record in the table |
| WHEREFIELD | Yes | For a conditional update of a table, specifies the field and table to match on. This is in the format "table(field)". |
| WHEREPARAM | Yes | Text string specifying the value. This tag has no meaning and will be skipped unless the WHEREFIELD attribute has been specified. |
| SECTION | No | An identifier for the section in the data package |
| MULTIROW | No | Boolean field specifying whether multiple rows can be updated by the tag |
| MULTIROWIDENT | Yes | If the MULTIROW attribute is set to 'YES', this field is required and specifies the |

3.3.3.4 The <PKGFIELDS> tag

The <PKGFIELDS>...</PKGFIELDS> tag pair marks where the fields in a given data package are defined. The PKGFIELDS tag has no attributes.

3.3.3.5 <The PKGFLD> tag

The <PKGFLD>...</PKGFLD> tag pair defines a single parameter in a given data package. Enclosed between the <PKGFLD>...</PKGFLD> tags is the field name. The <PKGFLD> tag has the following attributes;

| Attribute | Optional? | Description |
|---|---|---|
| NAME | No | This is the field in the AIRIX database that maps to the user interface field |
| PARAMTYPE | No | This defines the type of parameter. It can take two values; PROP – this means that the parameter appears as part of the tag definition VALUE – this means that the parameter is contained between the two tags. Only one parameter in a given data package can be of this type |

APPENDIX "A": ARML Specification

3.3.4 Example

Using the table definitions example in section 3.2.4, when the user sends an email, a data package to transport the data would update the 'SENTITEMS' table and the 'RECIPIENTS' table. The following ARML fragment defines such a data package;

```
<AXDATAPACKET BODY="ME" SENDTOMOBILE="NO" SENDTOAPP="YES">
    <TABLEUPDATES>
        <TUPDATE TABLE="SENTITEMS" UPDATETYPE="ADD" WHEREFIELD="" WHEREPARAM=""
            WHERETYPE="PROP" SECTION="MAIL" MULTIROW="NO" MULTIROWIDENT="">
            <FIELDS>
                <PKGFLD NAME="LNGMESSAGEID" PARAMTYPE="PROP">MSGID</PKGFLD>
                <PKGFLD NAME="VARFROM" PARAMTYPE="PROP">FROM</PKGFLD>
                <PKGFLD NAME="VARSUBJECT" PARAMTYPE="PROP">SUBJECT</PKGFLD>
                <PKGFLD NAME="MEMBODY" PARAMTYPE="VALUE">DATA</PKGFLD>
            </FIELDS>
        </TUPDATE>
        <TUPDATE TABLE="RECIPIENTS" UPDATETYPE="ADD" WHEREFIELD="" WHEREPARAM=""
            WHERETYPE="PROP" SECTION="RECIPS" MULTIROW="YES"
            MULTIROWIDENT="RCP">
            <FIELDS>
                <PKGFLD NAME="LNGMESSAGEID" PARAMTYPE="PROP">MSGID</PKGFLD>
                <PKGFLD NAME="VARFULLNAME" PARAMTYPE="PROP">TO</PKGFLD>
                <PKGFLD NAME="VARADDRESS" PARAMTYPE="PROP">ADDRESS</PKGFLD>
            </FIELDS>
        </TUPDATE>
    </TABLEUPDATES>
</AXDATAPACKET>
```

Figure 4 - a sample package definition

APPENDIX "A": ARML Specification

3.4 Device Interface Definitions Section

3.4.1 Description

The display definitions section contains the user interface definitions for the various mobile devices that an application supports.

3.4.2 Structure

The device display definitions section has the following structure;

```
{wrapper tags}
<DEV>
        <SCREENS>
                <SCREEN>
                        {screen definitions}
                </SCREEN>
        </SCREENS>
</DEV>
(other devices)
{wrapper tags}
```

3.4.3 Tags

3.4.3.1 The <DEV> tag

The <DEV>...</DEV> pair delimits an interface definition for a specific device. The tag has the following attributes;

| Attribute | Optional? | Description |
| --- | --- | --- |
| TYPE | No | The type of device. Allowed values are:<br>RIM – a Research in Motion Blackberry pager<br>WAP – a WAP phone<br>CE – Pocket PC |

3.4.3.2 The <SCREENS> tag

The <SCREENS>...</SCREENS> pair delimits the screens definition for a specific device. The tag has one attribute;

| Attribute | Optional? | Description |
| --- | --- | --- |
| STSCRN | No | The first screen that is displayed when the application starts |

3.4.3.3 The <SCREEN> tag

The <SCREEN>...</SCREEN> pair, and its contents are described in section 5.1.3.1

APPENDIX "A": ARML Specification

3.4.4 Example

The following example shows the screen definitions section for an application that allows a user to view their inbox and the mails in it.

```
{wrapper tags}
<DEV TYPE="RIM">
    <SCREENS>
        <SCREEN NAME="INBOX ">
            {screen definition}
        </SCREEN>
        <SCREEN NAME="VIEWNEWMAIL">
            {screen definition}
        </SCREEN>
    </SCREENS>
</DEV>
<DEV TYPE="PALM">
    <SCREENS>
        <SCREEN NAME="INBOX">
            {screen definition}
        </SCREEN>
        <SCREEN NAME="VIEWNEWMAIL">
            {screen definition}
        </SCREEN>
    </SCREENS>
</DEV>
{wrapper tags}
```

4 Application-Defined Packages

This section describes the format of application defined packages.

4.1 General

This section describes the general structure of an application-specific data package. As described in section , ;

4.1.1 Description

System level packages are sent between AIRIX and the application server, and between AIRIX and the AVM

4.1.2 Structure

An application defined package has the following structure:

```
<ARML>
    <HEAD>
        (header information)
    </HEAD>
    <PKG>
        (package information)
    </PKG>
</ARML>
```

APPENDIX "A": ARML Specification

4.1.3 Tags

4.1.3.1 The <HEAD> tag

The <HEAD> tag is as described in section 7.1.3.1

4.1.3.2 The <PKG> tag

The <PKG>...</PKG> tags delimit the package data. The PKG tag has the following attributes;

| Attribute | Optional? | Description |
| --- | --- | --- |
| TYPE | No | A text string identifying the type of package being sent |

APPENDIX "A": ARML Specification

4.2 Package information

The format and rules for application-defined data packages depend on the package definitions for that application.

4.2.1 Example

A sample data package following the rules in section 3.3.4 would have a body section like this;

```
{wrapper tags}
<PKG TYPE="ME">
    <MAIL MSGID="1" FROM="Tim Neil" FROMADDRESS="timn@nextair.com"
        SUBJECT="Hello Back">
    <DATA>I am responding to your message</DATA>
    </MAIL>
    <RECIPS>
        <RCP MSGID="1" TO="Jeff Jones"
            ADDRESS="jeff@nextair.com"></RCP>
        <RCP MSGID="1" TO="Scott Neil"
            ADDRESS="scottn@nextair.com"></RCP>
        <RCP MSGID="1" TO="Steve Hulaj"
            ADDRESS="steveh@nextair.com"></RCP>
    </RECIPS>
</PKG>
{wrapper tags}
```

Figure 5 - a sample package

We will use this sample package to illustrate how packages are derived from the package definition file. The first tag in the package is the BODY tag. This tag defines which type of package it is;

Package Definition
```
<AXDATAPACKET BODY="ME" UPDATELOCALDATA="NO"
```
Package
```
<BODY TYPE="ME">
```

The package has two sections, which correspond to the two table update sections in the package definition;

APPENDIX "A": ARML Specification

Package Definition

```
<TUPDATE TABLE="SENTITEMS" UPDATETYPE="ADD" WHEREFIELD="" WHEREPARAM=""
    WHERETYPE="PROP" SECTION="MAIL" MULTIROW="NO" MULTIROWIDENT="">

<TUPDATE TABLE="RECIPIENTS" UPDATETYPE="ADD" WHEREFIELD="" WHEREPARAM=""
    WHERETYPE="PROP" SECTION="RECIPS" MULTIROW="YES"
    MULTIROWIDENT="RCP">
```

Package

```
<MAIL MSGID="1" FROM="Tim Neil"
<RECIPS>
    <RCP>
    <RCP>
    <RCP>
</RECIPS>
```

APPENDIX "A": ARML Specification

The 'MAIL' section updates the 'SENTITEMS' table in the database. It does not update multiple rows. The 'RECIPS' section updates the 'RECIPIENTS' table in the database; it does update multiple rows, and each row is contained within a pair of <RCP> tags.

Each of the MAIL and RCP tags have fields which are used to update the field in the database tables;

Package Definition
```
<FIELDS>
    <PKGFLD NAME="LNGMESSAGEID" PARAMTYPE="PROP">MSGID</PKGFLD>

<PKGFLD NAME="VARFULLNAME" PARAMTYPE="PROP">TO</PKGFLD>

<PKGFLD NAME="VARADDRESS" PARAMTYPE="PROP">ADDRESS</PKGFLD>
</FIELDS>
```
Package
```
<RCP MSGID="1" TO="Jeff Jones" ADDRESS="jeff@nextair.com"></RCP>
```

APPENDIX "A": ARML Specification

5 USER INTERFACE DEFINITIONS

5.1 General
5.1.1 Description
A screen definition file defines a single screen for a specific device.

5.1.2 Structure
A screen definition file has the following structure;

```
<ARML>
    <SCREEN>
        <EVENTS>
            <EVENT>
                <ACTION>...</ACTION>
            </EVENT>
        </EVENTS>
        <QUERIES>
            (menu definition)
        </QUERIES>
        <MENUS>
            (menu definition)
        </MENUS>
        <BUTTONS>
            (button definitions)
        </BUTTONS>
        <TEXTITEMS>
            (textitem definitions)
        </TEXTITEMS>
        <EDITBOXES>
            (edit box definitions)
        </EDITBOXES>
        <CHOICEITEMS>
            (choice item definitions)
        </CHOICEITEMS>
        <IMAGES>
            (image definitions)
        </IMAGES>
        <LISTBOXES>
            (list box definitions)
        </LISTBOXES>
        <CHECKBOXES>
            (check box definitions)
        </CHECKBOXES>
        <GRIDS>
            (check grid definition)
        </GRIDS>
    </SCREEN>
</ARML>
```

APPENDIX "A": ARML Specification

5.1.3 Tags

5.1.3.1 The SCREEN tag

The <SCREEN>...</SCREEN> pair marks the start and end of the screen definitions section. It has attribute –

| Attribute | Optional? | Description |
|---|---|---|
| NAME | No | An identifier for the screen. This is used to qualify variables and navigate between screens |
| TITLE | No | The title that appears for the screen. |
| BACKGROUND | Yes | If used, an image that appears behind the interface elements |
| ORDERED | Yes, only applicable on WAP | If yes, WML is created with ORDERED property set to true, if NO, WML is created with ORDERED property set to false. Only applicable on WAP. See WML standard for definition of ORDERED. |

5.1.3.2 The <EVENTS> tag

The <EVENT>...</EVENT> pair marks the start and end of a user-interface level event definition. See section 6 for a detailed discussion of the Smart Client event model.

5.1.3.3 The <EVENT> tag

The <EVENT>...</EVENT> pair marks the start and end of a user-interface level event definition. See section 6 for a detailed discussion of the Smart Client event model.

5.1.3.4 The <ACTION> tag

The <ACTION>...</ACTION> pair marks the start and end of an action definition. See section 6 for a detailed discussion of the Smart Client event model.

5.1.3.5 The QUERIES tag

The <QUERIES>...</QUERIES> pair marks the start and end of the queries definitions section. It has no attributes.

5.1.3.6 The MENUS tag

The <MENUS>...</MENUS> pair marks the start and end of the menu definition section. It has no attributes.

5.1.3.7 The BUTTONS tag

The <BUTTONS>...</BUTTONS> pair marks the start and end of the button definitions section. It has no attributes.

5.1.3.8 The TEXTITEMS tag

The <TEXTITEMS>...</TEXTITEMS> pair marks the start and end of the text items section. It has no attributes.

5.1.3.9 The EDITBOXES tag

The <EDITBOXES>...</EDITBOXES> pair marks the start and end of the editboxes section. It has no attributes.

APPENDIX "A": ARML Specification

5.1.3.10 The CHOICEITEMS tag

The <CHOICEITEMS>...</CHOICEITEMS> pair marks the start and end of the choiceitems section. It has no attributes.

5.1.3.11 The IMAGES tag

The <IMAGES>...</IMAGES> pair marks the start and end of the images section. It has no attributes.

5.1.3.12 The CHECKBOXES tag

The <CHECKBOXES>...</CHECKBOXES> pair marks the start and end of the checkboxes section. It has no attributes.

5.1.3.13 The LISTBOXES tag

The <LISTBOXES>...</LISTBOXES> pair marks the start and end of the listboxes section. It has no attributes.

5.1.3.14 The GRIDS tag

The <GRIDS>...</GRIDS> pair marks the start and end of the grids section. It has no attributes.

5.2 Queries definition section

5.2.1 Description

The queries definition section describes any queries that need to be run to populate a screen.

5.2.2 Structure

The queries definition section has the following structure;

```
{wrapper tags}
<QUERIES>
      <QUERY>
      <W>...</W>
      </QUERY>
</QUERIES>
{wrapper tags}
```

5.2.3 Tags

5.2.3.1 The <QUERIES> tag

The <QUERIES> ... </QUERIES> pair marks the start and end of query definition section. It has no attributes.

5.2.3.2 The <QUERY> tag

The <QUERY>...</QUERY> pair marks the start and end of a given query. It has the following attributes:

APPENDIX "A": ARML Specification

| Attribute | Optional? | Description |
|---|---|---|
| NAME | No | Name of the query. |
| TABLE | No | The table in the database that is updated |
| ORDERBY | Yes | Specifies the name of the field in the table that the results are to be ordered on. |
| ORDERDIR | Yes | ASC or DESC, sort ascending or descending respectively. If ORDERBY is present and ORDERDIR is not, ASC is assumed. |

5.2.3.3 The <W> tag

The <W>...</W> pair marks the start and end of a given where-clause. The value of the parameter is contained within the <W>...</W> tags. This value can be a specific value or a reference to a user interface field in the format "[SP.screen.savename] or [QU.query.field]". It has the following attributes;

| Attribute | Optional? | Description |
|---|---|---|
| F | No | Specifies the field to match on. |
| E | No | Specifies the expression type. Available expression types include:<br>EQ<br>NE<br>LT<br>GT<br>BW (applicable only to fields of type STRING) |

5.3 Menu definition section
5.3.1 Description
The menu definition section describes the menu for a given screen.

5.3.2 Structure
The menu definition section has the following structure;

{wrapper tags}

```
<MENUS>
 <MENU>
       <MENUITEM>
            <EVENTS>
                  <EVENT>
                        <ACTION>...</ACTION>
                  </EVENT>
            </EVENTS>
       </MENUITEM>
 </MENU>
</MENUS>
```
{wrapper tags}

5.3.3 Tags

5.3.3.1 The <MENUS> tag
The <MENUS> ... </MENUS> pair marks the start and end of menu definition section. It has no attributes.

APPENDIX "A": ARML Specification

5.3.3.2 The <MENU> tag

The <MENU> ... </MENU> pair marks the start and end of a menu definition. It has the following attributes.

| Attribute | Optional? | Description |
|---|---|---|
| NAME | No | An internal identifier for the menu |
| CAPTION | No | The text that appears for this item in the menu |

5.3.3.3 The <MENUITEM> tag

The <MENUITEM>...</MENUITEM> pair marks the start and end of a menuitem definition. It has the following tags;

| Attribute | Optional? | Description |
|---|---|---|
| NAME | No | An internal identifier for the menu |
| CAPTION | No | The text that appears for this item in the menu |
| INDEX | Yes | The index of this menu item with respect to all of the menu items on this menu. |
| READONLY | Yes | If True, the menu item is inactive. False is the default. |

5.3.3.4 The <EVENTS> tag

The <EVENT>...</EVENT> pair marks the start and end of a user-interface level event definition. See section 6 for a detailed discussion of the Smart Client event model.

5.3.3.5 The <EVENT> tag

The <EVENT>...</EVENT> pair marks the start and end of a user-interface level event definition. See section 6 for a detailed discussion of the Smart Client event model.

5.3.3.6 The <ACTION> tag

The <ACTION>...</ACTION> pair marks the start and end of an action definition. See section 6 for a detailed discussion of the Smart Client event model.

5.4 Buttons definition section
5.4.1 Description
The buttons definition section describes the buttons that appear on a given screen.

5.4.2 Structure
The buttons definition section has the following structure;

```
{wrapper tags}
<BTN>
        <EVENTS>
                <EVENT>
                        <ACTION>...</ACTION>
                </EVENT>
        </EVENTS>
</BTN>
{wrapper tags}
```

APPENDIX "A": ARML Specification

5.4.3 Tags

5.4.3.1 The BTN tag

The <BTN>...</BTN> pair marks the start and end of a button definition. It has one attribute –

| Attribute | Optional? | Description |
| --- | --- | --- |
| NAME | No | An identifier for the button. |
| INDEX | No | The order in which the button appears |
| CAPTION | No | The caption that appears on a given button |
| X | Yes | The X-coordinate of the button on the screen. This attribute may not be meaningful in some display environments, in which case it would be skipped without processing by the parser |
| Y | Yes | The Y-coordinate of the button on the screen. This attribute may not be meaningful in some display environments, in which case it would be skipped without processing by the parser |
| HT | Yes | This is the Height of the button. This attribute may not be meaningful in some display environments, in which case it would be skipped without processing by the parser |
| WT | Yes | This is the Width of the Button. This attribute may not be meaningful in some display environments, in which case it would be skipped without processing by the parser |
| READONLY | Yes | If True, the button is not enabled. False is the default. |

5.4.3.2 The <EVENTS> tag

The <EVENT>...</EVENT> pair marks the start and end of a user-interface level event definition. See section 6 for a detailed discussion of the Smart Client event model.

5.4.3.3 The <EVENT> tag

The <EVENT>...</EVENT> pair marks the start and end of a user-interface level event definition. See section 6 for a detailed discussion of the Smart Client event model.

5.4.3.4 The <ACTION> tag

The <ACTION>...</ACTION> pair marks the start and end of an action definition. See section 6 for a detailed discussion of the Smart Client event model.

5.5 Text Items definition section
5.5.1 Description
The text items definition

5.5.2 Structure
The text items section has the following structure;

```
{wrapper tags}
<TI>
        <EVENTS>
                <EVENT>
                        <ACTION>...</ACTION>
                </EVENT>
        </EVENTS>
</TI>
```

APPENDIX "A": ARML Specification

{wrapper tags}

5.5.3 Tags

5.5.3.1 The TI tag

The <TI>...</TI> pair marks the start and end of the screen definitions section. It has attribute –

| Attribute | Optional? | Description |
|---|---|---|
| INDEX | No | The order in which the text item appears |
| NAME | No | An Identifier for the Text Item |
| CAPTION | No | Text to appear on the Text Item |
| X | Yes | The X-coordinate of the text item on the screen. This attribute may not be meaningful in some display environments, in which case it would be skipped without processing by the parser |
| Y | Yes | The Y-coordinate of the text item on the screen. This attribute may not be meaningful in some display environments, in which case it would be skipped without processing by the parser |
| HT | Yes | This is the Height of the Text Item. This attribute may not be meaningful in some display environments, in which case it would be skipped without processing by the parser |
| WT | Yes | This is the Width of the Text Item. This attribute may not be meaningful in some display environments, in which case it would be skipped without processing by the parser |

5.5.3.2 The <EVENTS> tag

The <EVENT>...</EVENT> pair marks the start and end of a user-interface level event definition. See section 6 for a detailed discussion of the Smart Client event model.

5.5.3.3 The <EVENT> tag

The <EVENT>...</EVENT> pair marks the start and end of a user-interface level event definition. See section 6 for a detailed discussion of the Smart Client event model.

5.5.3.4 The <ACTION> tag

The <ACTION>...</ACTION> pair marks the start and end of an action definition. See section 6 for a detailed discussion of the Smart Client event model.

5.6 Edit boxes definition section

5.6.1 Description

The edit boxes definition section describes what edit boxes exist for the screen.

5.6.2 Structure

The edit boxes section has the following structure;

{wrapper tags}
<EB>
    <EVENTS>

APPENDIX "A": ARML Specification

```
            <EVENT>
                    <ACTION>...</ACTION>
            </EVENT>
        </EVENTS>
</EB>
{wrapper tags}
```

5.6.3 Tags

5.6.3.1 The EB tag

The <EB>...</EB> pair marks an edit box definition. It has the following attributes –

| Attribute | Optional? | Description |
| --- | --- | --- |
| NAME | No | An identifier for the edit box. |
| TEXT | No | The text to display in the edit box before any entry has been made. Only used if the DATASRC attribute is invalid or omitted. Can be a scratchpad or query value of the form [SP.screen.savename] or [QU.query.field]. |
| INDEX | No | The order in which the edit box appears |
| CAPTION | No | The caption for on a given edit box. |
| MULTILINE | No | Boolean field that indicates whether the edit box is a multiline field. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| FT | Yes | Specifies the type of value expected (INT, STRING, MEMO,DATETIME) for the VM to validate prior to continuing a Save. If omitted, STRING is the default data type. |
| DATASRC | Yes | If present, the query and field in the query that populates this edit box. This is given in the format "query.field". |
| READONLY | Yes | If "TRUE" the edit box will be read only, otherwise it is editable. "FALSE is the default value. |

5.6.3.2 The <EVENTS> tag

The <EVENT>...</EVENT> pair marks the start and end of a user-interface level event definition. See section 6 for a detailed discussion of the Smart Client event model.

5.6.3.3 The <EVENT> tag

The <EVENT>...</EVENT> pair marks the start and end of a user-interface level event definition. See section 6 for a detailed discussion of the Smart Client event model.

APPENDIX "A": ARML Specification

5.6.3.4 The <ACTION> tag

The <ACTION>...</ACTION> pair marks the start and end of an action definition. See section 6 for a detailed discussion of the Smart Client event model.

5.7 Choice items definition section
5.7.1 Description

The choice item definitions section describes the choice items that exist on a given screen. A choice item is an interface item that requires the user to make a selection from a list of options. It can be represented in different ways on different devices; on a RIM pager, it is a choice box, while on a WinCE device, it is a drop-down list.

5.7.2 Structure

The choice items section has the following structure;

```
{wrapper tags}
<CHOICE>
        <EVENTS>
                <EVENT>
                        <ACTION>...</ACTION>
                </EVENT>
        </EVENTS>
        <ITEMS>
                <I>...</I>
        </ITEMS>
</CHOICE>
{wrapper tags}
```

5.7.3 Tags

5.7.3.1 The <CHOICE> tag

The <CHOICE>...</CHOICE> pair marks the start and end of a choice item definition. It has these attributes –

| Attribute | Optional? | Description |
| --- | --- | --- |
| NAME | No | An identifier for the choice item. |
| TEXT | No | The text to display in the choice item before any selection has been made. |
| INDEX | No | The order in which the choice item appears |
| CAPTION | No | The caption that appears for a given choice item |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the choice item on the screen. This attribute may not be meaningful in some display environments, in which case it would be skipped without processing by the parser |
| Y | Yes | The Y-coordinate of the choice item on the screen. This attribute may not be meaningful in some display environments, in which case it would be skipped without processing by the parser |
| DATASRC | Yes | If present, the query and field in the query that populates this choice item. This is given in the format "query.field". |

APPENDIX "A": ARML Specification

| | | |
|---|---|---|
| IDDATASRC | Yes | If present, the query and field in the query that populates the Ids for this choice item. This is given in the format "query.field". The ID values created by the attributes should correspond directly to the choice item values. I.e. they should create a value, id pair. |
| READONLY | Yes | If "True", the control cannot be modified. "False" is the default. |
| SI | Yes | The value to indicate which item of the choice item is to be selected when loaded. This value will be compared with the ID property (hard-coded items) or the IDDATASRC property (database items). |

5.7.3.2 The <ITEMS> tag

The <ITEMS>...</ITEMS> pair marks the start and end of a list of items to be included in the in the choice item. If a datasrc is specified, the <ITEMS> section is ignored.

5.7.3.3 The <I> tag

The <I>...</I> pair marks the start and end of an individual item in the choice items list. It has the following attributes:

| Attribute | Optional? | Description |
|---|---|---|
| ID | Yes | An id used to identify this item in the list. |

The value between the pair is the text value that is to be displayed in the choice item.

5.7.3.4 The <EVENTS> tag

The <EVENT>...</EVENT> pair marks the start and end of a user-interface level event definition. See section 6 for a detailed discussion of the Smart Client event model.

5.7.3.5 The <EVENT> tag

The <EVENT>...</EVENT> pair marks the start and end of a user-interface level event definition. See section 6 for a detailed discussion of the Smart Client event model.

5.7.3.6 The <ACTION> tag

The <ACTION>...</ACTION> pair marks the start and end of an action definition. See section 6 for a detailed discussion of the Smart Client event model.

5.8 Checkboxes definition section
5.8.1 Description
The checkboxes section describes a check box that appears on a given screen.

5.8.2 Structure
The checkboxes section has the following structure;

```
{wrapper tags}
        <CHK>
                <EVENTS>
                        <EVENT>
                                <ACTION>...</ACTION>
                        </EVENT>
```

APPENDIX "A": ARML Specification

```
        </EVENTS>
    </CHK>
{wrapper tags}
```

5.8.3 Tags

5.8.3.1 The CHK tag

The <CHK>...</CHK> pair marks a check box definition

| Attribute | Optional? | Description |
|---|---|---|
| NAME | No | An identifier for the check box. |
| INDEX | No | The index of this control with respect to the list of all controls on the screen. |
| CAPTION | No | The text to be displayed for this check box if the DATASRC is not available or is not specified. |
| Save | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the check box on the screen. This attribute may not be meaningful in some display environments, in which case it would be skipped without processing by the parser |
| Y | Yes | The Y-coordinate of the check box on the screen. This attribute may not be meaningful in some display environments, in which case it would be skipped without processing by the parser |
| HT | Yes | The Height of the Checkbox. This attribute may not be meaningful in some display environments, in which case it would be skipped without processing by the parser |
| WT | Yes | The Width of the Checkbox. This attribute may not be meaningful in some display environments, in which case it would be skipped without processing by the parser |
| DATASRC | Yes | If present, the query and field in the query that populates this check box. This is given in the format "query.field". |
| VALUE | Yes | If present, specifies the initial state of the check box ('TRUE' = checked, 'FALSE' = Unchecked. If unspecified, FALSE is the default value. |
| READONLY | Yes | If "TRUE" the check box cannot be modified. "FALSE" is the default value. |

5.8.3.2 The <EVENTS> tag

The <EVENT>...</EVENT> pair marks the start and end of a user-interface level event definition. See section 6 for a detailed discussion of the Smart Client event model.

5.8.3.3 The <EVENT> tag

The <EVENT>...</EVENT> pair marks the start and end of a user-interface level event definition. See section 6 for a detailed discussion of the Smart Client event model.

5.8.3.4 The <ACTION> tag

The <ACTION>...</ACTION> pair marks the start and end of an action definition. See section 6 for a detailed discussion of the Smart Client event model.

APPENDIX "A": ARML Specification

5.9 Listboxes definition section

5.9.1 Description
The listboxes section describes a list box that appears on a given screen.

5.9.2 Structure
The listboxes section has the following structure;

```
{wrapper tags}
    <LB>
            <EVENTS>
                    <EVENT>
                            <ACTION> ... </ACTION>
                    </EVENT>
            </EVENTS>
            <ITEMS>
                    <I> ... </I>
            </ITEMS>
    </LB>
{wrapper tags}
```

5.9.3 Tags

5.9.3.1 The LB tag
The <LB>...</LB> pair marks a list box definition

| Attribute | Optional? | Description |
| --- | --- | --- |
| NAME | No | An identifier for the list box. |
| INDEX | No | The index of this control with respect to all of the controls on the screen. |
| CAPTION | No | The text to be displayed as the title of this list box, where applicable. |
| SAVE | No | Boolean value indicating whether or not to save the value in this field to temporary storage for use by other screens later on. Saving the value to the scratchpad is triggered by either exiting the screen or by an explicit 'SAVE' action on a user interface control. |
| SAVENAME | Yes | If present, the name to save the field under in the scratchpad. This attribute has no meaning unless the SAVE attribute is set to 'Yes' |
| X | Yes | The X-coordinate of the list box on the screen. This attribute may not be meaningful in some display environments, in which case it would be skipped without processing by the parser |
| Y | Yes | The Y-coordinate of the list box on the screen. This attribute may not be meaningful in some display environments, in which case it would be skipped without processing by the parser |
| HT | Yes | The Height of the Listbox. This attribute may not be meaningful in some display environments, in which case it would be skipped without processing by the parser |
| WT | Yes | The Width of the Listbox. This attribute may not be meaningful in some display environments, in which case it would be skipped without processing by the parser |
| DATASRC | Yes | If present, the query and field in the query that populates this list box. This is given in the format "query.field". |
| IDDATASRC | Yes | If present, the query and field in the query that populates the list box Ids. This is given in the format "query.field". This value will create a list of ID values that correspond to the list box values in DATASRC. I.e. they should create a value, id pair. |

APPENDIX "A": ARML Specification

| READONLY | Yes | If "TRUE" the list box cannot be modified. "FALSE" is the default. |
|---|---|---|
| SI | Yes | The value to indicate which item of the choice item is to be selected when loaded. This value will be compared with the ID property (hard-coded items) or the IDDATASRC property (database items). |

5.9.3.2 The <ITEMS> tag
The <ITEMS>...</ITEMS> pair marks the start and end of a list of items to be included in the in the list box. If a datasrc is specified, the <ITEMS> section is ignored.

5.9.3.3 The <I> tag
The <I>...</I> pair marks the start and end of an individual item in the list box items list. It has the following attributes:

| Attribute | Optional? | Description |
|---|---|---|
| ID | Yes | An id used to identify this item in the list. |

The value between the pair is the text value that is to be displayed in the list box. Can be a scratchpad or query value of the form [SP.screen.savename] or [QU.query.field].

5.9.3.4 The <EVENTS> tag
The <EVENT>...</EVENT> pair marks the start and end of a user-interface level event definition. See section 6 for a detailed discussion of the Smart Client event model.

5.9.3.5 The <EVENT> tag
The <EVENT>...</EVENT> pair marks the start and end of a user-interface level event definition. See section 6 for a detailed discussion of the Smart Client event model.

5.9.3.6 The <ACTION> tag
The <ACTION>...</ACTION> pair marks the start and end of an action definition. See section 6 for a detailed discussion of the Smart Client event model.

5.10 Grids

5.10.1 Description
Grids allow data to be displayed in row-column format. Grids can display data from a data source (query) or they can contain hard coded values. Each column in a grid can be visible or hidden. Hidden values are maintained, but not visible to the user.

5.10.2 Structure
The grids section has the following structure;

```
{wrapper tags}
        <GRID>
                <COLS>
                        <COL> ... </COL>
                </COLS>
                <ROWS>
                        <R>
```

APPENDIX "A": ARML Specification

```
            <V> ... </V>
         </R>
      </ROWS>
   </GRID>
{wrapper tags}
```

5.10.3 Tags

5.10.3.1 GRID Tag

<GRID>...</GRID> The grid item itself will have the following attributes

| Attribute | Optional? | Description |
|---|---|---|
| NAME | No | An identifier for the edit box. |
| INDEX | No | The order in which the edit box appears |
| X | Yes | The X-coordinate of the edit box on the screen. This attribute may not be meaningful in some display environments, in which case it would be skipped without processing by the parser |
| Y | Yes | The Y-coordinate of the edit box on the screen. This attribute may not be meaningful in some display environments, in which case it would be skipped without processing by the parser |
| HT | Yes | The Height of the Edit Box. This attribute may not be meaningful in some display environments, in which case it would be skipped without processing by the parser |
| WT | Yes | The Width of the Edit Box. This attribute may not be meaningful in some display environments, in which case it would be skipped without processing by the parser |
| GRDSRC | Yes | This is the Query on the screen that will provide the data to the grid. No field name will be specified in this value |

5.10.3.2 COLS Tag

<COLS>...</COLS> This tag contains no attributes. But instead contains all the columns that are associated with the grid in the order in which they appear from left to right.

5.10.3.3 COL Tag

<COL>...</COL> This tag will determine the column specification for the grid. The attributes for this item are the following:

| Attribute | Optional? | Description |
|---|---|---|
| CAPTION | Yes | This is the caption that appears at the top of the grid where applicable. |
| FIELDNAME | Yes | This field name represents the Field to pull information from out of the GRDSRC of the grid control. |
| SAVE | No | This true false value will be checked when the SAVE action is called to save values to the scratchpad |
| SAVENAME | Yes | This is the name in which the data will be saved when the SAVE action is called and the column is marked for Saving |
| WT | Yes | The Width of the Edit Box. This attribute may not be meaningful in some display environments, in which case it would be skipped without processing by the parser |

APPENDIX "A": ARML Specification

5.10.3.4 ROWS Tag

<ROWS>...</ROWS> This will Indicate any hard coded rows that would be created in the design studio. It does not contain any attributes but instead contains all the row definitions.

5.10.3.5 R Tag

<R>...</R> This is the row declaration that contains all the values for the row that has been hard coded. It has no attributes itself, but contains the value definitions for the row.

5.10.3.6 V Tag

<V>...</V> This definition contains the data that is related to the ROW and to the column.

5.10.4 Example

An example of a grid declaration is as follows:

```
<GRID INDEX="2" NAME="mygrid" X="10" Y="50" HT="100" WT="100" GRDSRC="QUERY1">
<COLS>
<COL CAPTION="Id" FIELDNAME="lngID" SAVE="TRUE" SAVENAME="lngID" WT="20"></COL>
<COL CAPTION="Subject" FIELDNAME="strSubject" SAVE="TRUE" SAVENAME="Sub" WT="80"></COL>
</COLS>
<ROWS>
  <R>
    <V>343432</V>
    <V>This is a subject</V>
  </R>
  <R>
    <V>5456</V>
    <V>This is another subject</V>
  </R>
</ROWS>
</GRID>
```

6 THE SMART CLIENT EVENT MODEL

The Smart Client has a set of actions that it ties to events. Events can occur at the application level, the screen level or the user interface item level; an application level event is listened for throughout the operation of the application, a screen level event is listened for while the screen is displayed, and so on. If an action for an event is defined at multiple levels, the lowest level has precedence; i.e., user interface actions override screen level actions, which override application level actions. An attempt to list an event multiple times at the same level (application, screen, item) is invalid and will generate an error message.

The following ARML fragment illustrates this schema (tags and attributes not relevant to the event model have been omitted);

```
<AXTSCHDEF>
  <EVENTS>
    <EVENT>
      <ACTION>...</ACTION>
```

APPENDIX "A": ARML Specification

```
            <ACTION>...</ACTION>
            <EVENTS>
              <EVENT>
                <ACTION>...</ACTION>
              </EVENT>
            </EVENTS>
            <INTERFACE>
              <SCREEN>
                <EVENT>
                  <ACTION>...</ACTION>
                </EVENT>
                <EVENT>
                  <ACTION>...</ACTION>
                </EVENT>
                <BUTTON>
                  <EVENT>
                    <ACTION>...</ACTION>
                  </EVENT>
                  <EVENT>
                    <ACTION>...</ACTION>
                  </EVENT>
                </BUTTON>
              </SCREEN>
            </INTERFACE>
          </AXTSCHDEF>
```

6.1 The EVENTS tag

The <EVENTS>...</EVENTS> pair marks the start and end of the events section. It has no attributes.

6.2 The EVENT tag

The <EVENT>...</EVENT> pair marks the start and end of an event definition. It has the following attributes;

| Attribute | Optional? | Description |
|---|---|---|
| TYPE | No | The type of event that should be performed when the button is pushed. Allowed values are; BUTTONCLICK MENUITEMSELECTED DATA |

6.2.1 The BUTTONCLICK event

The button click event occurs when the user selects a button. It has no attributes.

6.2.2 The MENUITEMSELECTED event

The menu items selected event occurs when the user selects a menu item. It has no attributes.

6.2.3 The DATA event

The data event occurs when ARML data is received from the wireless interface. It has the following attributes;

| Attribute | Optional? | Description |
|---|---|---|

APPENDIX "A": ARML Specification

| NAME | No | The identifier of the specific package |
|---|---|---|

6.3 The ACTION tag

The <ACTION>...</ACTION> pair marks the start and end of an event definition. It has one fixed attribute, and a number of attributes that may or may not appear depending on the type of action required. The fixed attribute is;

| Attribute | Optional? | Description |
|---|---|---|
| TYPE | No | The type of action that should be performed when the button is pushed. Allowed values are; OPEN ARML SAVE PURGE NOTIFY CLOSE ALERT IF...Then...Else CLOSESCREEN REFRESH SAVEITEM |

6.3.1 The OPEN action

The open action tells the Smart Client to open a new screen. It adds one extra attribute to the ACTION tag;

| Attribute | Optional? | Description |
|---|---|---|
| NAME | No | The name of the screen to open |
| NEWINST | Yes | If true, a new instance of the screen is created. If false, the least recently used instance of the screen is opened and the data is not refreshed. True is the default. |

6.3.2 The ARML action

The arml action tells the Smart Client to compose and send an arml package. It does not add any attributes to the ACTION tag, but has the following subtag;

<ARMLTEXT>

Contained between the <ARMLTEXT>...</ARMLTEXT> pair is one of the application-defined data packages. Individual data items are marked with the user interface item that their value should be taken from, in the format "[SP.*screen.savename*]", or [QU.*query.field*]. If *screen* is not the current screen, then the Smart Client will look for the data in its scratchpad. See section 0 for an example of the ARML action.

6.3.3 The SAVE action

The save action tells the Smart Client to save all fields marked as persistent (i.e., they are defined with SAVE="Yes") to be saved to the scratchpad area. It has no attributes.

APPENDIX "A": ARML Specification

6.3.4 The PURGE action
The purge action tells the Smart Client to clear all fields that have been saved to the scratchpad. It has no attributes.

6.3.5 The NOTIFY action
The notify action tells the Smart Client to activate the configured notification on a device. For devices where this has no meaning, it will cause a beep to be played. It has no attributes.

6.3.6 The CLOSE action
The close action tells the Smart Client to close the application. It has no attributes.

6.3.7 The ALERT action
The alert action tells the Smart Client to display an alert item (e.g., a message box on Windows, an alert box on the RIM pager, an alert card on WAP). It has the following attributes;

| Attribute | Optional? | Description |
| --- | --- | --- |
| CAPTION | Yes | The caption to display in the title bar of the message box |
| TEXT | Yes | The text to display in the message box |

6.3.8 The INTEGRATION action
The integration action tells the Smart Client to pass data to an interface exposed on a device. For example a COM interface on Pocket PC. This action will allow the developer to pass a parameter into an exposed method and then also save the result of that method in a global scratchpad value. The contents of the integration action's element are the input values to be passed to the interface. It has the following attributes;

| Attribute | Optional? | Description |
| --- | --- | --- |
| CLSID | No | This is the class identifier of the component that is to be called. |
| SAVE | No | This tells the smart client if it should save the result into a global scratchpad value or not. |
| SAVENAME | Yes | This is the name of the global scratchpad value |

Example ARML:

<ACTION TYPE="*INTEGRATION*" CLSID="*AirixSignature.AirixSignatureCtrl*" SAVENAME="" SAVE="*FALSE*">*[SP.*.SIGNATURE]*</ACTION>

6.3.9 The CLOSESCREEN action
The close screen action tells the Smart Client to close all open instances of the screen specified by name in the NAME attribute. This action has the following attributes:

| Attribute | Optional? | Description |
| --- | --- | --- |
| NAME | No | Name of the screen to close. |

APPENDIX "A": ARML Specification

6.3.10 The REFRESH action
The refresh action tells the Smart Client to re-run any queries and re-initialize all UI elements on the screen with the name specified by the NAME attribute. If there are multiple open instances of the screen, all open instances will be refreshed. The refresh action has the following attributes:

| Attribute | Optional? | Description |
|---|---|---|
| NAME | No | Name of the screen to refresh. |

6.3.11 The SAVEITEM action
The saveitem action tells the Smart Client to create a new scratchpad item or to edit an existing scratchpad item. The value of the scratchpad item is defined within the <ACTION>...</ACTION> tags. The saveitem action has the following attributes:

| Attribute | Optional? | Description |
|---|---|---|
| SPN | No | Name of the scratchpad item to create or modify. |

6.3.12 The IF Action
This action will contain two lists of actions. One a list of actions to perform if the condition evaluates to TRUE (IFLIST), and another list of actions to perform if the condition evaluates to FALSE (ELSEIFLIST).

The structure of the action is as follows:
```
<ACTION TYPE="IF">
        <COND EVAL="parameter" TYPE="condition type" VALUE="literal">
        </COND>
        <IFLIST>
                <ACTION></ACTION>
        </IFLIST>
        <ELSEIFLIST>
                <ACTION></ACTION>
        </ELSEIFLIST>
</ACTION>
```

6.3.12.1 Conditions (COND)
Conditions are used in conjunction with the IF Action. Conditions are specified as follows:

| Attribute | Optional? | Description |
|---|---|---|
| EVAL | NO | Specifies the parameter to be evaluated. Can be hard coded, scratchpad, or query values. It is the "input" to the function. |
| TYPE | NO | Specifies the type of the condition. Possible values are:<br>LESSTHAN<br>MORETHAN<br>EQUALS<br>ISNUMERIC<br>ISALPHA<br>ISEMAIL<br>ISFORMAT<br>MAXCHARS<br>MINCHARS |

APPENDIX "A": ARML Specification

| VALUE | Depends on TYPE | The value that EVAL will be evaluated against. Not relevant for all conditions. |
|---|---|---|

The following is a description of each of the supported conditions:
- EQUALS, this function will take an input and a value to evaluate the input against. If the two items are determined to be Equal, the condition will return true. If they are not equal, the condition will return false. The value and the input must be of the same data type, otherwise the condition will return false. Memo values will be treated as a string and auto-increment types will be treated as integers. The following criteria will be used to determine equality:
  o Two strings are equal if each of the characters in the strings is identical and the strings have the same number of characters. The string comparison will not be case sensitive.
  o Two integers are equal if their values are mathematically equal.
- MORETHAN, this function will take an input and a value to evaluate the input against. If the input is determined to be greater in value than the evaluation value, the condition will return true. If the values are equal, false is returned. If the evaluation value is determined to be greater than the input, the function will return false. The evaluation value and the input must be of the same data type, otherwise an error condition will occur. Memo values will be treated as a string and the auto-increment type will be treated as an integer. The following criteria will be used to determine which value is greater:
  o String A is more in value than String B if String A occurs before String B in alphabetical order.
  o Integer A is greater than Integer B if A > B, mathematically.
- LESSTHAN, this function will take an input and a value to evaluate the input against. If the input is determined to be lesser in value than the evaluation value, the condition will return true. If the values are equal, false is returned. If the evaluation value is determined to be lesser than the input, the function will return false. The evaluation value and the input must be of the same data type, otherwise an error condition will occur. Memo values will be treated as a string and the auto-increment type will be treated as an integer. The following criteria will be used to determine which value is greater:
  o String A is lesser in value than String B if String A occurs after String B in alphabetical order.
  o Integer A is greater than Integer B if A < B, mathematically.
- ISNUMERIC, this function will take an input and evaluate whether or not it is a value number. If the input can be converted successfully to a number, the function will return true. If the input cannot be converted to a number, the function will return false. All input values will be treated as a string data type.
- ISALPHA, this function will take an input and evaluate whether or not it contains only alphabetic characters. Alphabetic characters are defined as all characters from A-Z, a-z,, and spaces. All input values will be treated as a string data type.
- ISEMAIL, this function will take an input and evaluate whether or not it contains a string of the form _something@something_. All input values will be treated as a string data type.

APPENDIX "A": ARML Specification

- ISFORMAT, this function will take an input and a value to evaluate the input against. If the input is determined to be formatted as the evaluation value, the condition will return true. If the evaluation value is determined to be formatted differently than the input, the function will return false. The evaluation value must comply with the ARML formatting standards.
- MAXCHARS, this function will take an input and evaluate whether or not the number of characters in the string is less than or equal to the evaluation value passed into the function. If the number of characters in the string is less than or equal to the evaluation value, true is returned. If the number of characters in the string is greater than the evaluation value, false is returned. All input values will be treated as a string data type.
- MINCHARS, this function will take an input and evaluate whether or not the number of characters in the string is greater than or equal to the evaluation value passed into the function. If the number of characters in the string is greater than or equal to the evaluation value, true is returned. If the number of characters in the string is less than the evaluation value, false is returned. All input values will be treated as a string data type.

Example:
```
<ACTION TYPE="IF">
        <COND EVAL="[QUERY1.STRREAD]" TYPE="EQUALS" VALUE="READ"></COND>
        <IFLIST>
                <ACTION TYPE="SAVE"></ACTION>
                <ACTION TYPE="OPEN" NAME="INBOX" NEWINST="FALSE"></ACTION>
        </IFLIST>
        <ELSELIST>
                <ACTION TYPE="OPEN" NAME="MSGREAD" NEWINST="FALSE"></ACTION>
        </ELSELIST>
</ACTION>
```

Example of airix event model

The following example serves to illustrate how a screen is used to compose a data package to be sent back to the AIRIX server. The example used is a screen giving the bare functionality for composing a basic email message – to simplify the example, the user cannot cancel the action, and multiple recipients are not allowed.

```
<ARML>
    <SCREEN NAME="NewMsg">
        <BUTTONS>
            <BTN NAME="OK" CAPTION="Send" INDEX="0">
                <EVENTS>
                    <EVENT TYPE="MODIFY">
                        <ACTION TYPE="ARML">
                            <ARMLTEXT>
                                <BODY TYPE="ME">
                                    <ME MSGID="1" FROM="Tim Neil"
                                        SUBJECT="[SP.NewMsg.Subject]">
                                        <DATA>[SP.NewMsg.Body]</DATA>
                                        <RECIPS>
```

APPENDIX "A": ARML Specification

```
                            <RCP MSGID="1"
                    TO="[SP.NewMsg.To]"></RCP>
                                </RECIPS>
                             </ME>
                          </BODY>
                      </ARMLTEXT>
                   </ACTION>
               </EVENT>
            </EVENTS>
         </BTN>
      </BUTTONS>
      <EDITBOXES>
         <EB NAME="To" INDEX="1"></EB>
         <EB NAME="Subject" INDEX="2"></EB>
         <EB NAME="Body" INDEX="3"></EB>
      </EDITBOXES>
   </SCREEN>
</ARML>
```

The Editboxes section at the bottom defines 3 editboxes, with the names of 'To', 'Subject', and 'Body';

```
<EB NAME="To" INDEX="1"></EB>
<EB NAME="Subject" INDEX="2"></EB>
<EB NAME="Body" INDEX="3"></EB>
```

There is one button on the screen, with the name of 'OK';

```
<BTN NAME="OK" CAPTION="Send" INDEX="0">
```

When the user clicks on OK, the button composes an ARML package to be sent to the AIRIX server;

```
<EVENT>
   <ACTION TYPE="ARML">
```

The ARML package sent is an 'ME' package as described in the example in section 4.2.1. It is composed as follows;

```
<BODY TYPE="ME">
   <ME MSGID="1" FROM="Tim Neil"
        SUBJECT="[SP.NewMsg.Subject]">
       <DATA>[SP.NewMsg.Body]</DATA>
       <RECIPS>
           <RCP MSGID="1" TO="[SP.NewMsg.To]"></RCP>
       </RECIPS>
    </ME>
</BODY>
```

The subject field is taken from the edit box named 'Subject';

```
<ME MSGID="1" FROM="Tim Neil" SUBJECT="[SP.NewMsg.Subject]">
```

APPENDIX "A": ARML Specification

The recipients field is taken from the edit box named 'Subject';

```
<RECIPS>
    <RCP MSGID="1" TO="[SP.NewMsg.To]"></RCP>
</RECIPS>
```

Finally the text of the message is filled from the 'Body' field;

```
<DATA>[SP.NewMsg.Body]</DATA>
```

7  AVM-SERVER SYSTEM INTERACTIONS

This section describes the primitives that are used for system-level interactions that the AIRIX Smart Client has with the AIRIX server.

7.1  General
7.1.1  Description
System level packages are sent between AIRIX and the AVM (wirelessly).

7.1.2  Structure
System interactions are performed by exchanging ARML data packages with the following structure;

```
<ARML>
<HEAD>...</HEAD>
<SYS>
{data}
</SYS>
</ARML>
```

7.1.3  Tags

7.1.3.1  The <HEAD> tag
The package header is delimited by the <HEAD>...</HEAD> tags. Contained in text between the two tags is the id of the destination mobile. The HEAD tag has the following attributes;

| Attribute | Optional? | Description |
|---|---|---|
| DT | No | The date & time in RFC 1123 format (including time zone) |
| ID | No | A unique ID for the message |
| VERSION | No | The version number of the application (currently "2.0") |
| APPNAME | No | The application name ("0" for System Messages) |
| DEVICE | No | A numeric constant identifying the device |
| PID | Yes | A unique value used to designate a device. |
| AVMV | No | The version number of the Smart Client. |

7.1.3.2  The <SYS> tag
The <SYS>...</SYS> pair contains the actual system package. The tag does not have any attributes.

APPENDIX "A": ARML Specification

7.2 Device Registration & deregistration package

7.2.1 Description

Device registration packages are sent from the AVM to the AIRIX server when a user registers their device.

7.2.2 Structure

A device registration package has the following structure;

```
{wrapper tags}
<REG>
        <USERNAME> {data} </USERNAME>
        <PASSWORD> {data} </PASSWORD>
</REG>
{wrapper tags}
```

7.2.3 Tags

7.2.3.1 The <REG> tag

The <REG>...</REG> pair delimit the registration request. The tag has no attributes.

7.2.3.2 The <USERNAME> tag

The <USERNAME>...</ USERNAME > pair contain the user name. The tag does not have any attributes.

7.2.3.3 The <PASSWORD> tag

The <PASSWORD>...</PASSWORD> pair contain the password. The tag does not have any attributes.

7.2.4 Example

This package would be sent by a user, to register their device under a given name;

```
{wrapper tags}
<REG>
        <USERNAME>SUNTRESS</USERNAME>
        <PASSWORD>MYPASS</PASSWORD>
</REG>
{wrapper tags}
```

APPENDIX "A": ARML Specification

7.3 Registration confirmation package
7.3.1 Description
This packages is sent back from the AIRIX server to the AVM to confirm that the device has been registered.

7.3.2 Structure
A registration confirmation package has the following structure;

```
{wrapper tags}
<REGCONFIRM>
        <VALUE> {data} </VALUE>
        <APPS>
                <APP></APP>
                <APP></APP>
        </APPS>
</REGCONFIRM>
{wrapper tags}
```

7.3.3 Tags

7.3.3.1 The <REGCONFIRM> tag
The <REGCONFIRM>...</REGCONFIRM> pair delimit the confirmation. The tag has no attributes.

7.3.3.2 The <VALUE> tag
The <VALUE>...</VALUE> pair contains the status of the registration request. The following text strings are allowable;

CONFIRM – this means that the registration request was successful
NOTREGPLATFORM – this means that the registration request failed because the device is not registered for the platform
INVALIDUSERPASS – this means that the registration request failed because the user name or password was not valid
NODEVICE – this means that the registration request failed because the device was not registered previously by an application

7.3.3.3 The <APPS> tag
The <APPS>...</APPS> pair contains a list of applications for the device.

7.3.3.4 The <APP> tag
The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for this application. 'NO' if they are not. |

APPENDIX "A": ARML Specification

7.3.4 Example
This package would be sent to confirm the example request in section 7.2.4;
{wrapper tags}
```
<REGCONFIRM>
        <VALUE>CONFIRM</VALUE>
        <APPS>
            <APP ID="4" NAME="EMAIL" DESCRIPTION="E-Mail Application" REG="YES">
            <APP ID="22" NAME="STOCKS" DESCRIPTION="Stock Quotes" REG="NO">
        </APPS>
</REGCONFIRM>
```
{wrapper tags}

APPENDIX "A": ARML Specification

7.4 Find applications package

7.4.1 Description

Find applications packages are sent from the AIRIX component to the AIRIX server when a user wishes to refresh their list of applications on a device

7.4.2 Structure

A device registration package has the following structure;

{wrapper tags}
<FINDAPPS>
</FINDAPPS>
{wrapper tags}

7.4.3 Tags

7.4.3.1 The <FINDAPPS> tag

The <FINDAPPS>...</FINDAPPS> pair delimit the application registration request. It has no attributes.

APPENDIX "A": ARML Specification

7.5 Find applications confirmation package

7.5.1 Description
This package is sent back from the AIRIX server to the AVM to and contains a list of applications available for the user

7.5.2 Structure
A registration confirmation package has the following structure;

```
{wrapper tags}
<FINDAPPSCONFIRM>
        <APPS>
                <APP></APP>
                <APP></APP>
        </APPS>
</FINDAPPSCONFIRM>
{wrapper tags}
```

7.5.3 Tags

7.5.3.1 The <FINDAPPSCONFIRM> tag
The <FINDAPPSCONFIRM>...</FINDAPPSCONFIRM> pair delimit the confirmation. The tag has no attributes.

7.5.3.2 The <APPS> tag
The <APPS>...</APPS> pair contains a list of applications for the device.

7.5.3.3 The <APP> tag
The <APP>...</APP> pair contains an application header. It has the following attributes;

| Attribute | Optional? | Description |
| --- | --- | --- |
| ID | No | The application ID |
| NAME | No | The name of the application |
| DESCRIPTION | No | A text description of the application |
| REG | No | 'YES' if the user is registered for the application. 'NO' if they are not. |

APPENDIX "A": ARML Specification

7.6 Application Registration & deregistration package
7.6.1 Description
Application registration packages are sent from the AIRIX component to the AIRIX server when a user wishes to register or deregister for an application.

7.6.2 Structure
A device registration package has the following structure;

{wrapper tags}
<APPREG>
</APPREG>
{wrapper tags}

7.6.3 Tags

7.6.3.1 The <APPREG> tag
The <APPREG>...</APPREG> pair delimit the application registration request. The tag has the following attributes;

| Attribute | Optional? | Description |
| --- | --- | --- |
| TYPE | No | This defines the type of parameter. It can take two values;<br>ADD – this means that the application is to be added to the registration database<br>DELETE – this means that the application is to be removed to the registration database |
| ID | No | The ID of the application being registered/deregistered |

APPENDIX "A": ARML Specification

7.7 Application registration & deregistration confirmation package

7.7.1 Description
This packages is sent back from the AIRIX server to the AVM to confirm that the applicaiton has been registered or deregistered.

7.7.2 Structure
A registration confirmation package has the following structure (note that for DELETE types, the <INTERFACE>...</INTERFACE> section will not be included);

```
{wrapper tags}
<APPREGCONFIRM>
        <INTERFACE>
                interface definition
        </INTERFACE>
</APPREGCONFIRM>
{wrapper tags}
```

7.7.3 Tags

7.7.3.1 The <APPREGCONFIRM> tag
The <APPREGCONFIRM>...</APPREGCONFIRM> pair delimit the confirmation. The tag has the following attributes;

| Attribute | Optional? | Description |
| --- | --- | --- |
| TYPE | No | This defines the type of parameter. It can take two values; ADD – this means that the application is to be added to the registration database DELETE – this means that the application is to be removed to the registration database |
| ID | Yes | The ID of the application being returned (if any) |

7.7.3.2 The <INTERFACE> tag
The <INTERFACE>...</INTERFACE> pair delimit the interface definition. The tag has the no attributes, and contains an interface definition as laid out in section 3. Note that instead of the <DEVICES>...</DEVICES> tags in section 3.1.3.6, it will be replaced by <SCREENS>...<SCREENS> with the screen definitions for only the one device that the interface is being sent to (see section 3.4.3.2 for the definition of the <SCREENS> tag). This section will not be sent for APPREGCONFIRM messages of TYPE="DELETE".

7.7.4 Example
The following example shows the application confirmation with screen definitions for an application that allows a user to view their inbox and the mails in it.

```
{wrapper tags}
<APPREGCONFIRM TYPE="ADD" ID="12">
        <INTERFACE>
                <AXSCHDEF>
                                        <EVENTS>
                                                <EVENT>
                                    (action definitions)
```

APPENDIX "A": ARML Specification

```
                                        </EVENT>
                                       </EVENTS>
                <AXTDEFS>
                        (table definitions)
                </AXTDEFS>
                <DPACKETS>
                        (data package definitions)
                </DPACKETS>

<SCREENS>
                        <SCREEN NAME="INBOX ">
                                {screen definition}
                        </SCREEN>
                        <SCREEN NAME="VIEWNEWMAIL">
                                {screen definition}
                        </SCREEN>
                </SCREENS>
        </AXSCHDEF>
    </INTERFACE>
</APPREGCONFIRM>
{wrapper tags}
```

APPENDIX "A": ARML Specification

7.8 Setting the active device package

7.8.1 Description
If a user wishes to set the current device as their active device, the AVM must send a 'set active device' package to the AIRIX server

7.8.2 Structure
A 'set active device' package has the following structure;

{wrapper tags}
<SA>
{data}
</SA>
{wrapper tags}

7.8.3 Tags

7.8.3.1 The <SA> tag
The 'set active device' package is shown by the <SA>...</SA> tags. The tag has no attributes; the tag pair contains the user's username

7.8.4 Example
This package would be sent by a user with the username of 'scotty';

{wrapper tags}
<SA>scotty</SA>
{wrapper tags}

7.9 Set active device response

7.9.1 Description
This packages is sent back from the AIRIX server to the client in response to a request to set the current device as the active one.

7.9.2 Structure
A 'set active device response' package has the following structure;

{wrapper tags}
<SACONFIRM>
    <VALUE> {data} </VALUE>
</SACONFIRM>
{wrapper tags}

7.9.3 Tags

7.9.3.1 The <SACONFIRM> tag
The <SACONFIRM>...</SACONFIRM> pair delimit the confirmation. The tag does not have any attributes.

APPENDIX "A": ARML Specification

7.9.3.2 The <VALUE> tag

The <VALUE>...</VALUE> pair contains the status of the registration request. The following text strings are allowable;

CONFIRM – this means that the registration request was successful
NOTREGISTERED – this means that the registration request failed because

7.9.4 Example

This package would be sent by the AIRIX server to confirm a set active request;

```
{wrapper tags}
<SACONFIRM>
        <VALUE>CONFIRM</VALUE>
</SACONFIRM>
{wrapper tags}
```

7.10 Invalid Application package
7.10.1 Description

This package is sent back from the AIRIX server to the AVM in response to a request to interact with an application that is no longer registered with AIRIX.

7.10.2 Structure

An 'invalid application' package has the following structure;

```
{wrapper tags}
<NOAPP>
        <VALUE> {data} </VALUE>
</NOAPP>
{wrapper tags}
```

7.10.3 Tags

7.10.3.1 The <NOAPP> tag

The <NOAPP>...</NOAPP> pair delimit the confirmation. The tag has no attributes.

7.10.3.2 The <VALUE> tag

The <VALUE>...</VALUE> pair delimit the return code. It can only be
NOAPPLICATION – Application not found.

7.10.4 Example

This package would be sent in response to a request if the application cannot be found;

```
{wrapper tags}
<NOAPP>
        <VALUE>NOAPPLICATION</VALUE>
</NOAPP>
{wrapper tags}
```

APPENDIX "A": ARML Specification

8 APPLICATION-SERVER SYSTEM INTERACTIONS

The section that defines Application to server system interactions has been made obsolete by the document "AIRIX Polling XML Language Specification". It describes an XML-HTTP interface to AIRIX using POST and GET commands to a web-based ISAPI DLL.

9 ARML FUTURE DEVELOPMENTS

The following enhancements to ARML are planned;

- Tokenisation
- Support for on-line help
- Compression techniques
- Enhanced editboxes
    - input masks
    - multi-value entry
- Multiple selection list boxes
- A per-application splash screen

What is claimed is:

1. A machine-readable medium comprising instructions that, when executed by a processor of a wireless communication device, adapt said wireless communication device to:
   receive at least one markup language document containing:
      a markup language definition defining a query of a notional database table, said notional database table representing one of a plurality of information categories maintained by a personal information manager (PIM) software application executing at said wireless communication device, the information categories comprising at least one of an email message inbox, an email message outbox, a set of previously sent email messages, an address book containing contact information, a scheduling calendar, and a list of tasks to be completed, said notional database table having a set of notional fields, each of said notional fields corresponding to a field of a data record within said one information category; and
      a markup language definition defining a query of a user-defined database table stored in a database having an associated database management system (DBMS) application executing at said wireless communication device, wherein said markup language definition defining said query of said user-defined database table and said markup language document defining said query of said notional database table both have the same format or both conform to the same markup language schema;
   instantiate, based on said markup language definition defining said query of said notional database table, an instance of at least one object-oriented class containing code for effecting said query of said notional database table through interaction with said PIM software application; and
   further instantiate, based on said markup language definition defining said query of said user-defined database table, an instance of at least one object-oriented class containing code for effecting said query of said user-defined database table through interaction with said DBMS application.

2. The machine-readable medium of claim 1 wherein said at least one markup language document further contains a markup language definition of a rule for processing a message received at said wireless communication device, said rule indicating a manner in which fields of said message impact upon said notional fields of said notional database table, and further comprising instructions for instantiating an instance of at least one object-oriented class containing code for effecting said rule through interaction with said PIM software application.

3. The machine-readable medium of claim 2 wherein said impact upon said notional fields of said notional database table comprises one of adding a record to said notional database table, modifying the contents of at least one of the notional fields of a record of said notional database table, and deleting a record from said notional database table.

4. The machine-readable medium of claim 1 wherein said at least one markup language document further contains a markup language definition of an action to be performed by said wireless communication device upon the occurrence of a user-specified event, said action being the sending of an electronic mail (email) message to a user-defined email address, and further comprising instructions for instantiating an instance of at least one object-oriented class containing code for effecting said action through interaction with said PIM software application.

5. The machine-readable medium of claim 1 wherein said information categories include a contacts information category and wherein said set of notional fields for the contacts information category includes at least one of a first name field, a last name field, a street address field, a city field, a state or province field, a country field, a zip or postal code field, a telephone number field, a facsimile number field, and an email address field.

6. A method comprising:
   at a wireless communication device comprising a processor and memory in communication with said processor, the memory storing a database management system (DBMS) having an associated database and a personal information manager (PIM) software application, the PIM software application for maintaining data records in various information categories, the information categories including at least one of an email message inbox, an email message outbox, a set of previously sent email messages, an address book containing contact information, a scheduling calendar, and a list of tasks to be completed:
      receiving at least one markup language document containing a markup language definition defining a query of a notional database table, said notional database table representing one of the information categories and having a set of notional fields, each of said notional fields corresponding to a field of a data record within the information category, said markup language document further containing a markup language definition defining a query of a user-defined database table stored in said database, wherein said markup language definition defining said query of said user-defined database table and said markup language document defining said query of said notional database table both have the same format or both conform to the same markup language schema;
      instantiating, based on said markup language definition of said query of said notional database, an instance of at least one object-oriented class containing code for effecting said query of said notional database through interaction with said PIM software application; and
      further instantiating, based on said markup language definition defining said query of said user-defined database table, an instance of at least one object-oriented class containing code for effecting said query of said user-defined database table through interaction with said DBMS.

7. A machine-readable medium comprising instructions that, when executed by a processor of a computing device, adapt said computing device to:
   present a plurality of selectable graphical user interface (GUI) controls, each of said GUI controls for selecting a predefined notional database table representing a respective one of a plurality of information categories maintained by a wireless communication device-executable personal information manager (PIM) software application, said information categories comprising an email message inbox, an email message outbox, a set of previously sent email messages, an address book containing contact information, and a scheduling calendar, each said predefined notional database table being characterized by a set of notional fields, each of said notional fields corresponding to a field of a data record within the respective information category; and
   upon selection of one of said plurality of selectable GUI controls and based on other user input, generate a markup language definition defining a query of the respective notional database table.

8. The machine-readable medium of claim 7 further comprising instructions for adapting said computing device to:

generate, based on user interaction with at least one other graphical user interface control, a markup language definition defining a user-defined database table; and further generate, based on further user interaction with said at least one other graphical user interface control, a markup language definition defining a query of said user-defined database table, wherein said markup language definition defining said query of said notional database table and said markup language definition defining said query of said user-defined database table both have the same format.

9. The machine-readable medium of claim 7 further comprising instructions for adapting said computing device to:

generate, based on user interaction with at least one other graphical user interface control, a markup language definition defining a user-defined database table; and further generate, based on further user interaction with said at least one other graphical user interface control, a markup language definition defining a query of said user-defined database table, wherein said markup language definition defining said query of said notional database table and said markup language definition defining said query of said user-defined database table both conform to the same markup language schema.

10. The machine-readable medium of claim 7 wherein said instructions further adapt said computing device to:

define, in a markup language and based on user input, a rule for processing a message received at said wireless communication device, said rule indicating a manner in which fields of said message impact upon the notional fields of said notional database table.

11. The machine-readable medium of claim 10 wherein said impact upon said notional database table comprises one of adding a data record to said notional database table, modifying the content of at least one of said notional fields of a record of said notional database table and deleting a data record from said notional database table.

12. The machine-readable medium of claim 7 wherein said instructions further adapt said computing device to define, in a markup language and based on user input, an action to be performed by said wireless communication device upon the occurrence of a user-defined event, said action being the sending of an electronic mail (email) message to a user-defined email address.

* * * * *